US012761351B2

(12) United States Patent
Caspall

(10) Patent No.: US 12,761,351 B2
(45) Date of Patent: Oct. 13, 2026

(54) SONAR BEAM SHAPE CONTROLLING HORN

(71) Applicant: NAVICO, INC., Tulsa, OK (US)

(72) Inventor: Jayme Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 233 days.

(21) Appl. No.: 18/339,371

(22) Filed: Jun. 22, 2023

(65) Prior Publication Data

US 2023/0350061 A1 Nov. 2, 2023

Related U.S. Application Data

(63) Continuation-in-part of application No. 18/311,684, filed on May 3, 2023, now Pat. No. 12,085,644, (Continued)

(51) Int. Cl.
*G01S 15/89* (2006.01)
*G01S 7/52* (2006.01)
(Continued)

(52) U.S. Cl.
CPC .......... *G01S 15/89* (2013.01); *G01S 7/52003* (2013.01); *G10K 11/025* (2013.01); *G10K 11/346* (2013.01)

(58) Field of Classification Search
CPC ... G01S 15/89; G01S 7/52003; G10K 11/025; G10K 11/346
See application file for complete search history.

(56) References Cited

U.S. PATENT DOCUMENTS 6,842,401 B2 1/2005 Chiang et al.
7,652,952 B2 1/2010 Betts et al.
(Continued)

FOREIGN PATENT DOCUMENTS

AU 2005271581 B9 1/2011
DE 10 2009 051237 A1 5/2010
(Continued)

OTHER PUBLICATIONS

Extended European Search Report dated Nov. 13, 2024 issued in European Application No. 24181452.4.
(Continued)

*Primary Examiner* — Abdallah Abulaban
(74) *Attorney, Agent, or Firm* — Nelson Mullins Riley & Scarborough LLP

(57) ABSTRACT

A sonar transducer assembly for controlling sonar beam shapes is provided. The sonar transducer assembly comprises a sonar transducer element having an emitting face. The sonar transducer element is configured to generate a sonar beam having a path. The sonar transducer element is configured to operate at an operating frequency, and the sonar transducer element possesses a sensitivity. The sonar transducer assembly also comprises a horn having a first diffraction element and a second diffraction element. The first diffraction element and the second diffraction element are configured to increase the sensitivity of the sonar transducer element when the sonar transducer element is operated at the operating frequency. Additionally, the horn is positioned so that the first diffraction element and the second diffraction element rest within the path of the sonar beam. The horn is configured to reform a beam shape of the sonar beam.

17 Claims, 40 Drawing Sheets

Related U.S. Application Data which is a continuation of application No. 17/352,515, filed on Jun. 21, 2021, now Pat. No. 11,681,044.

(51) Int. Cl.
*G10K 11/02* (2006.01)
*G10K 11/34* (2006.01)

(56) References Cited

U.S. PATENT DOCUMENTS

| | | | | |
|---|---|---|---|---|
| 7,961,552 | B2 | 6/2011 | Boucher et al. | |
| 8,300,499 | B2 | 10/2012 | Coleman et al. | |
| 8,450,907 | B2 | 5/2013 | Moon et al. | |
| 8,780,674 | B2 | 7/2014 | Mosca et al. | |
| 8,989,974 | B2 | 3/2015 | Arnold et al. | |
| 9,872,100 | B2 | 1/2018 | Henry et al. | |
| 10,144,138 | B2 | 12/2018 | Balas et al. | |
| 10,919,075 | B2 | 2/2021 | Mosca et al. | |
| 2010/0109481 | A1 * | 5/2010 | Buccafusca | G10K 11/025 310/335 |
| 2011/0069856 | A1 | 3/2011 | Blore et al. | |
| 2019/0091882 | A1 | 3/2019 | Balas et al. | |
| 2019/0265354 | A1 | 8/2019 | Antao | |
| 2020/0072953 | A1 | 3/2020 | Wigh et al. | |
| 2021/0132204 | A1 | 5/2021 | Caspall | |
| 2021/0270963 | A1 | 9/2021 | Caspall | |
| 2022/0035026 | A1 | 2/2022 | Proctor | |

FOREIGN PATENT DOCUMENTS

| | | | | |
|---|---|---|---|---|
| EP | 0928640 | A1 * | 7/1999 | B06B 3/00 |
| EP | 2367640 | B1 | 1/2019 | |
| EP | 4109133 | A1 | 12/2022 | |
| JP | 2009-021852 | A | 1/2009 | |
| WO | WO 2021/106138 | A1 | 6/2021 | |
| WO | WO 2013/036284 | A1 | 3/2023 | |

OTHER PUBLICATIONS

"PANOPTIX™ All-Seeing Sonar;" retrieved Dec. 1, 2020 from https://explore.garmin.com/en-US/panoptix/.

"Blue View DP900 90 Fish Measurement;" YouTube; Apr. 7, 2009; retrieved Dec. 1, 2020 from https://www.youtube.com/watch?v=qQyeAi4bi7Q.

Aris Explorer; *Sound Metrics*; retrieved Dec. 1, 2020 from http://www.soundmetrics.com/.

* cited by examiner

SONAR BEAM SHAPE CONTROLLING HORN

CROSS-REFERENCE TO RELATED APPLICATION

This application claims priority to and is a continuation-in-part of U.S. patent application Ser. No. 18/311,684, filed May 3, 2023, entitled "Sonar Beam Shape Controlling Horn," which is a continuation of U.S. patent application Ser. No. 17/352,515, filed Jun. 21, 2021, entitled "Sonar Beam Shape Controlling Horn," and issued as U.S. Pat. No. 11,681,044, the contents of each is hereby incorporated by reference in their entirety.

FIELD OF THE INVENTION

Embodiments of the present invention relate generally to a horn that is used to control the beam shape generated by a sonar transducer element and/or array.

BACKGROUND OF THE INVENTION

Watercraft frequently include sonar transducer systems, and these sonar transducer systems may propagate one or more sonar beams into the underwater environment to obtain sonar return data regarding the depth of the floor of the body of water. The sonar beams are emitted into the underwater environment according to beam shapes (such as may have beam widths in the steering direction and the transverse direction of the watercraft, with the two directions being perpendicular to one another).

Beam shapes (e.g., beam patterns) result from the natural radiation from the planar faces of the transducer elements. There is a tradeoff between the transverse beam width and the radiated on-axis intensity in the steering plane. Using previous systems, if one wished to make the transverse beam width larger, one was required to decrease the transverse length of the radiative elements of the array. While this resulted in a large transverse beam width, this action reduced the total radiated power in the beam at the same time that it reduced the intensity of the beam due to geometric spreading. The result is less acoustic signal energy at the point of the interrogated object. By reciprocity, it also led to less total force on the receive elements and less signal energy for a given source located in the field of view. The problem is how to provide a wide transverse field of view for the array while maintaining high acoustic signal intensity so that the image quality is maintained over the entire field of view.

BRIEF SUMMARY OF THE INVENTION

A horn is provided herein that may reform a sonar beam generated by a sonar transducer element or array in several beneficial ways. For example, (a) the horn may expand the angular coverage along the transverse direction; (b) the horn may provide more consistent beam shapes regardless of variation in the operating frequency for the sonar transducer element; and (c) the horn may maintain the signal intensity at a more consistent level across the range of angles.

The horn may effectively improve the properties of a generated sonar beam. The horn may also be made and assembled in a cost-effective manner. For example, a horn may be made of rubber or a soft close-cell foam rubber sheet. Further, a horn may be easily assembled/attached with respect to or as a part of a new or an existing sonar transducer array.

The design of horns may also be selected to optimize the sensitivity of a sonar transducer element or an array. By adjusting the relative position of diffraction elements relative to each other, the relative position of diffraction elements from an emitting face of a sonar transducer element, the amount of curvature at diffraction elements, the width of a horn, and/or the frequency that a sonar transducer element is operating at, the sensitivity of a sonar transducer element may be improved. In various embodiments, different horns, sonar transducer assemblies, and methods are contemplated herein that reform sonar beam shapes and increase the sensitivity of sonar transducer assemblies.

In an example embodiment, a sonar transducer assembly for controlling sonar beam shapes is provided. The sonar transducer assembly comprises a sonar transducer element having an emitting face. The sonar transducer element is configured to generate a sonar beam having a path, the sonar transducer element is configured to operate at an operating frequency, and the sonar transducer element possesses a sensitivity. The sonar transducer assembly also includes a horn having at least one diffraction element. The at least one diffraction element is configured to increase the sensitivity of the sonar transducer element when the sonar transducer element is operated at the operating frequency. The horn is positioned so that the at least one diffraction element rest within the path of the sonar beam, and the horn is configured to reform a beam shape of the sonar beam.

In some embodiments, the at least one diffraction element may comprise a first diffraction element and a second diffraction element. The first diffraction element and the second diffraction element may both define curved portions that extend into the path of the sonar beam, and each of the curved portions may possess a section defining a radius. A first distance may be a minimum distance separating the first diffraction element and the second diffraction element of the horn. Additionally, in some embodiments, the sonar transducer assembly may be made by a process comprising determining the radius and the first distance to increase the sensitivity of the sonar transducer element when the sonar transducer element is operated at the operating frequency. The process may also comprise forming the horn with the radius and the first distance. Furthermore, in some embodiments, a second distance may be defined as the distance that the sonar beam travels in the path between the emitting face and a curved portion of the first diffraction element or the second diffraction element.

In some embodiments, the sonar transducer assembly may be made by a process comprising determining the radius, the first distance, and the second distance to increase the sensitivity of the sonar transducer element when the sonar transducer element is operated at the operating frequency. The process may also comprise forming the horn with the determined radius, the first distance, and the second distance. Additionally, in some embodiments, the emitting face may define a width, and the sonar transducer assembly may be made by a process. This process may include determining the radius, the first distance, the second distance, and the width to increase the sensitivity of the sonar transducer element when the sonar transducer element is operated at the operating frequency. This process may also include forming the horn with the determined radius, the first distance, the second distance, and the width. Additionally, in some embodiments, the radius may be approximately 7 millimeters, the first distance may be approximately 5 millimeters, the second distance may be approximately 0.5 millimeters, the width may be approximately 5 millimeters, and a resultant sensitivity of the sonar transducer element may be approximately 187.00 decibels when the operating frequency is approximately 206 kilohertz.

In some embodiments, determining of the radius and the first distance may result in a resulting sensitivity increase over an otherwise identical sonar transducer assembly that does not utilize any horn. Additionally, in some embodiments, the resulting sensitivity increase may be approximately 12 decibels or more over the otherwise identical sonar transducer assembly that does not utilize any horn.

In some embodiments, the sonar transducer element may be a linear downscan sonar transducer element. Furthermore, in some embodiments, the sonar transducer element may be a conical downscan sonar transducer element.

In some embodiments, the horn may be an annular shaped horn. Additionally, in some embodiments, the emitting face of the sonar transducer element may define a first plane, and the annular shaped horn may define a circular profile in a second plane that is parallel to the first plane.

In another example embodiment, a horn for controlling sonar beam shapes of a sonar transducer element is provided. The horn comprises a first diffraction element and a second diffraction element. The first diffraction element defines a first curved portion with a first diffraction surface having a first section, and the second diffraction element defines a second curved portion with a second diffraction surface having a second section. The first section and the second section both define a radius, and the radius is the same for the first section and the second section. The horn is configured to be positioned proximate to the sonar transducer element so that the first diffraction surface and the second diffraction surface rest within a path of a sonar beam generated by an emitting face of the sonar transducer element. The first diffraction element and the second diffraction element are separated by a first distance, with the first distance being a minimum distance separating the first diffraction element and the second diffraction element. The horn is configured to reform a beam shape of the sonar beam generated by the emitting face, and the sonar transducer assembly is made by a process comprising determining a horn design for a horn by determining the radius and the first distance. In some embodiments, determining the radius and the first distance may result in a resulting sensitivity increase over an otherwise identical sonar transducer assembly that does not utilize any horn.

In another example embodiment, a method for manufacturing a sonar transducer assembly is provided. The method comprises providing a sonar transducer element having an emitting face. The sonar transducer element is configured to generate a sonar beam extending in a path, the sonar transducer element is configured to operate at an operating frequency, and the sonar transducer element possesses a sensitivity. The method also comprises determining a horn design for a horn having a first diffraction element and a second diffraction element. The first diffraction element defines a first curved portion, the second diffraction element defines a second curved portion, and the first curved portion and the second curved portion both possess a section defining a radius. A first distance is a minimum distance separating the first diffraction element and the second diffraction element of the horn, and a second distance is defined as a distance that the sonar beam travels in the path between the emitting face and a curved portion of the first diffraction element or the second diffraction element. At least one of the first distance, the second distance, or the radius are selected so as to increase the sensitivity of the sonar transducer element when the sonar transducer element is operated at the operating frequency. The method also comprises providing the horn having the horn design. The method also comprises positioning the horn so that the first diffraction element and the second diffraction element rest within the path of the sonar beam so that the first diffraction element and the second diffraction element reform a beam shape of the sonar beam generated by the sonar transducer element.

In some embodiments, the emitting face may define a width, and the first diffraction element and the second diffraction element may be configured to increase a sensitivity of the sonar transducer element when the sonar transducer element is operated at the operating frequency. Determining the horn design may comprise determining at least one of the first distance, the second distance, or the radius to increase the sensitivity of the sonar transducer element when the sonar transducer assembly is operated at the operating frequency and when the sonar transducer element possesses the width.

In some embodiments, the operating frequency of the sonar transducer element may remain approximately the same during operation of the sonar transducer element. Additionally, in some embodiments, the method also comprises causing emission of a first sonar beam from the emitting face into the path. Furthermore, in some embodiments, determining the radius and the first distance may result in a resulting sensitivity increase of at least approximately 12 decibels over an otherwise identical sonar transducer assembly that does not include any horn. In some embodiments, determining the radius and the first distance may result in a resulting sensitivity increase of at least approximately 5 decibels over an otherwise identical sonar transducer assembly that does not include any horn.

BRIEF DESCRIPTION OF THE DRAWINGS

Figure 1:
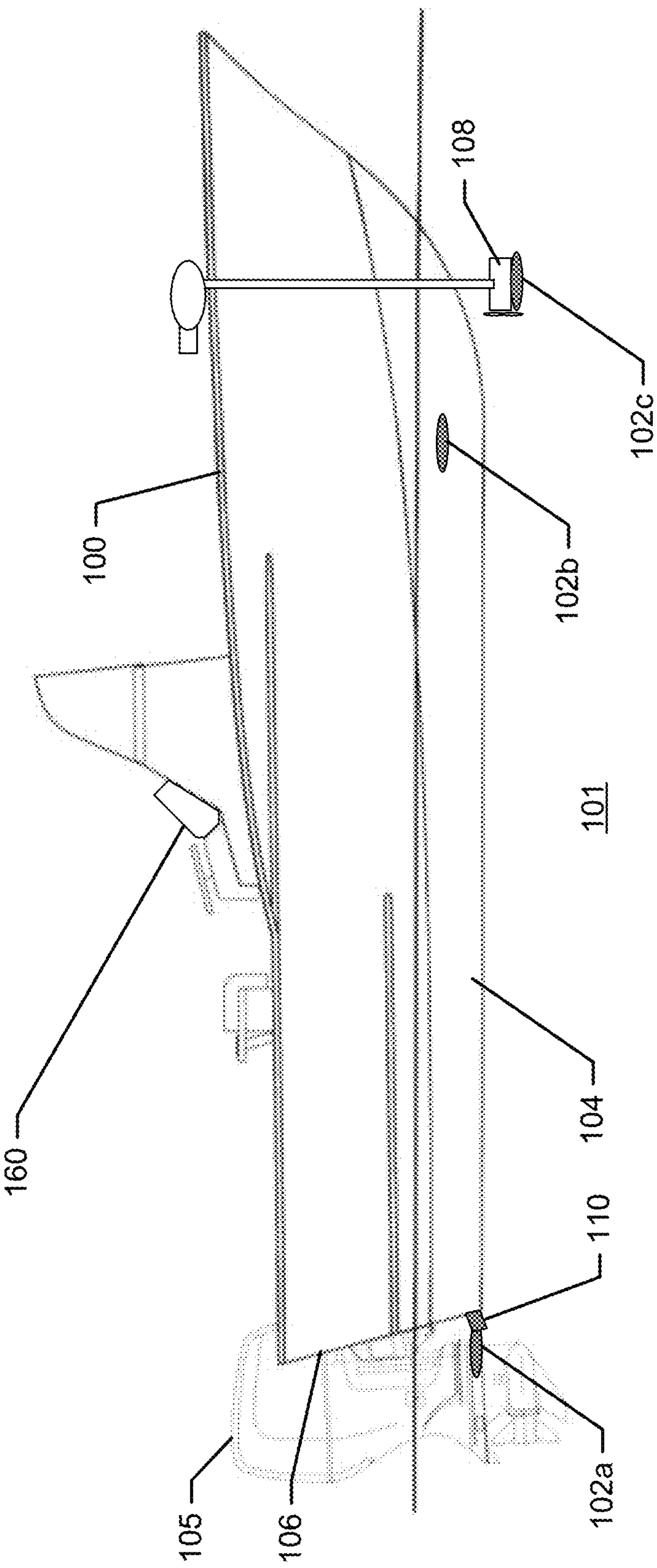
Figure 2A:
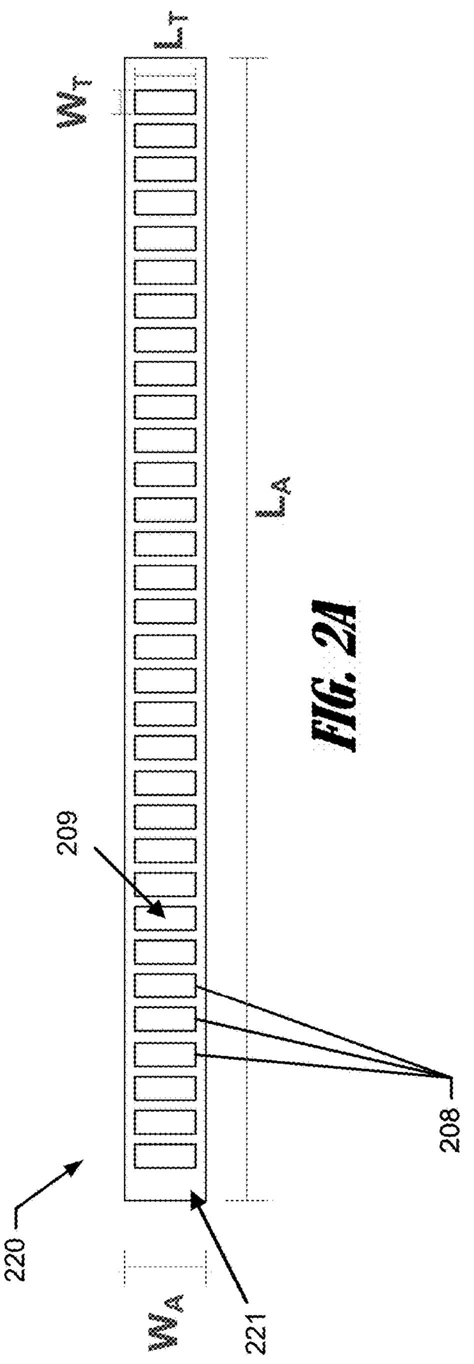
Figure 2B:
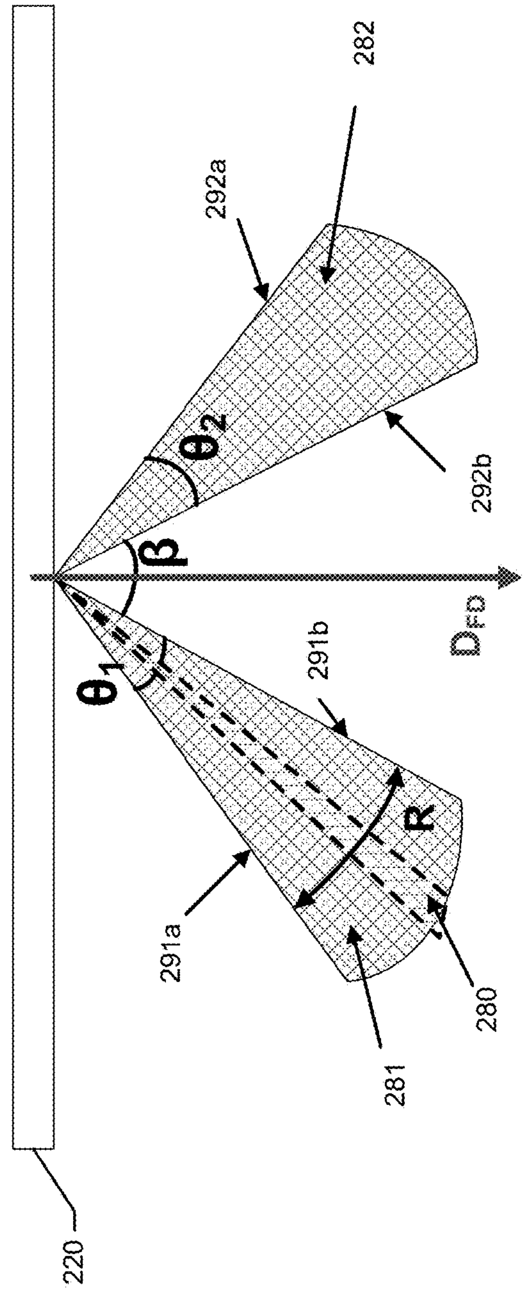
Figure 2C:
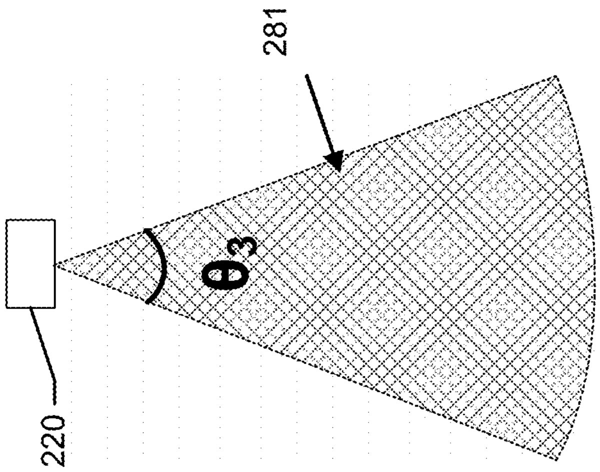
Figure 3A:
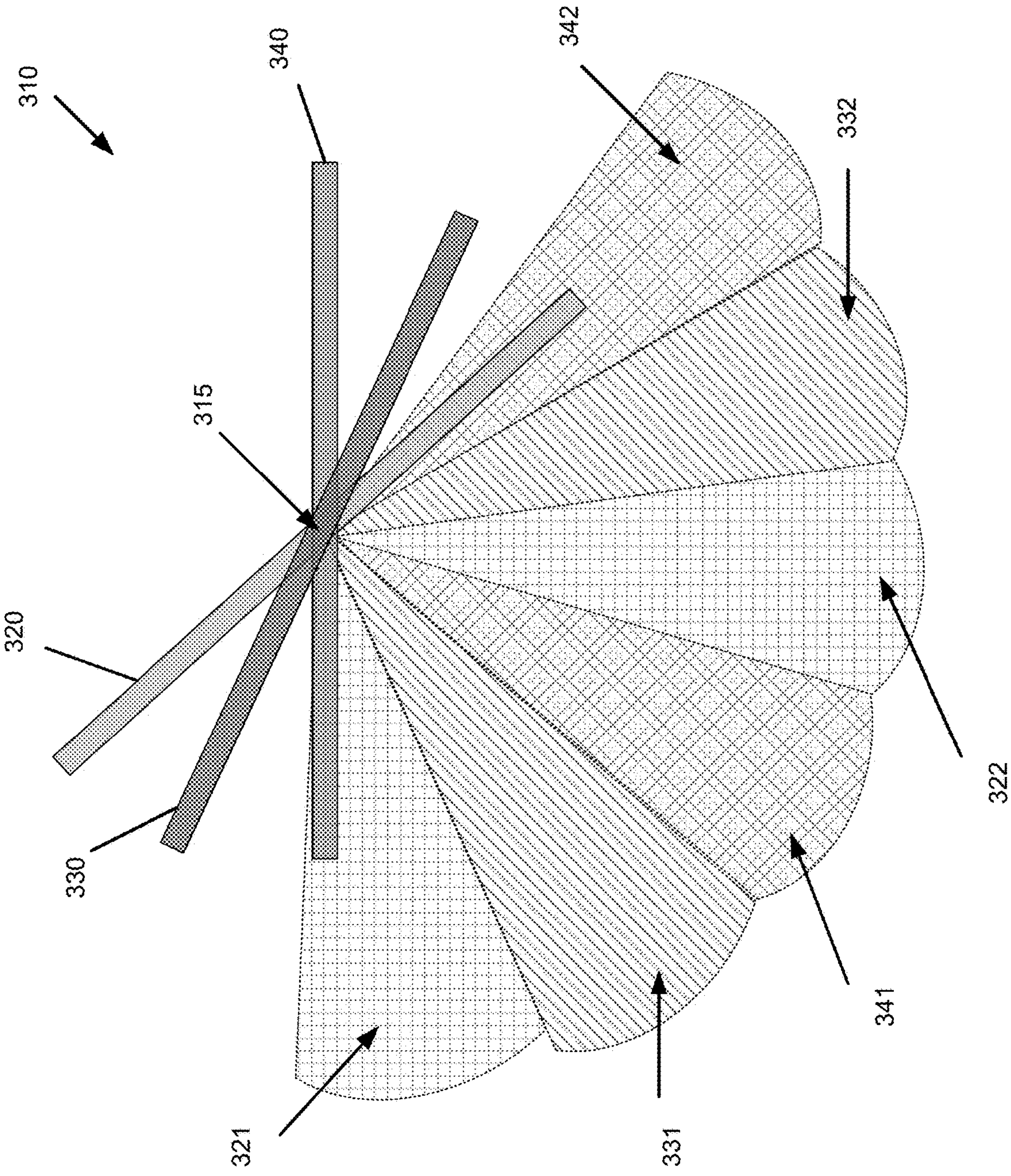
Figure 3B:
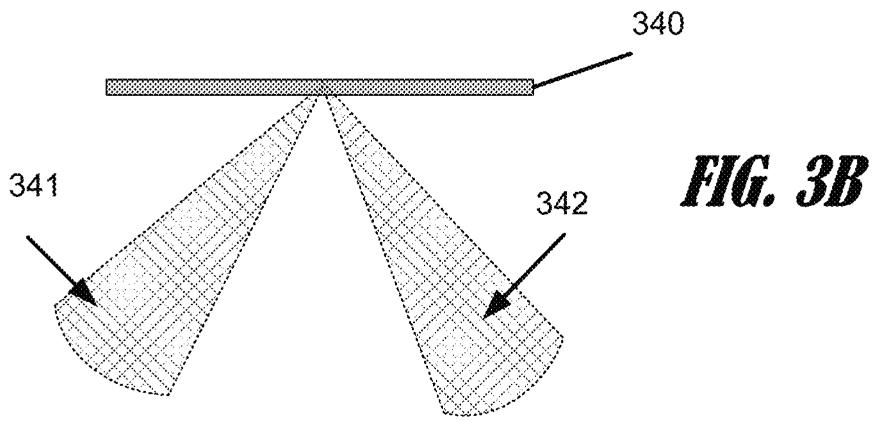
Figure 3C:
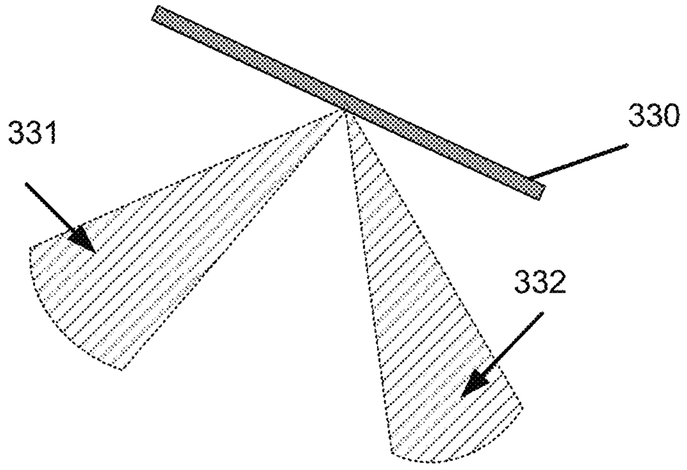
Figure 3D:
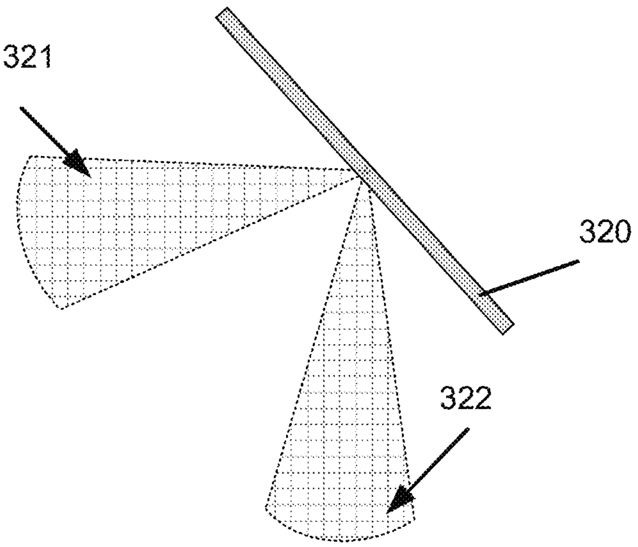
Figure 4:
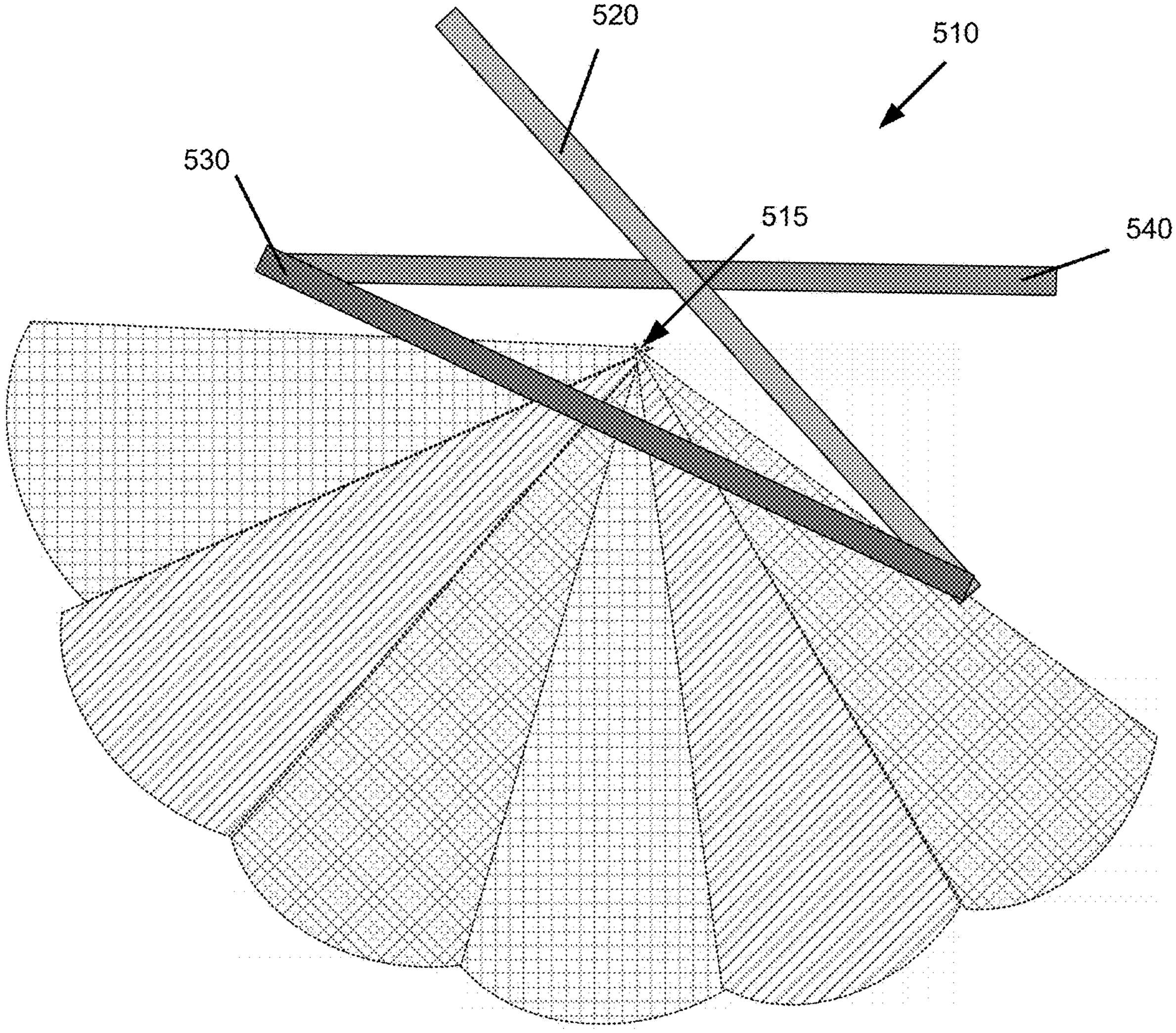
Figure 5A:
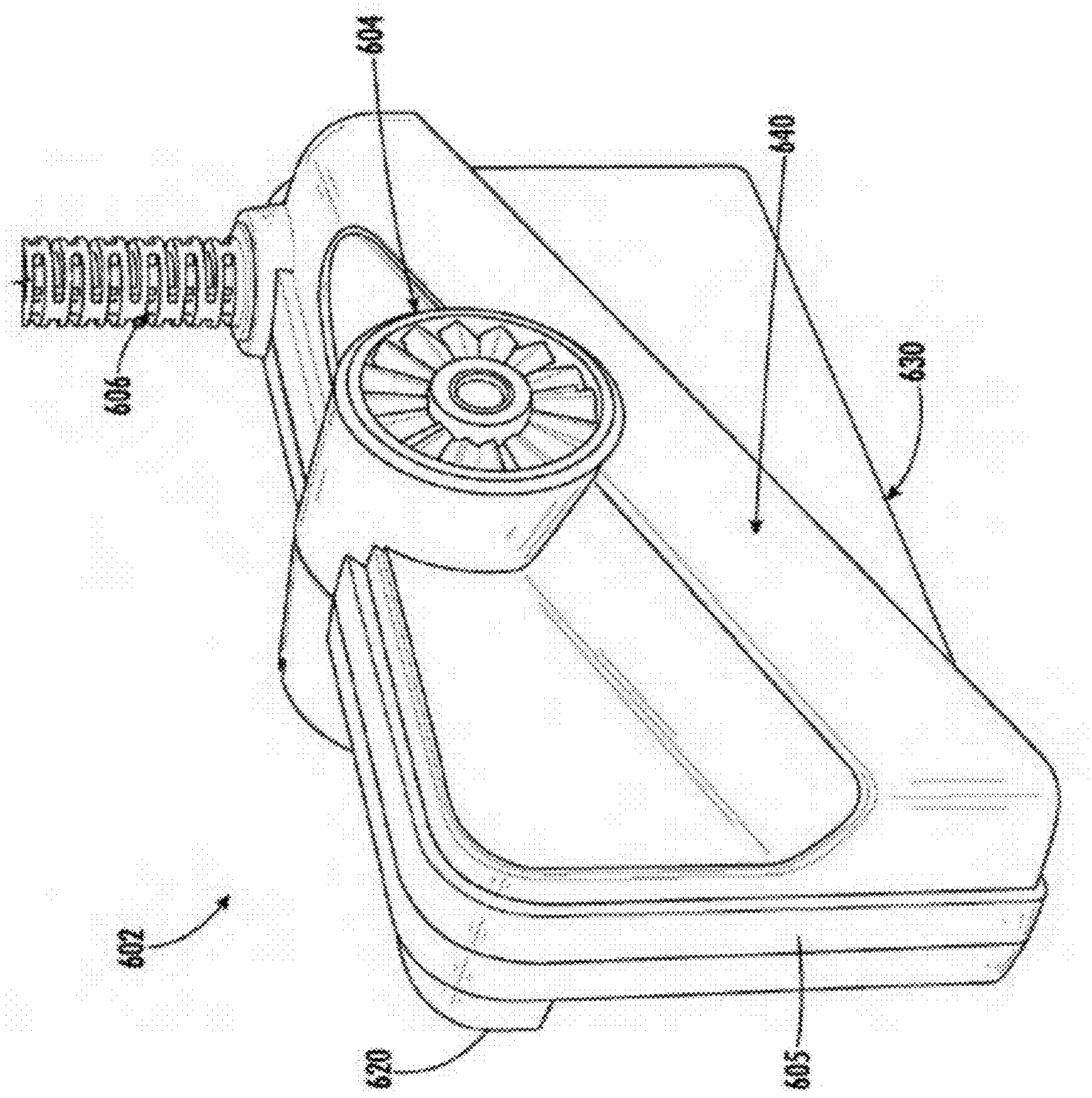
Figure 5B:
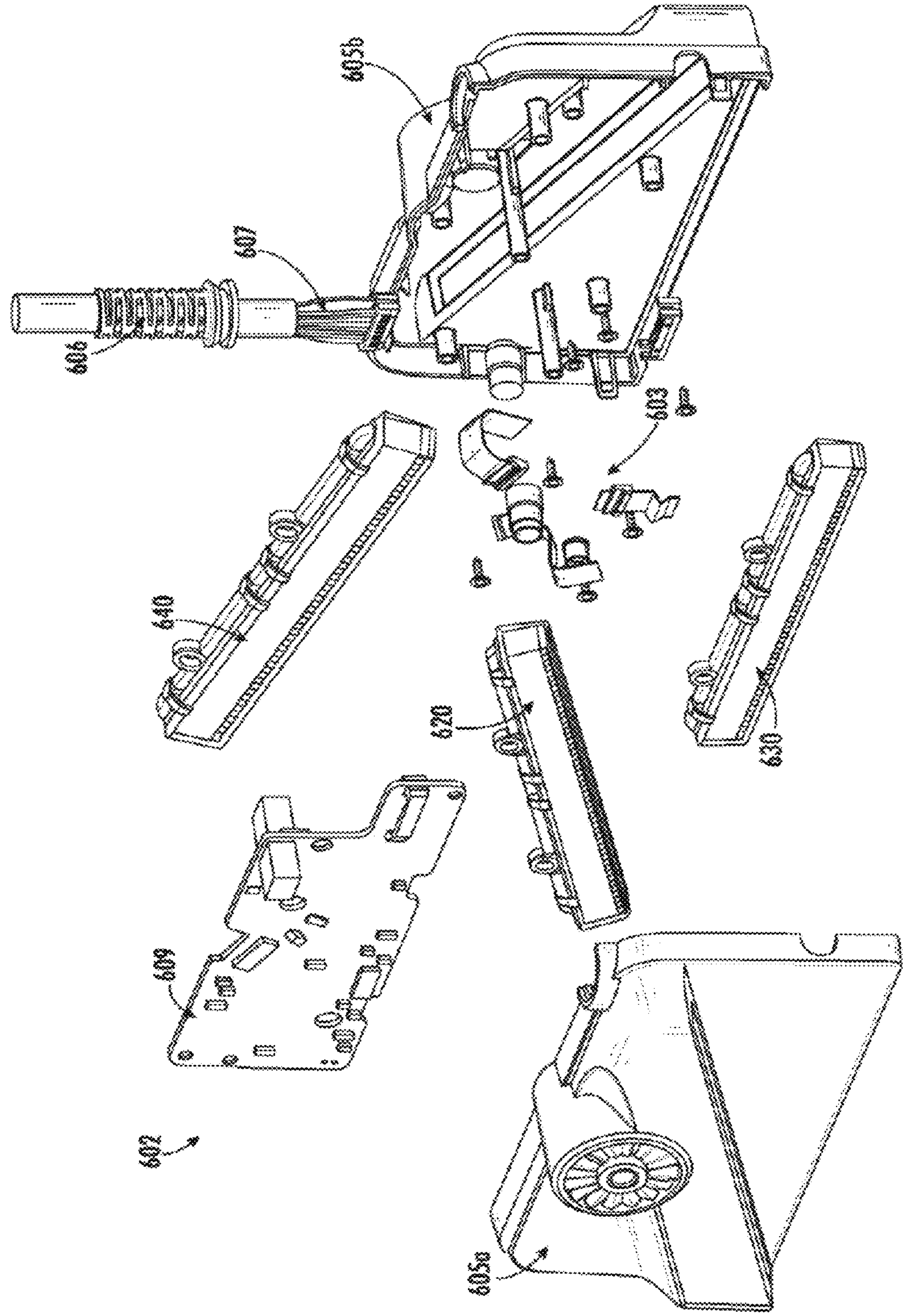
Figure 5C:
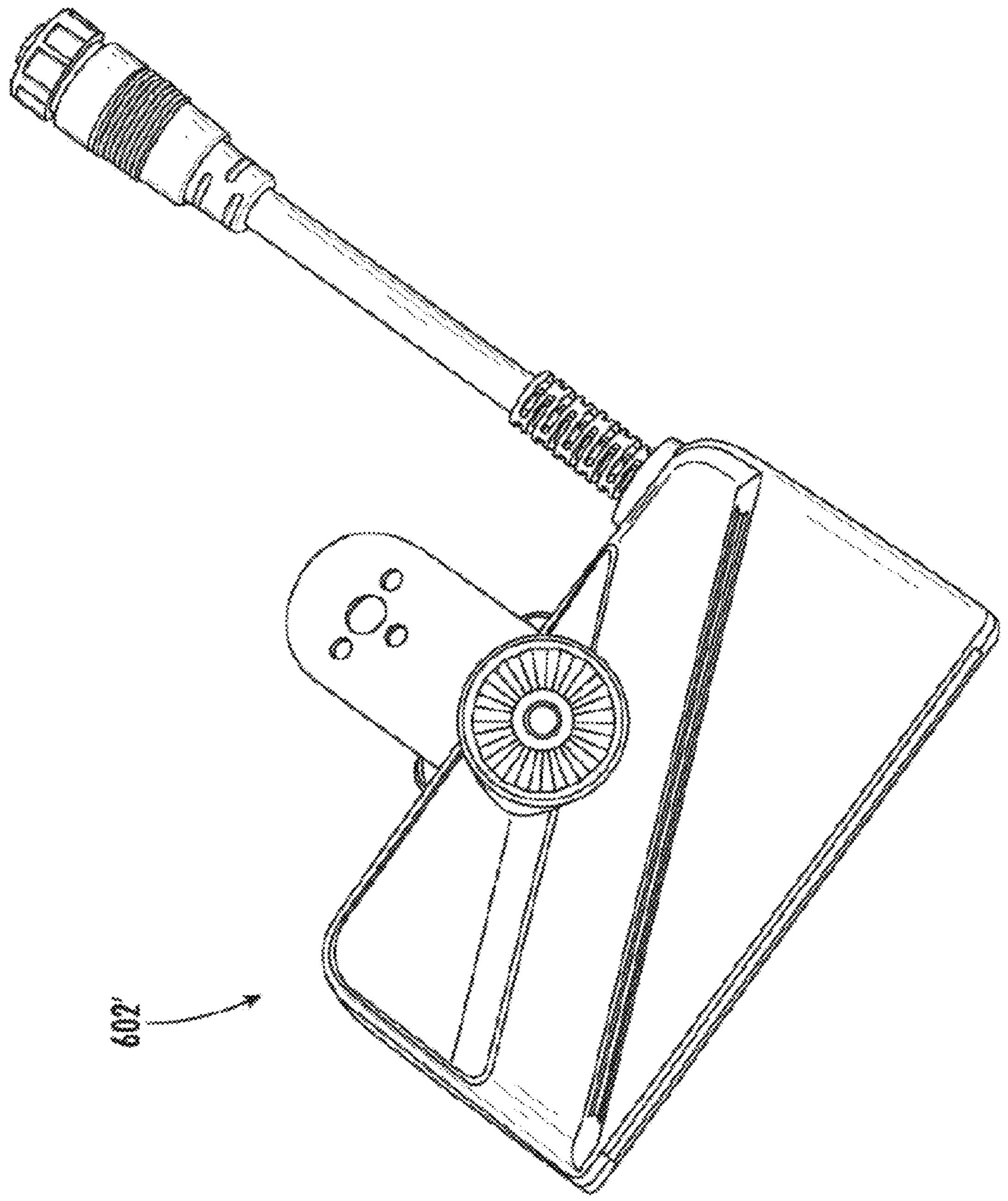
Figure 6A:
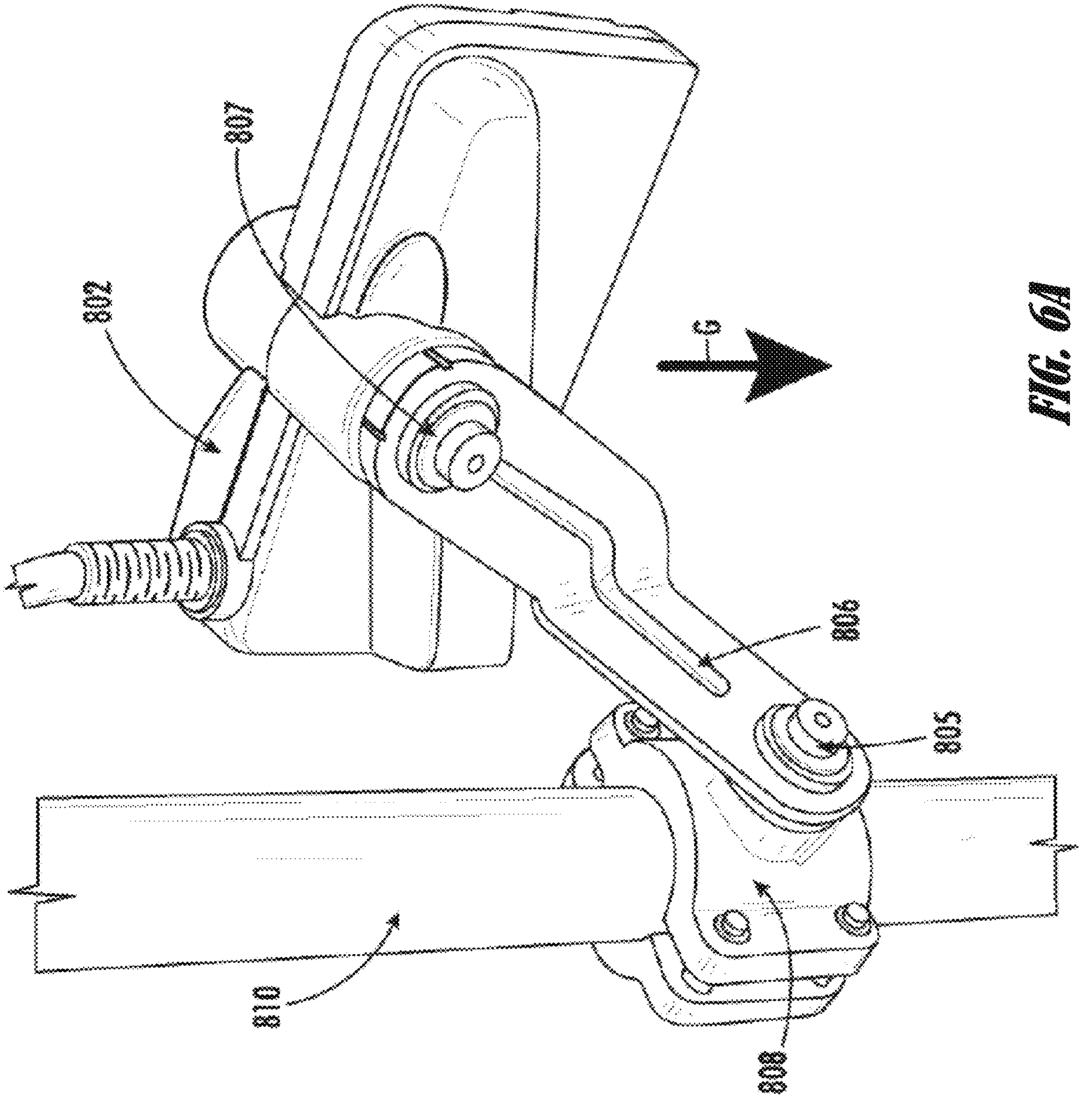
Figure 6B:
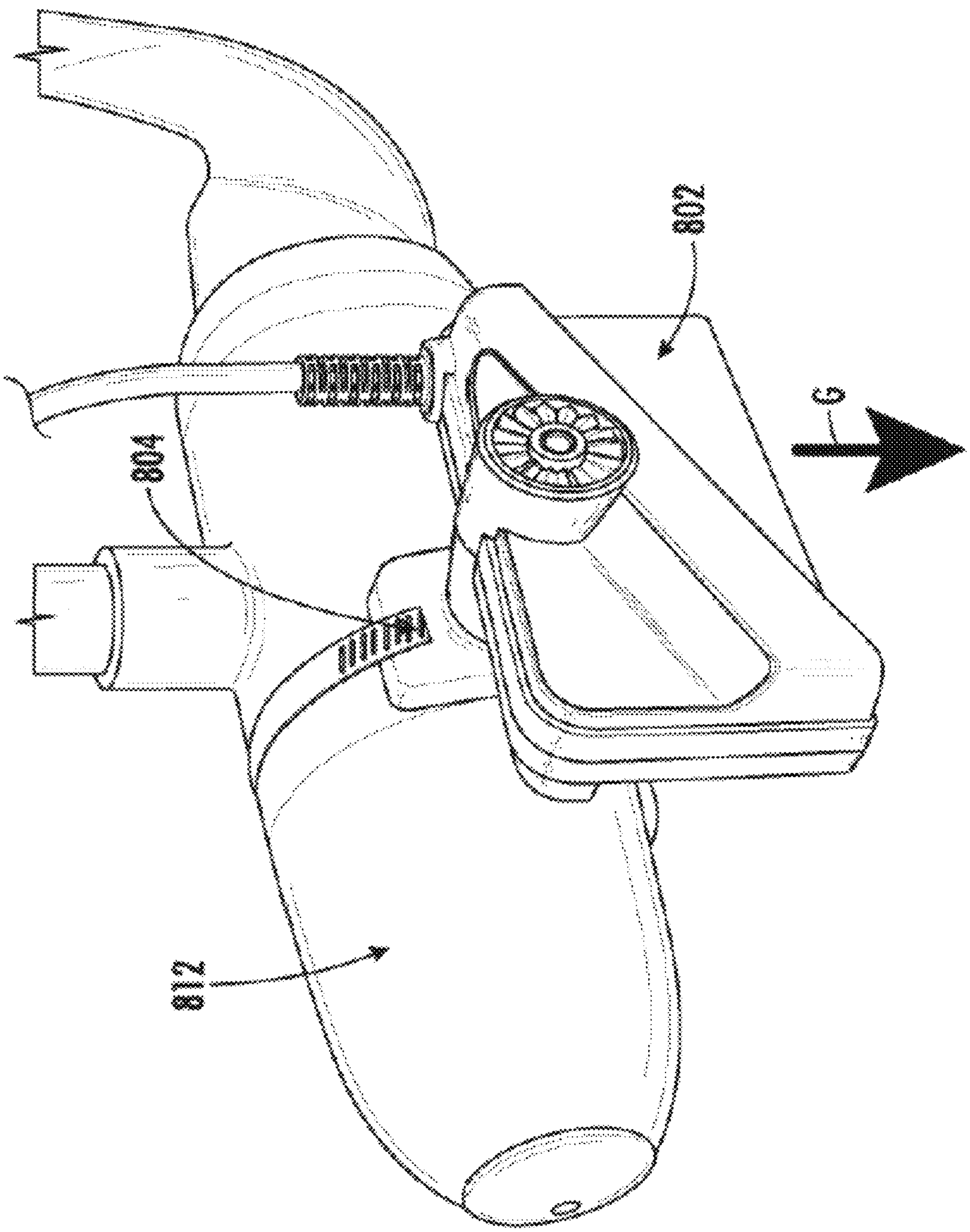
Figure 7A:
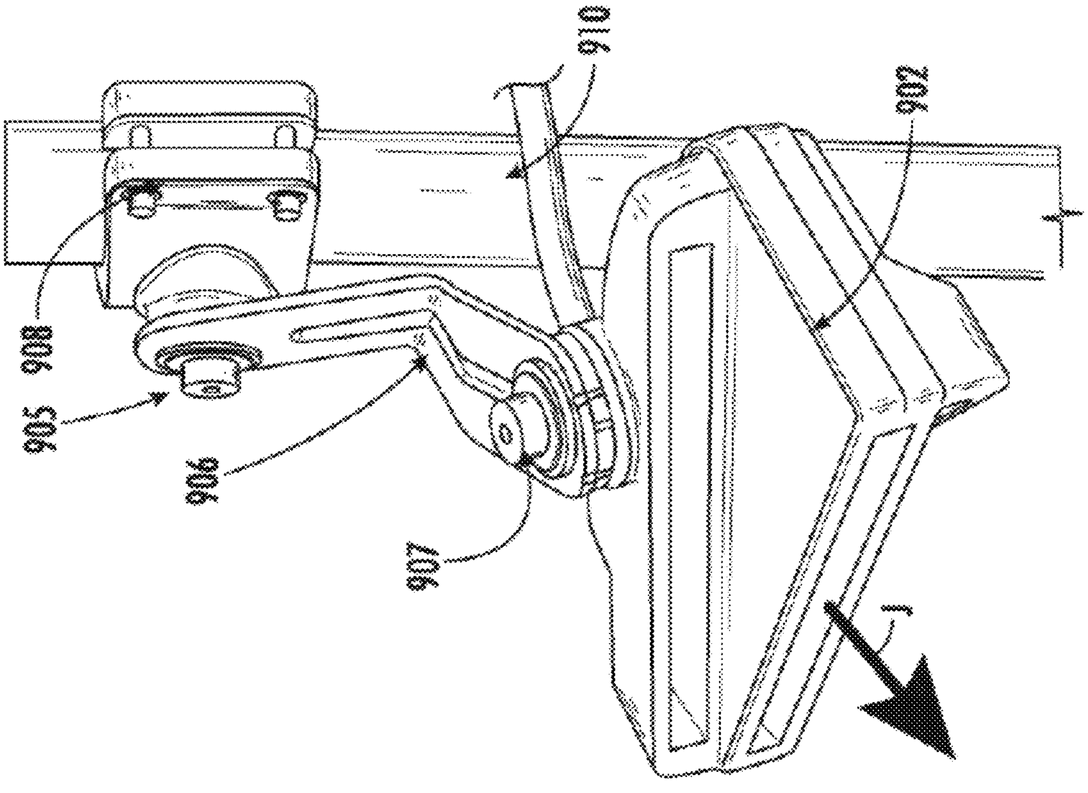
Figure 7B:
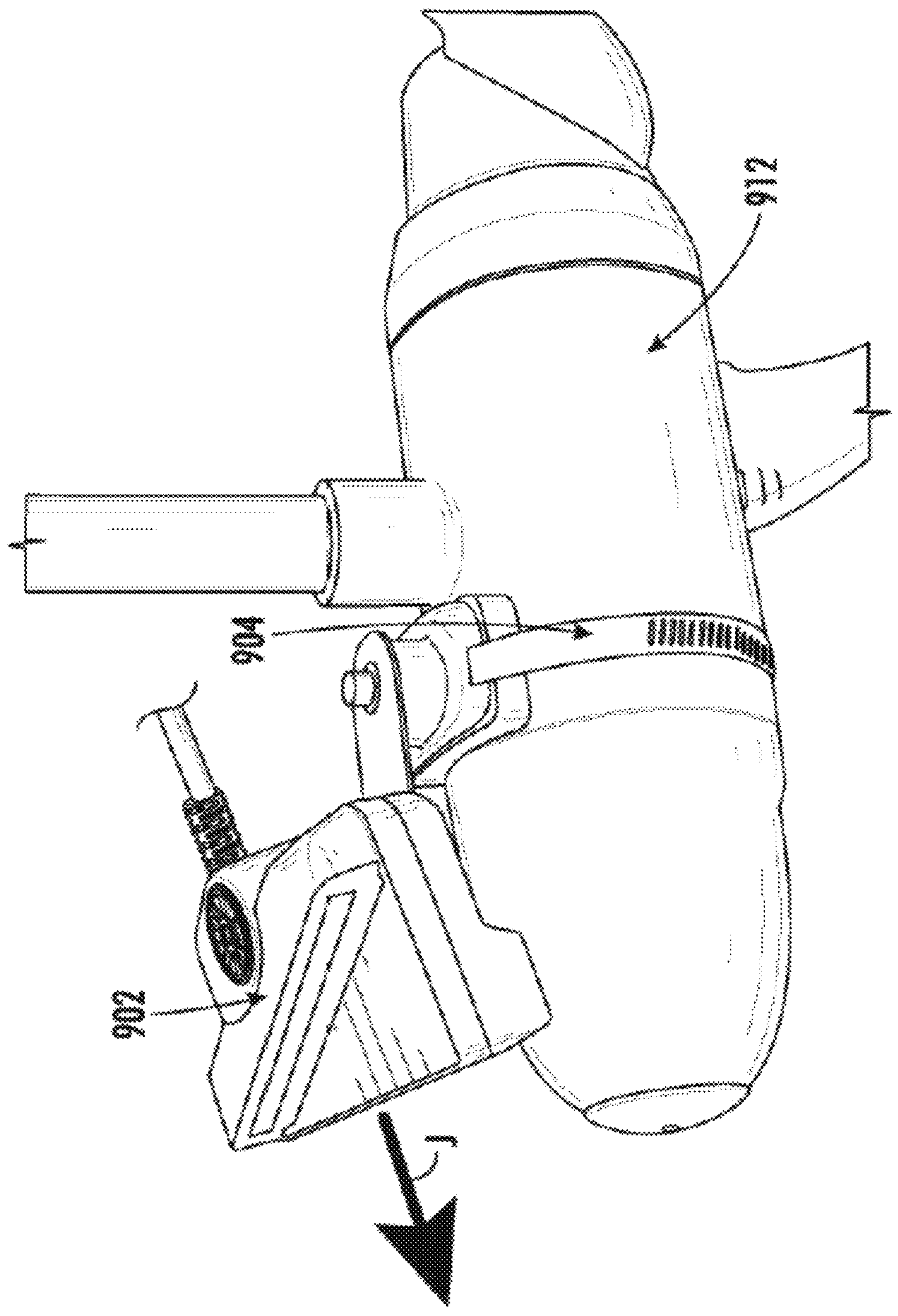
Figure 8:
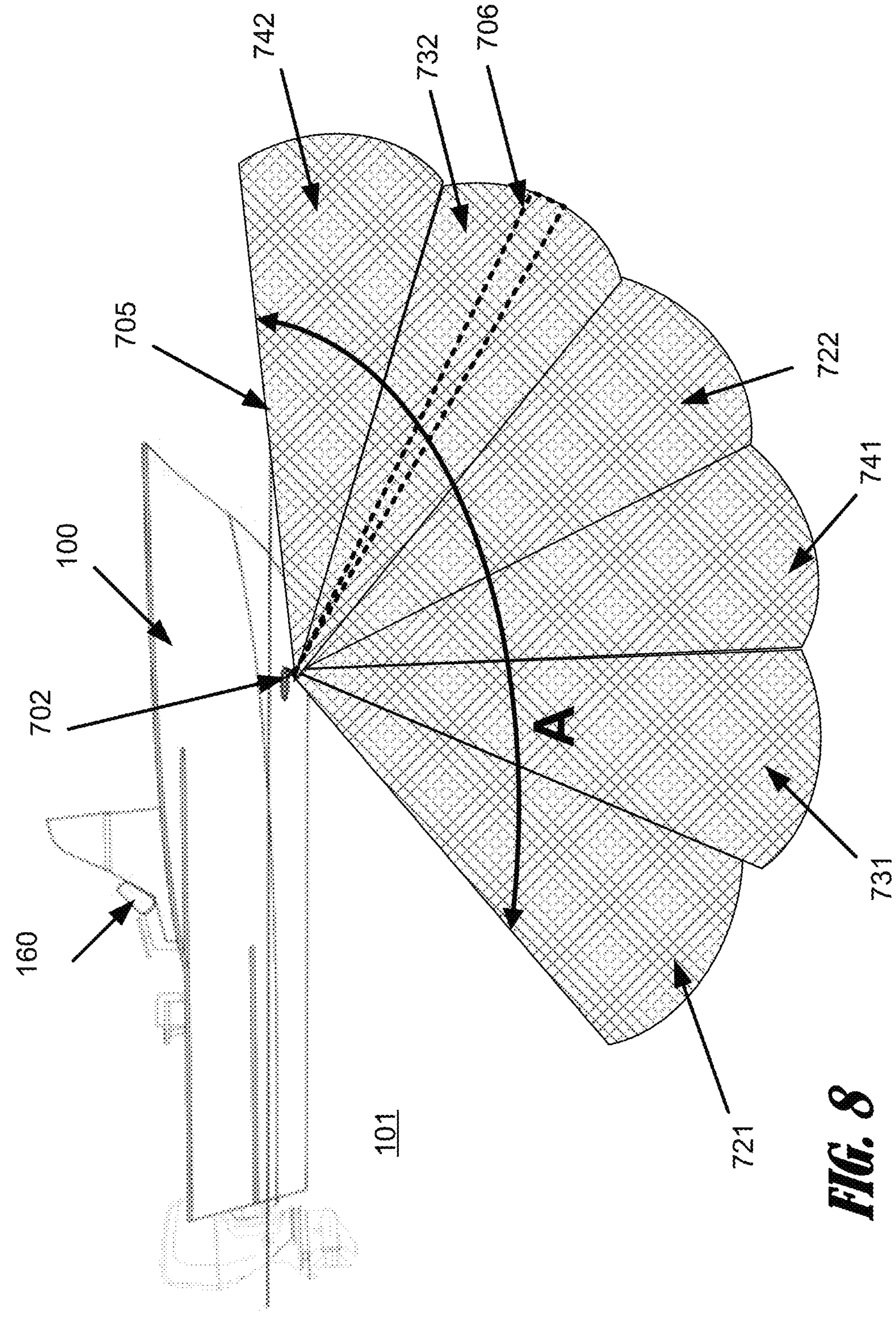
Figure 9:
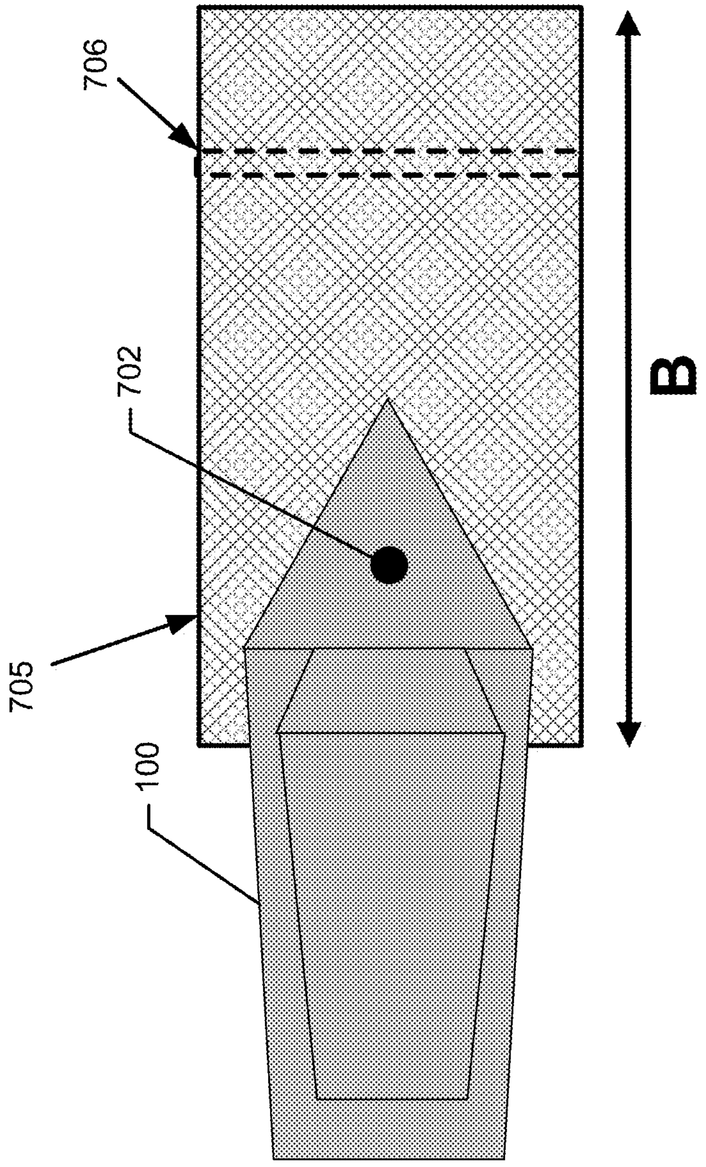
Figure 10A:
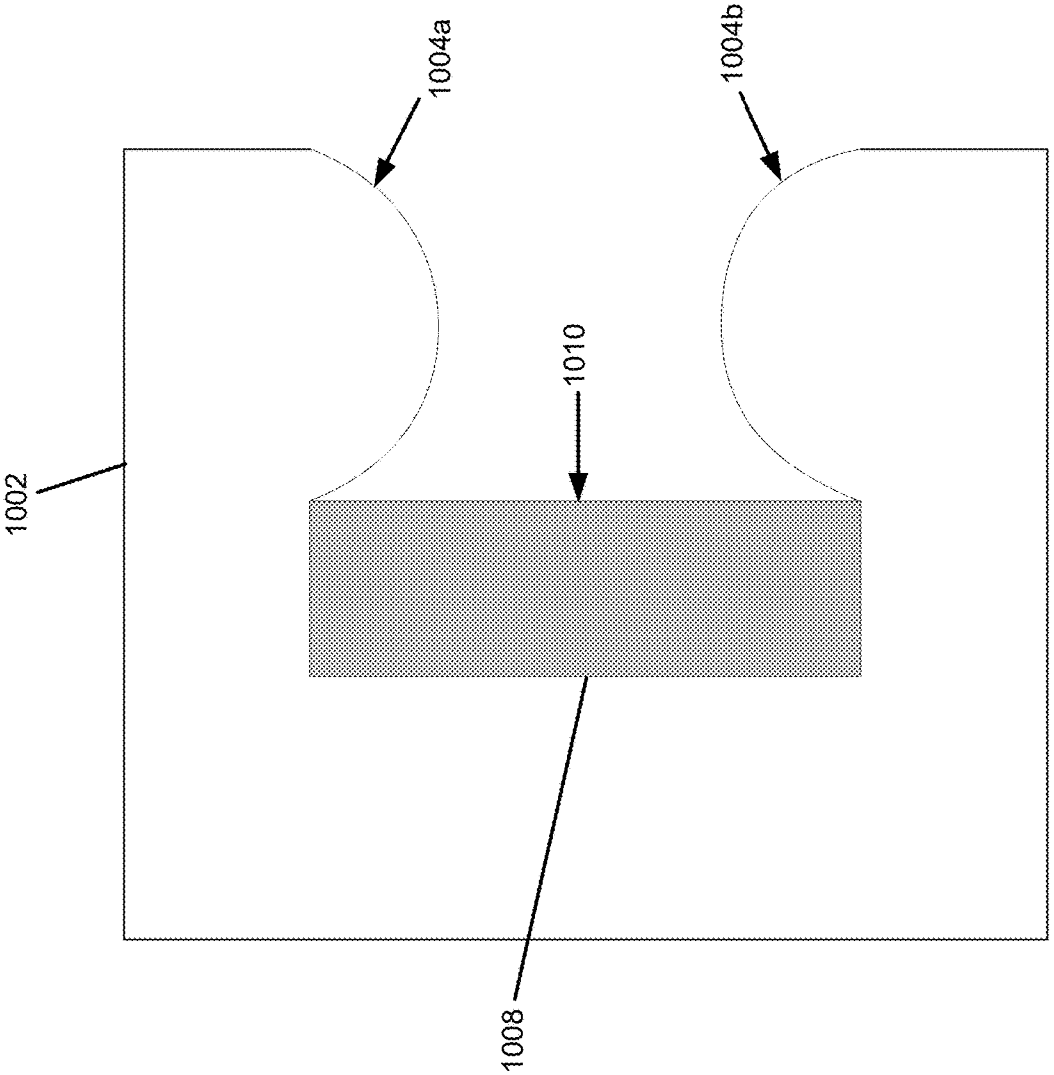
Figure 10B:
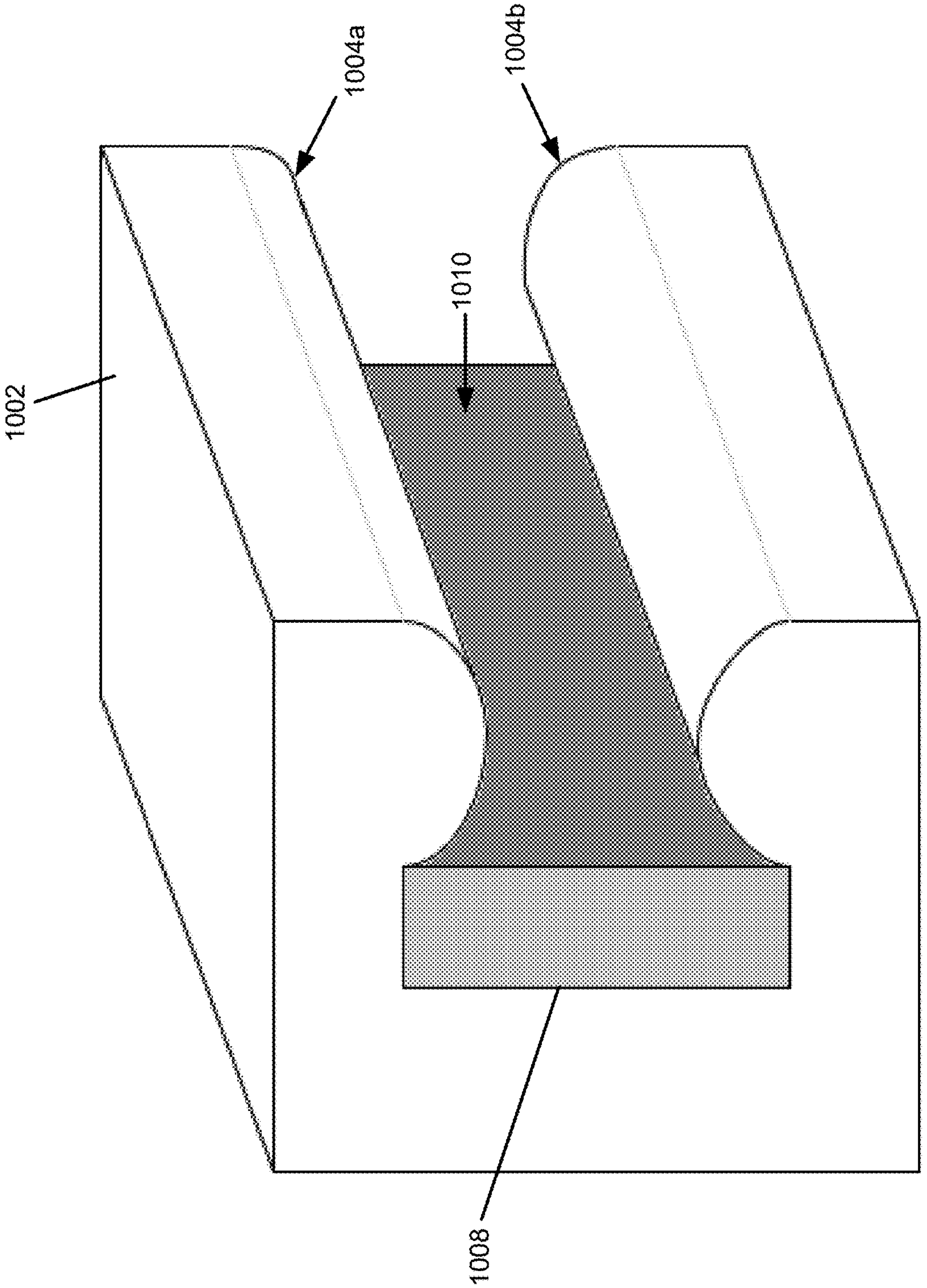
Figure 10C:
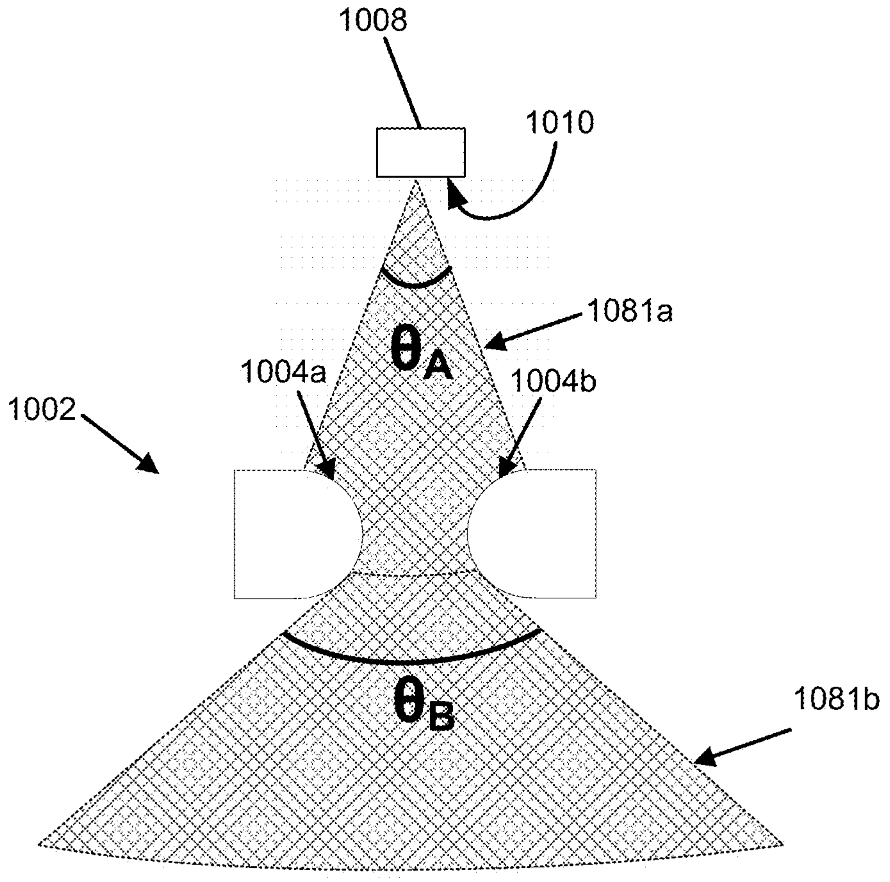
Figure 10D:
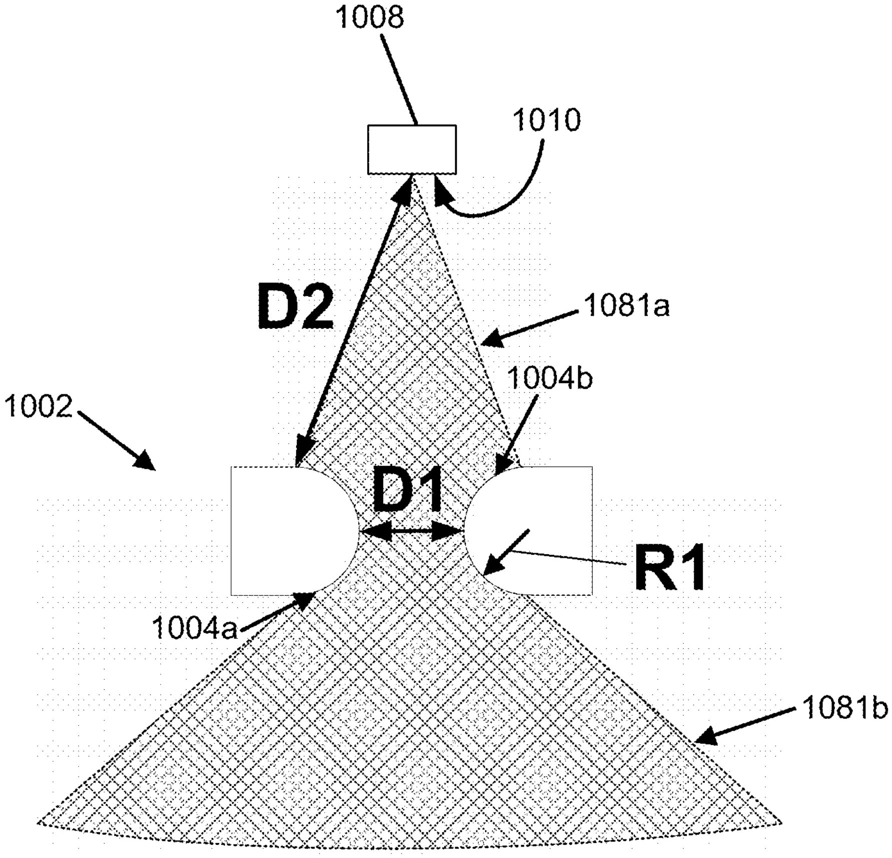
Figure 10E:
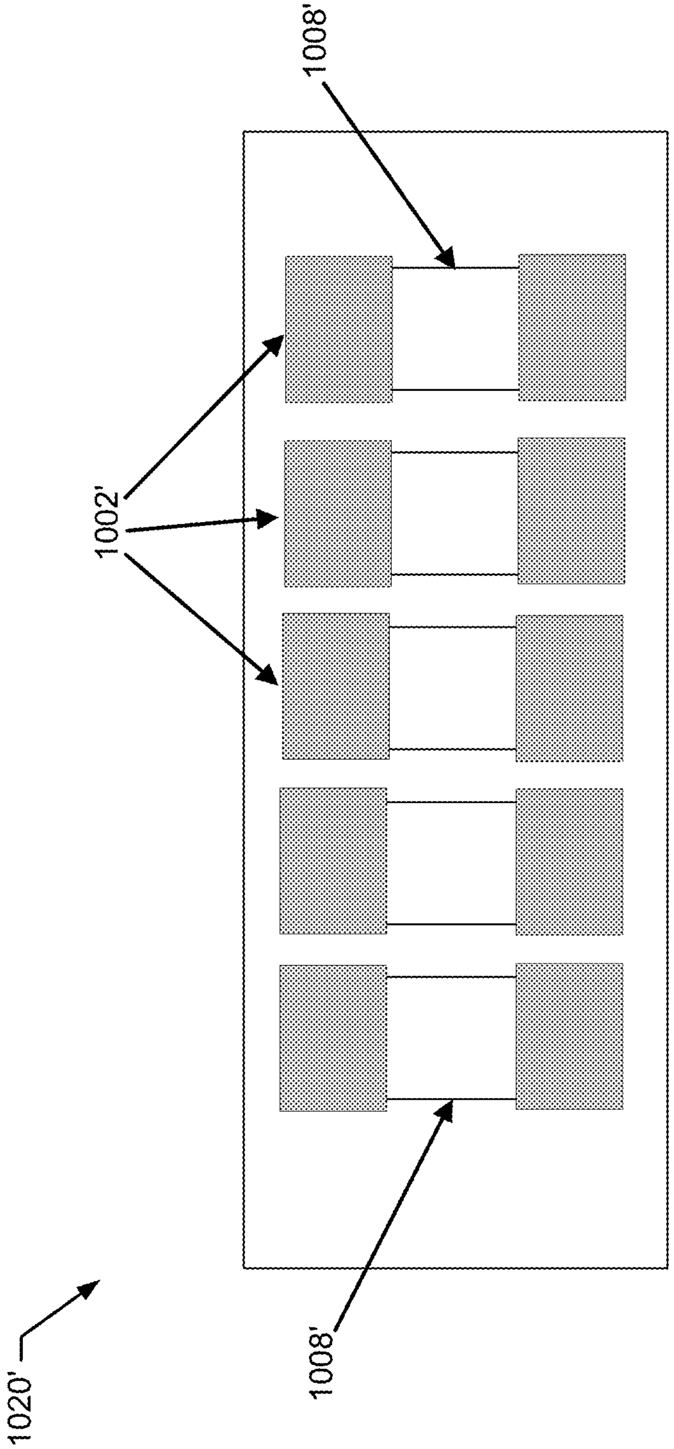
Figure 10F:
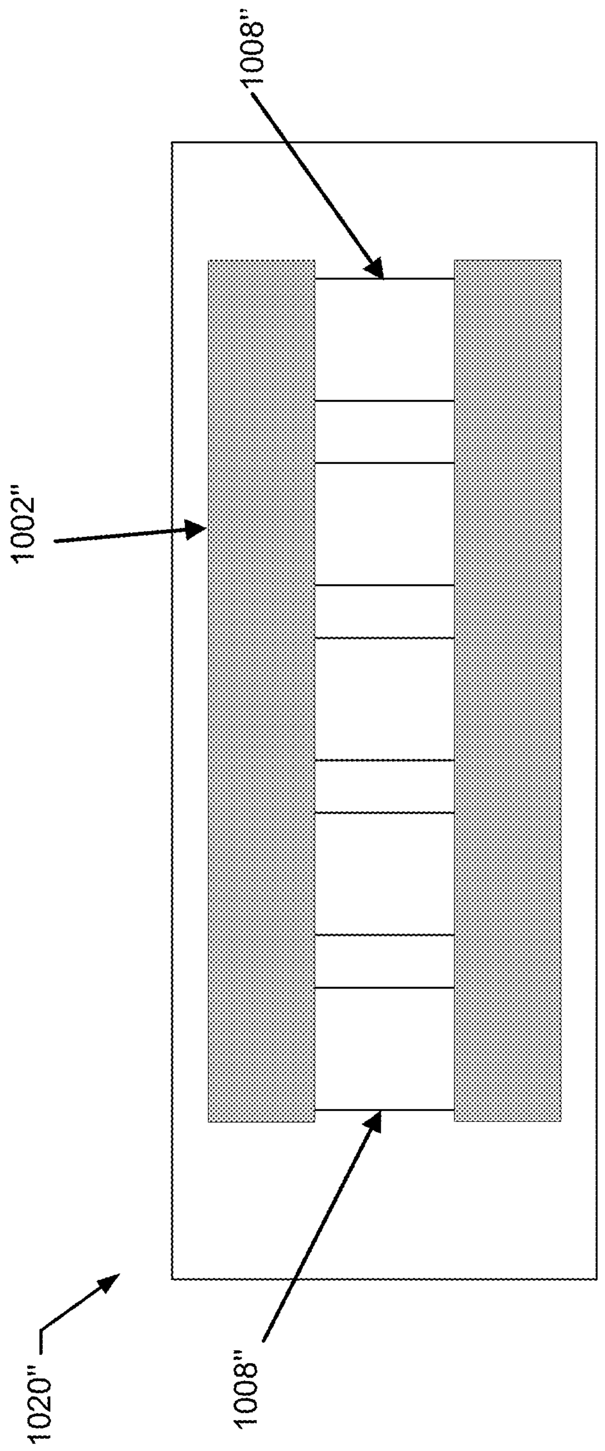
Figure 11A:
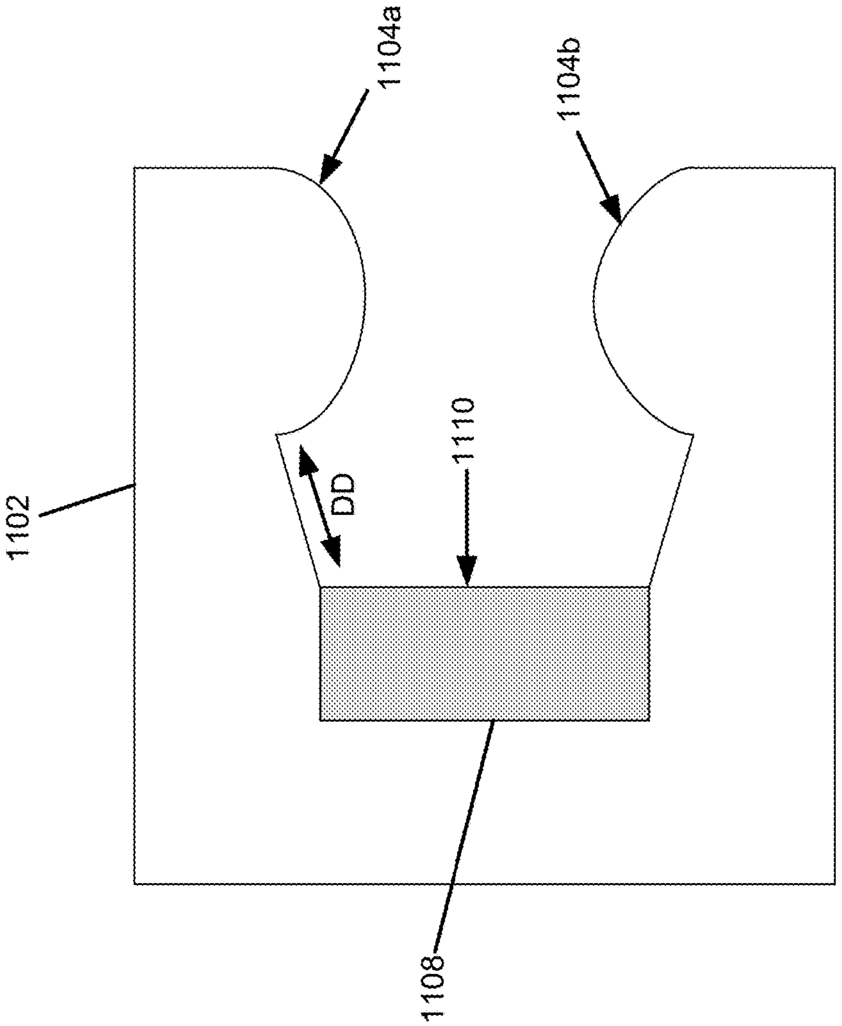
Figure 11B:
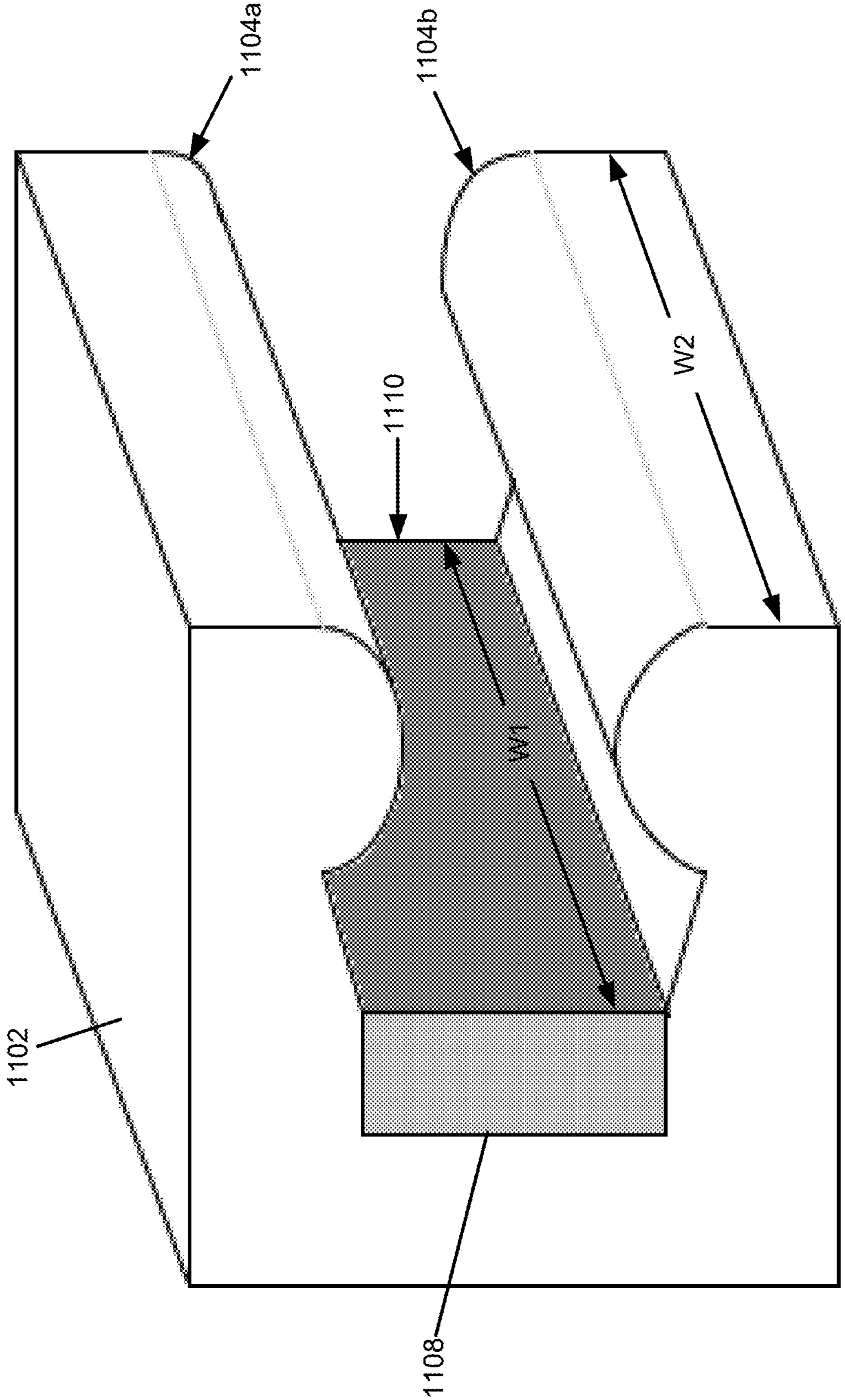
Figure 12A:
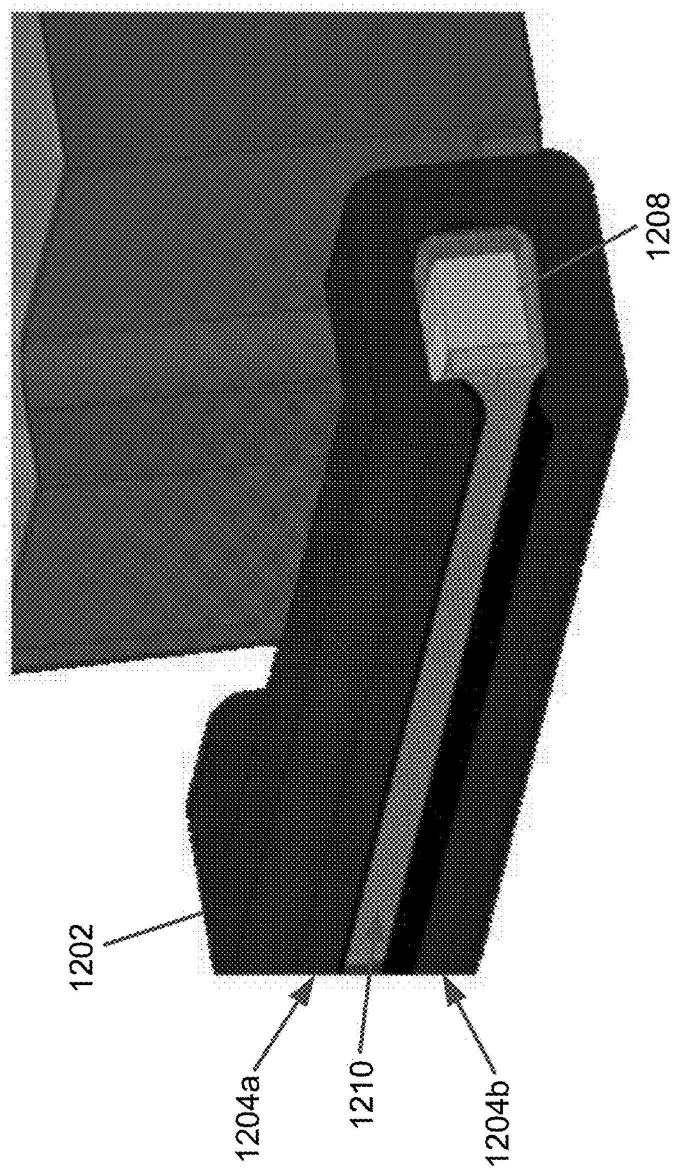
Figure 12B:
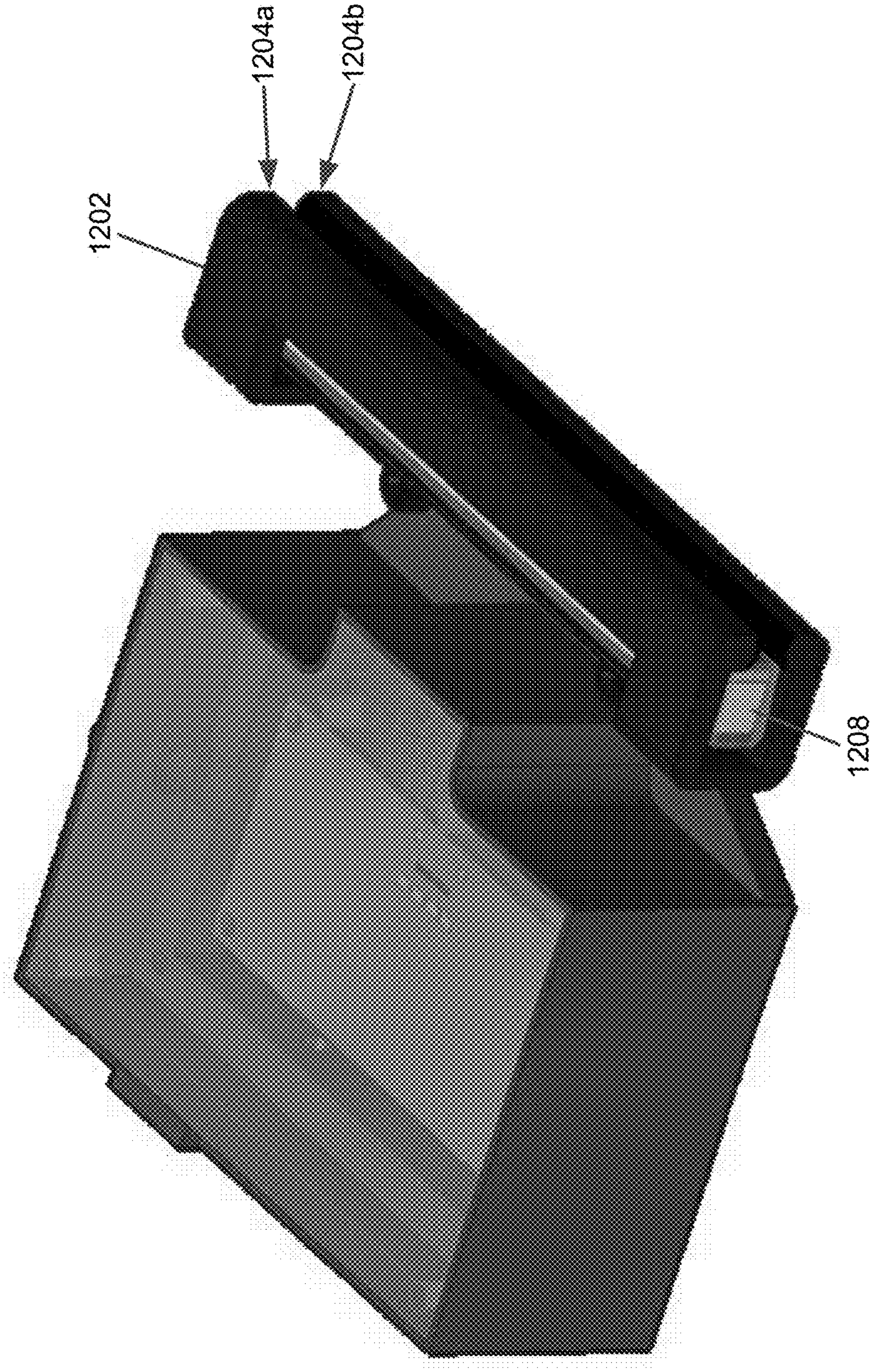
Figure 13:
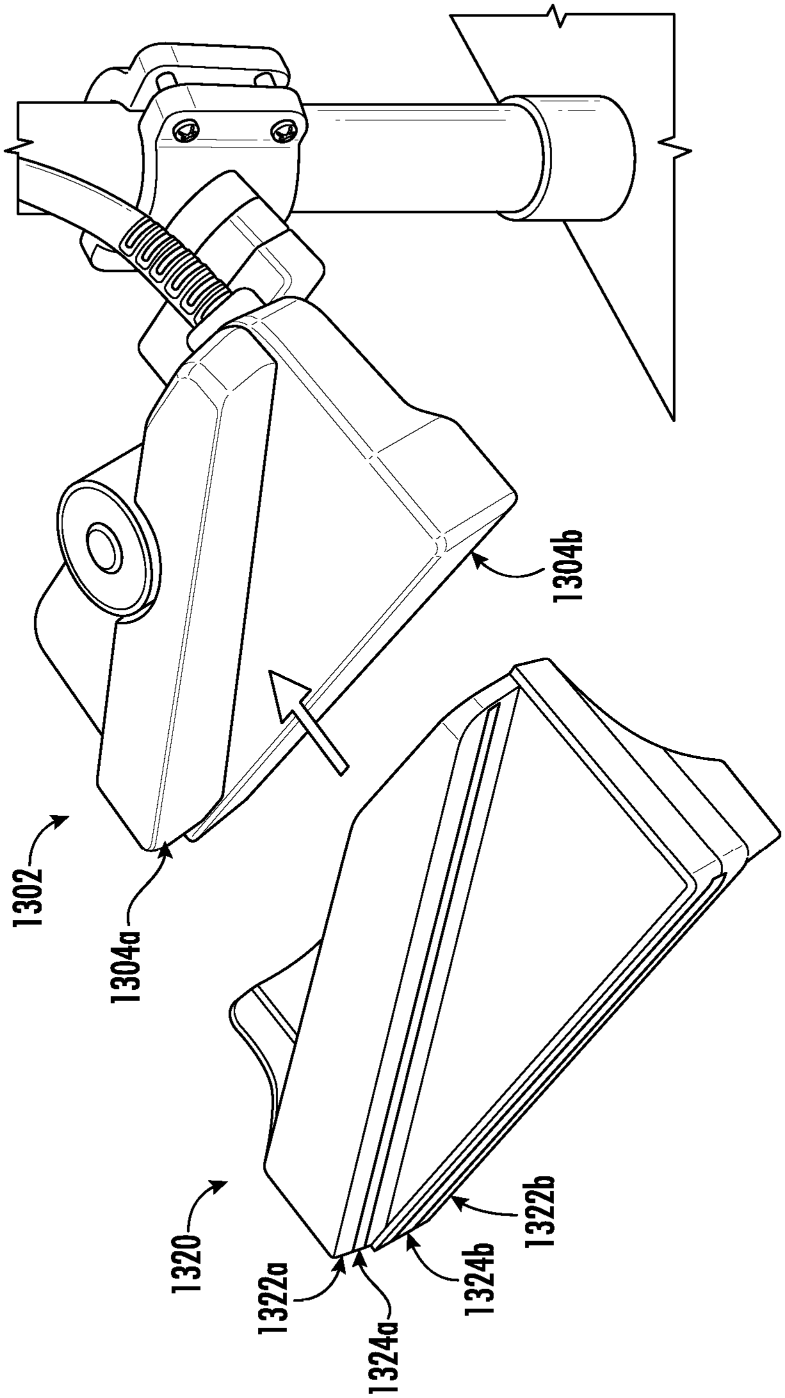
Figure 14A:
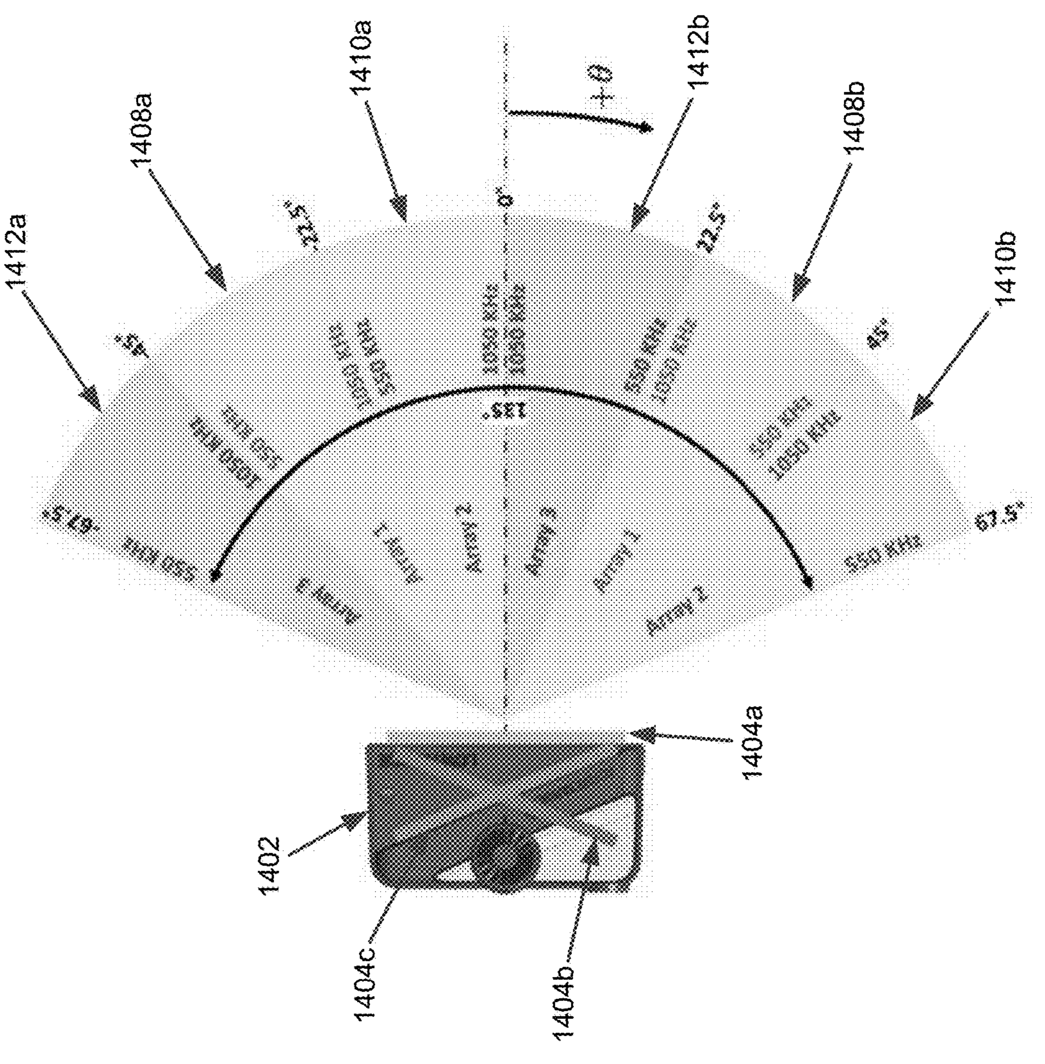
Figure 14B:
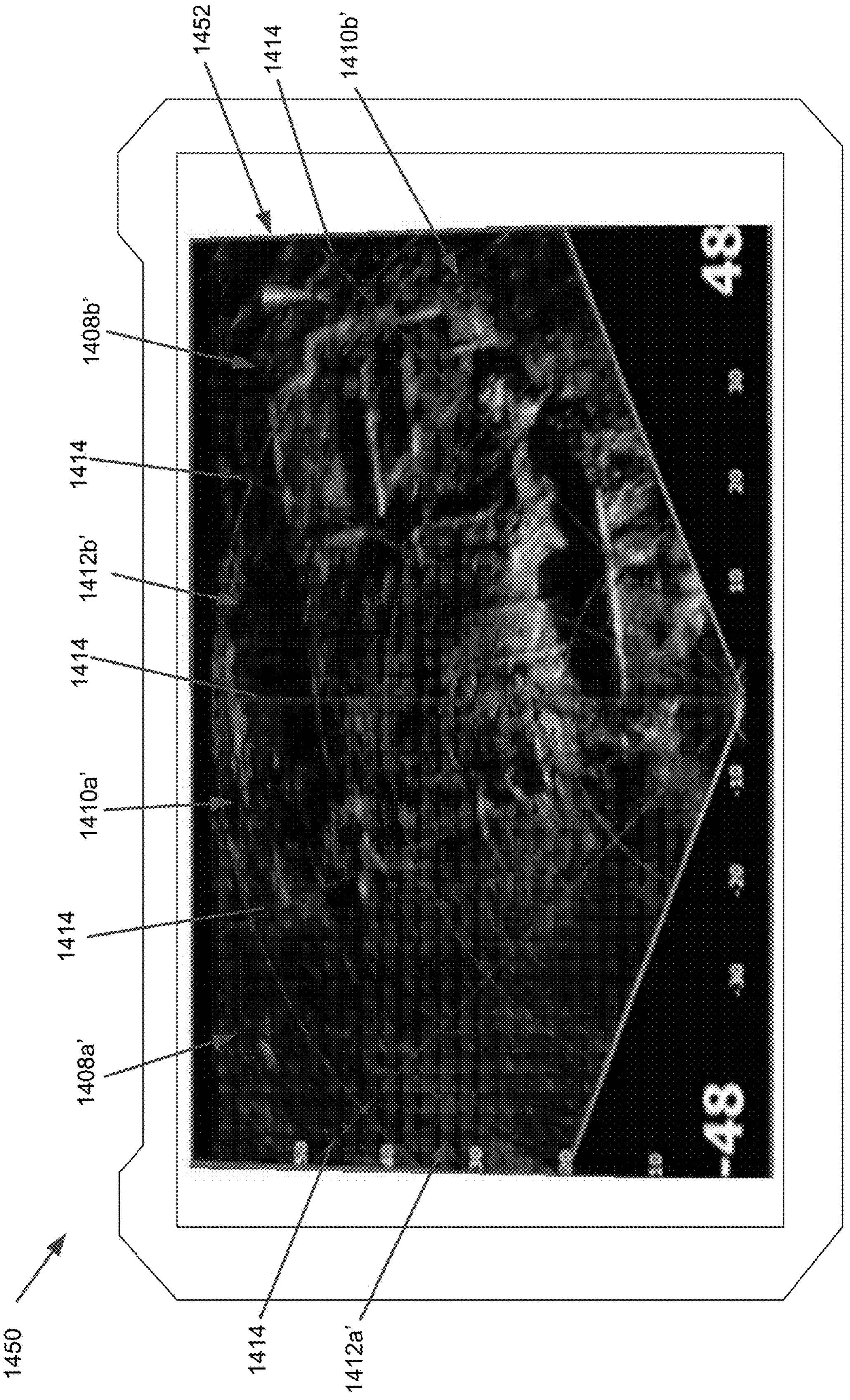
Figure 15B:
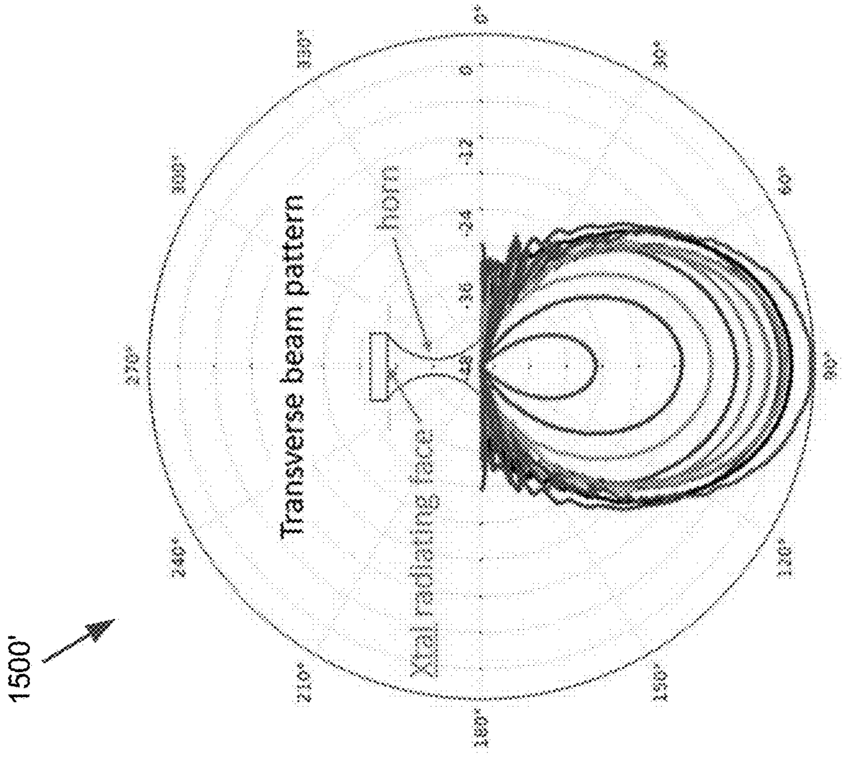
Figure 15A:
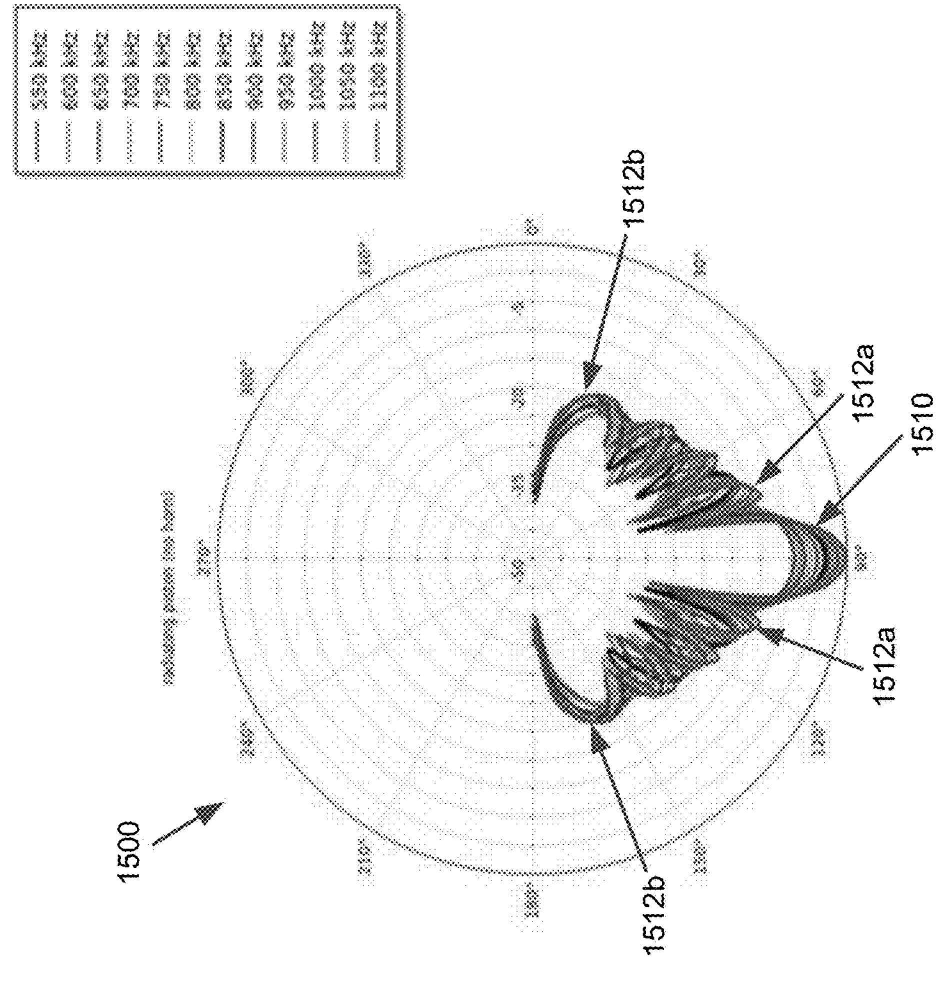
Figure 16A:
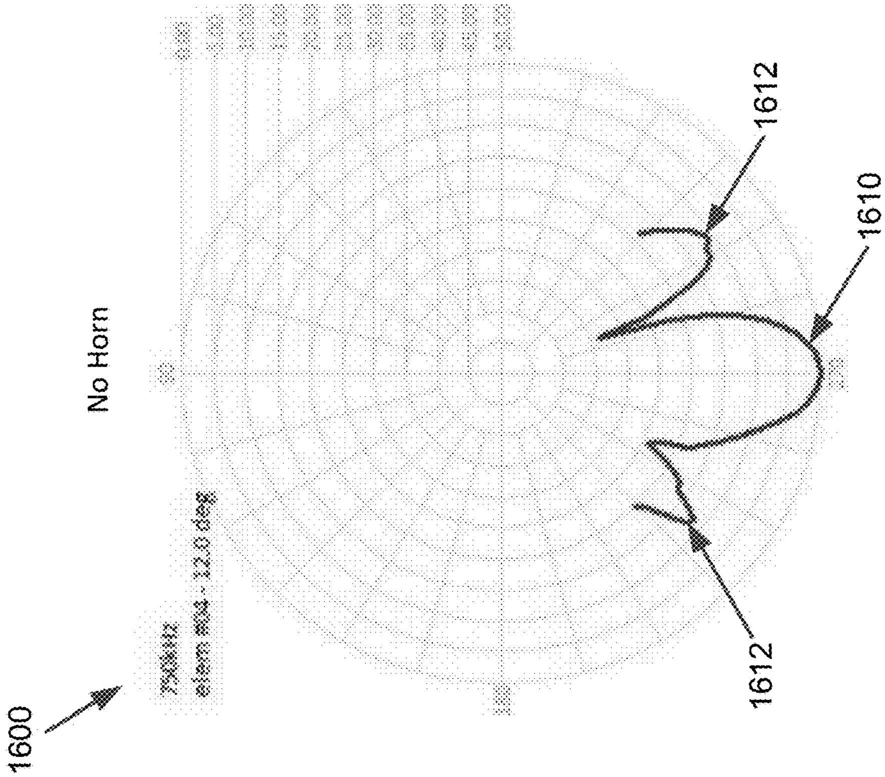
Figure 16B:
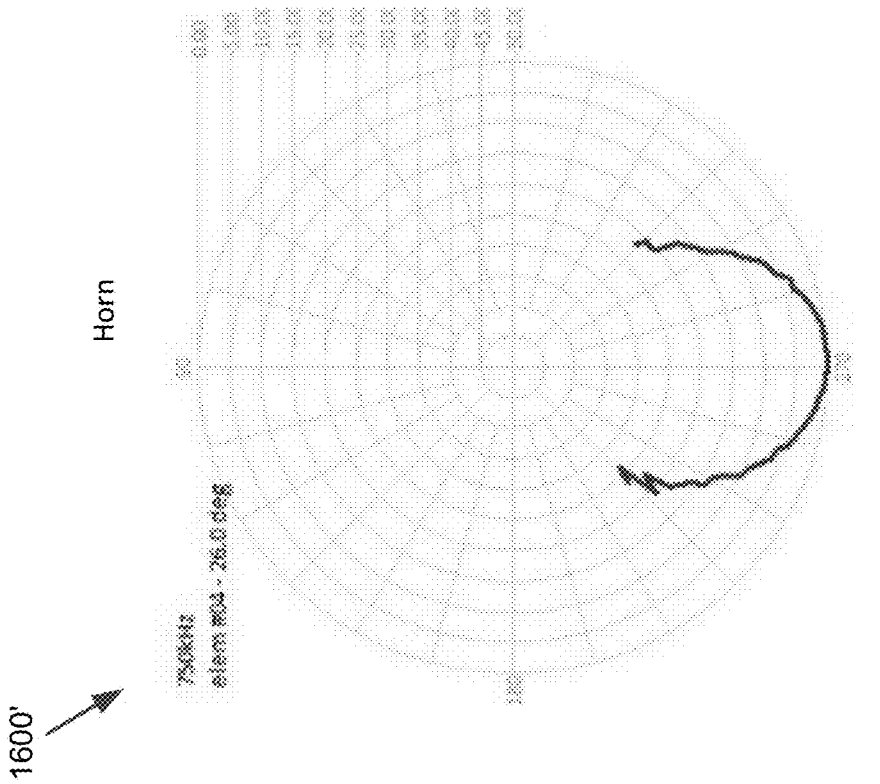
Figure 17B:
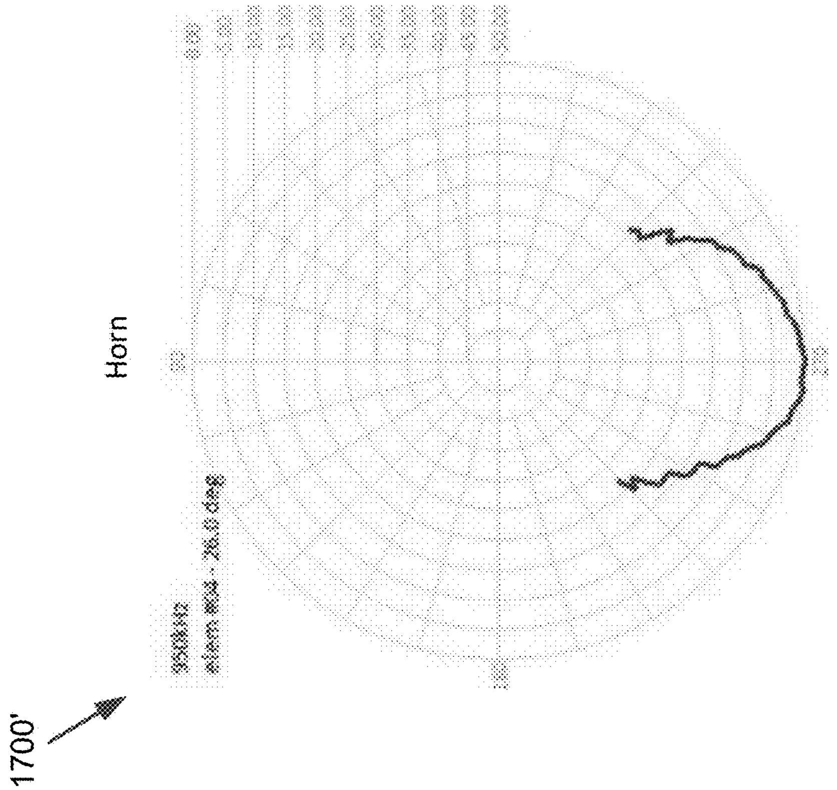
Figure 17A:
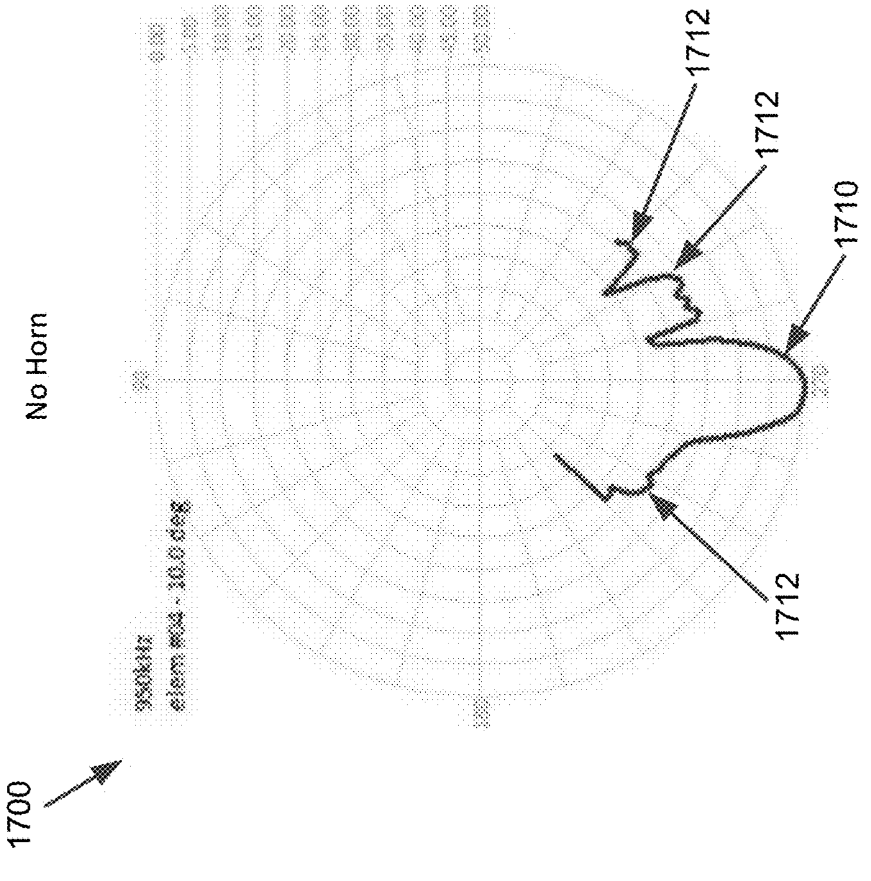
Figure 18:
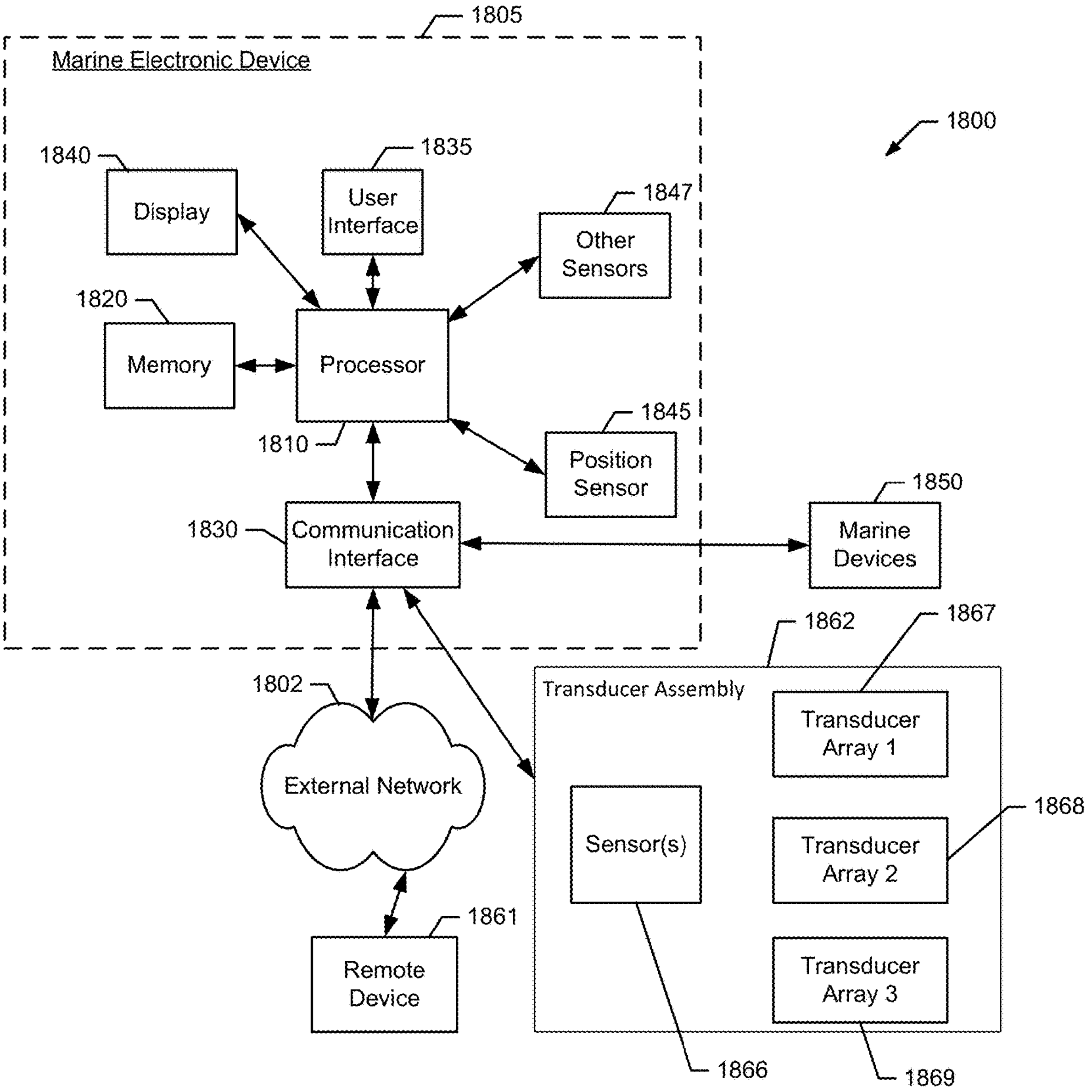
Figure 19:
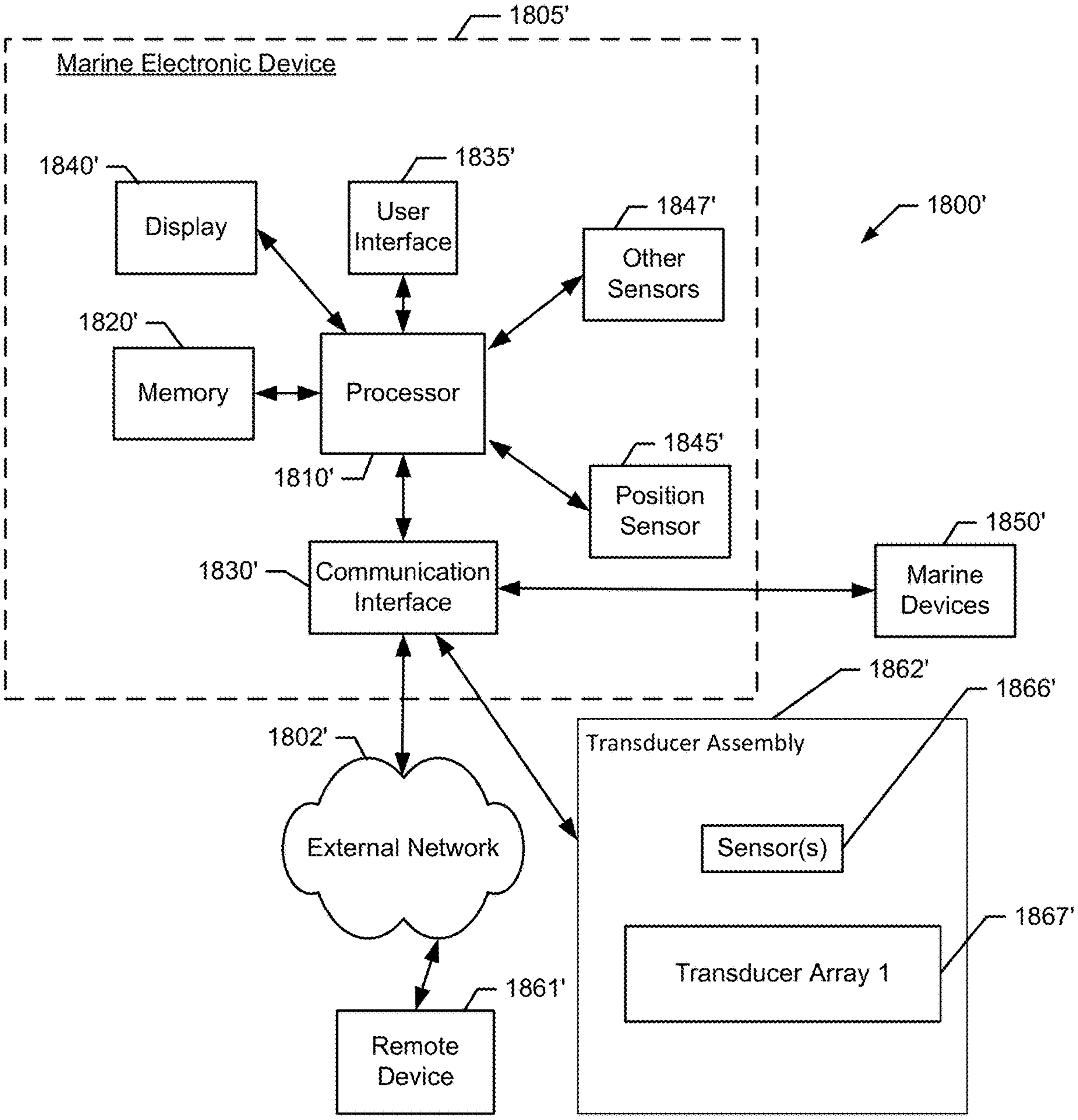
Figure 20A:
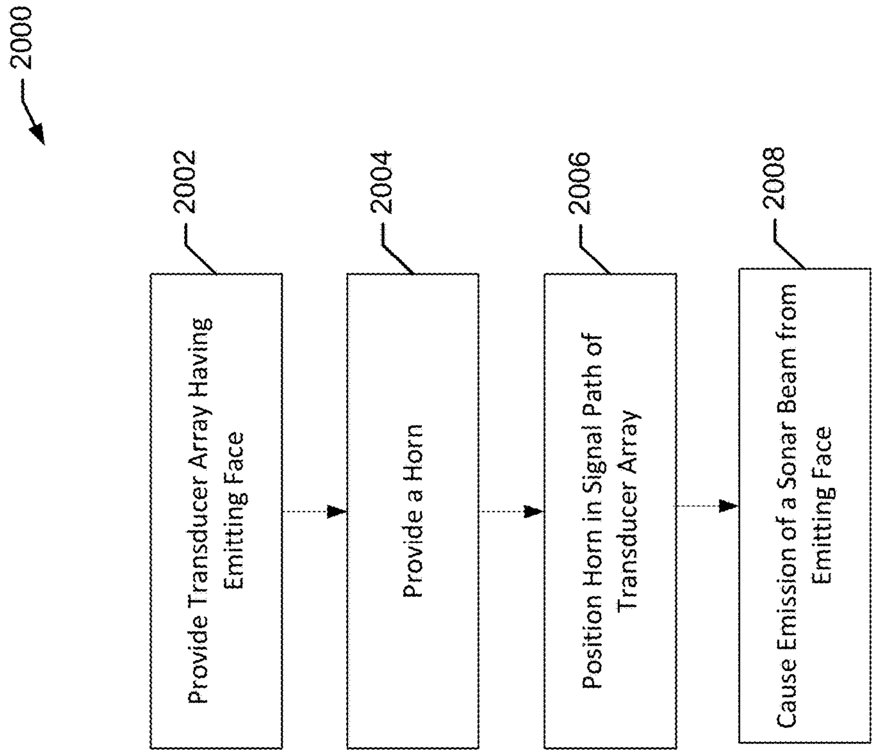
Figure 20B:
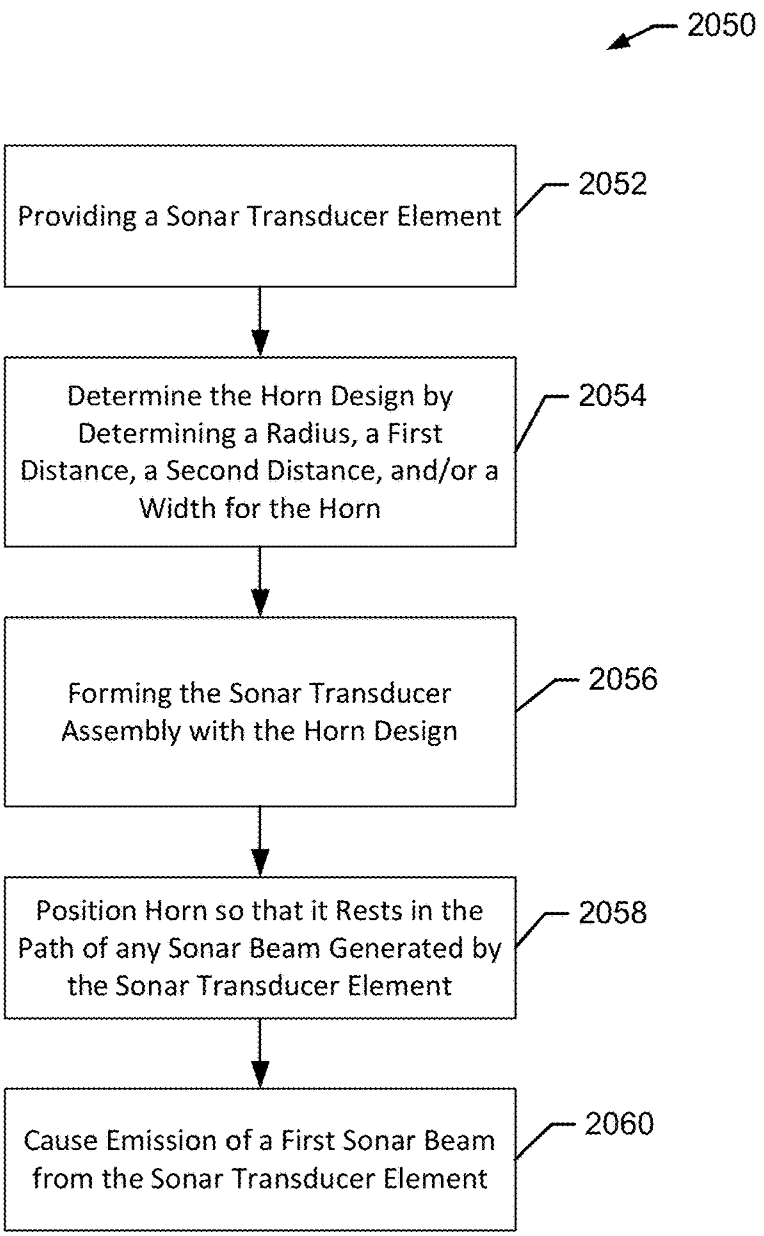
Figure 21:
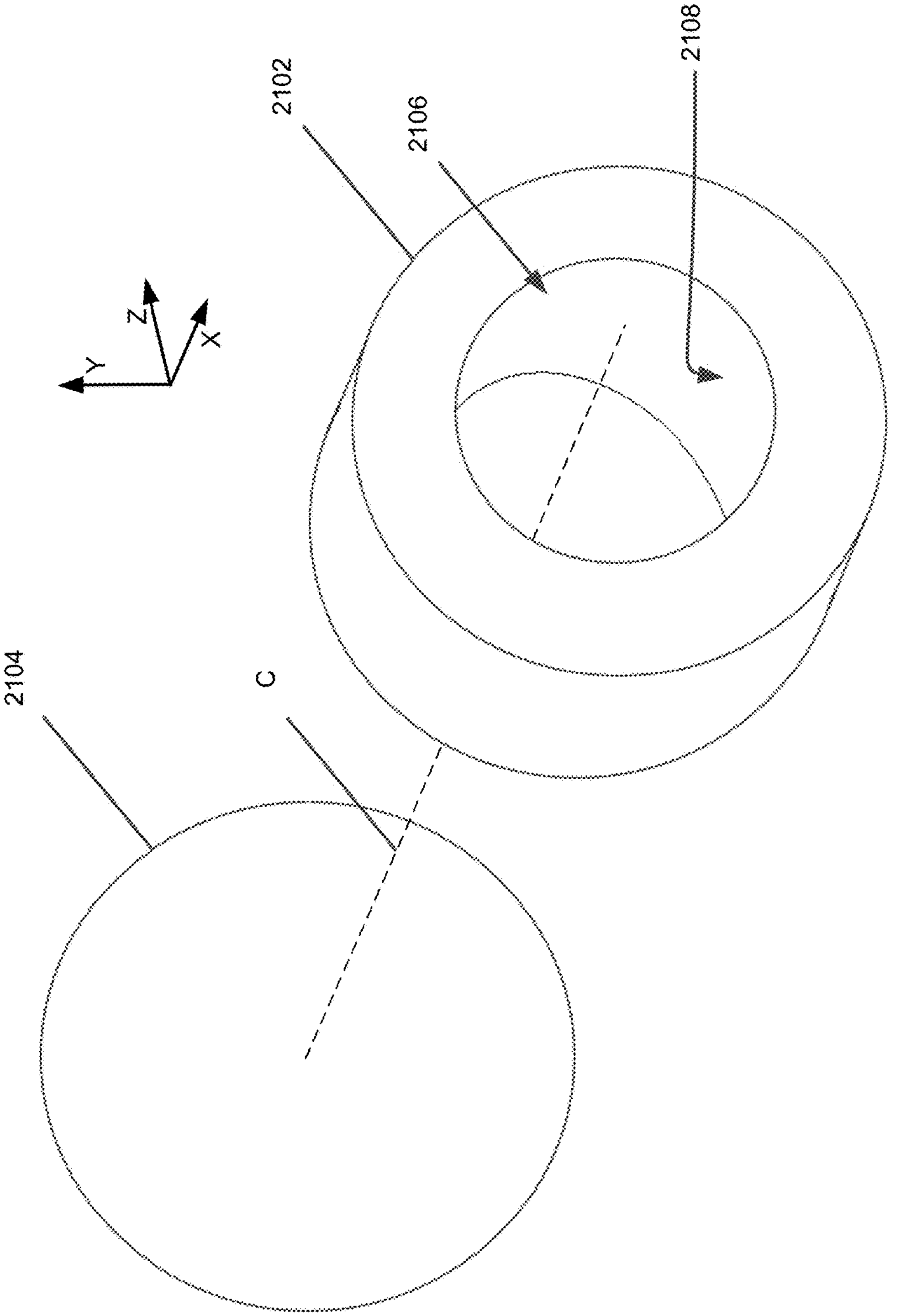
Figure 22:
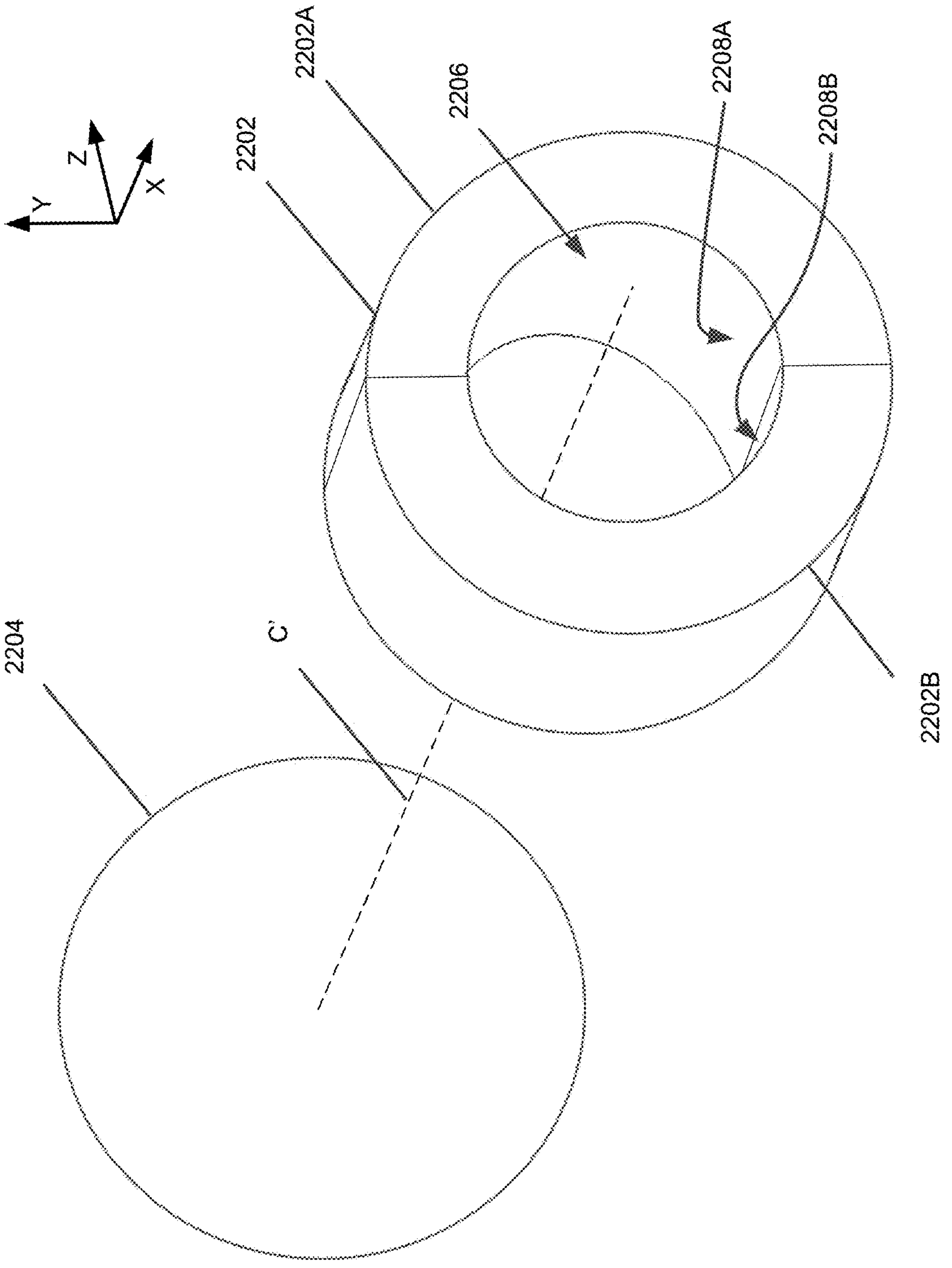
Figure 23:
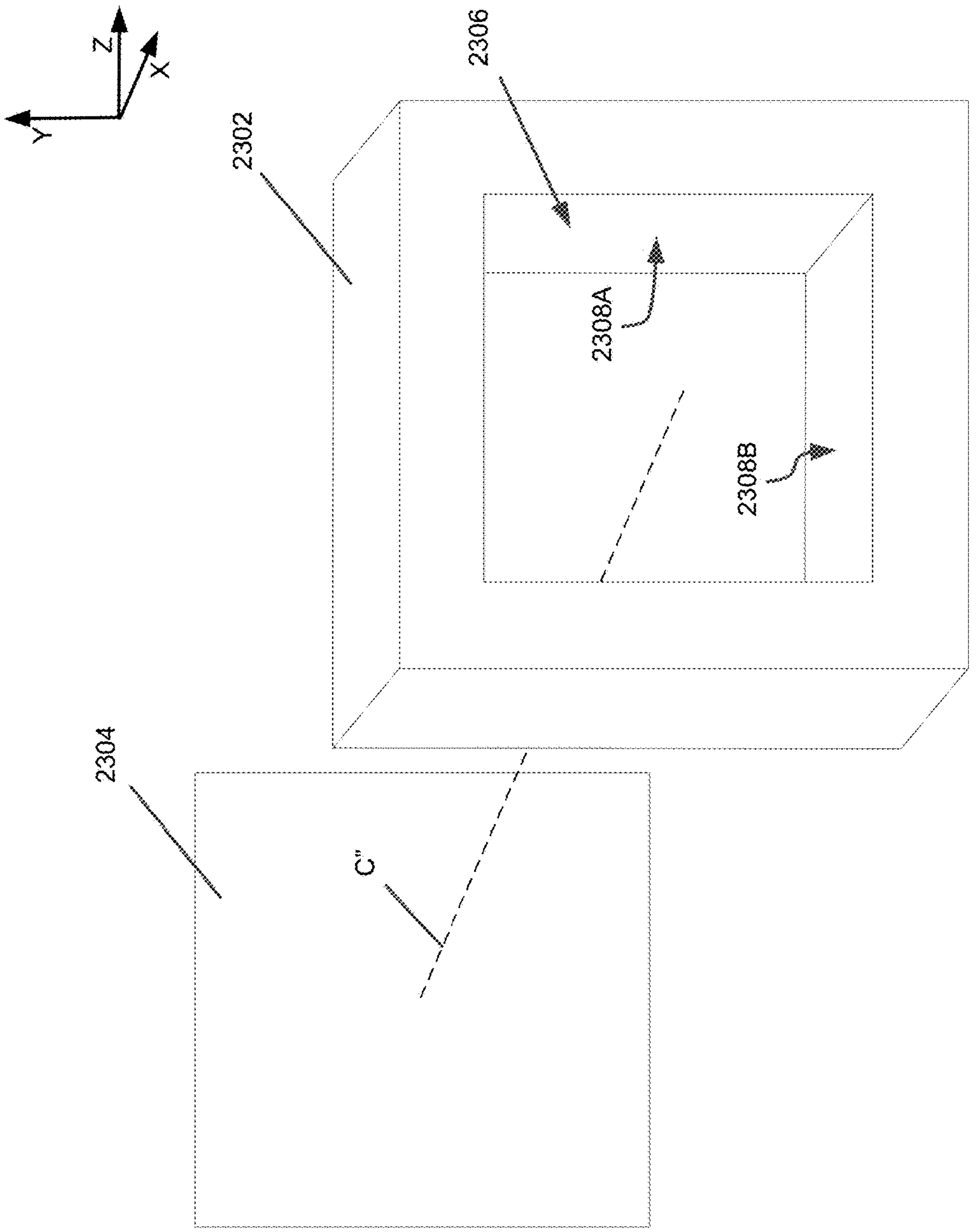
Figure 24A:
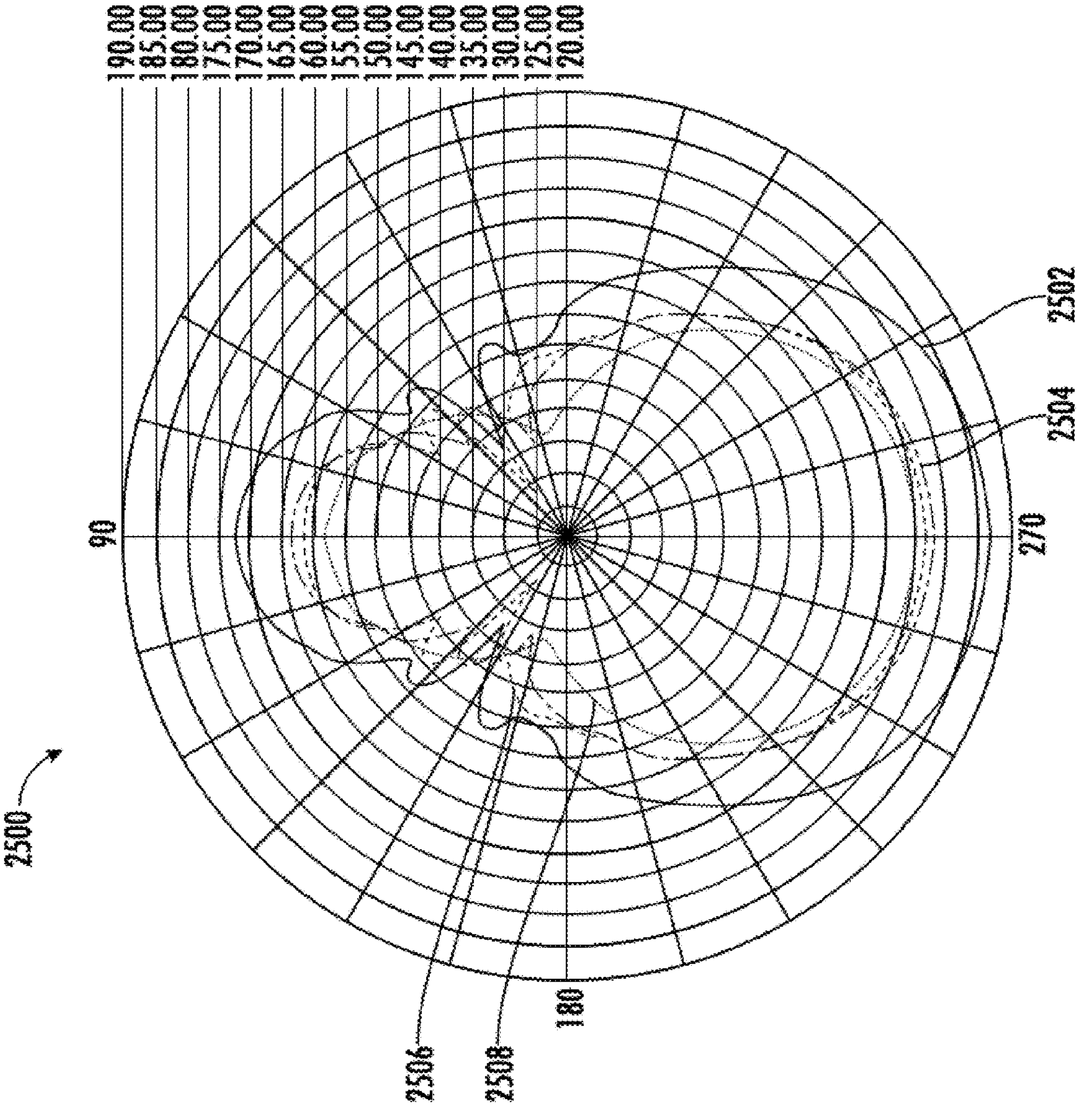
Figure 24B:
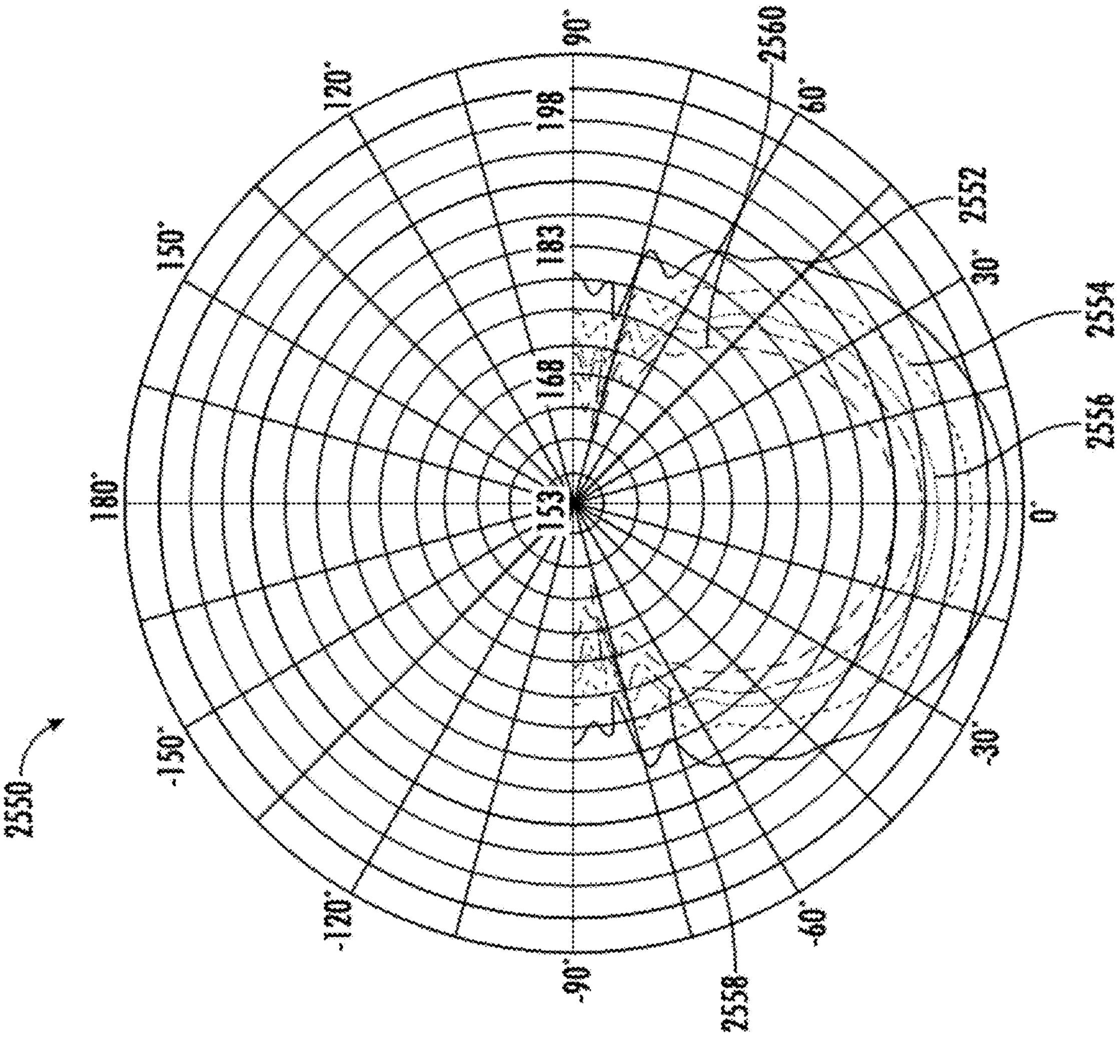

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3A illustrates three example arrays arranged to provide continuous sonar coverage utilizing beamformed sonar return beams, in accordance with some embodiments discussed herein;

FIG. 3B illustrates a first array shown in FIG. 3A along with its corresponding ranges of angles of beamformed sonar return beams, in accordance with some embodiments discussed herein;

FIG. 3C illustrates a second array shown in FIG. 3A along with its corresponding ranges of angles of beamformed sonar return beams, in accordance with some embodiments discussed herein;

FIG. 3D illustrates a third array shown in FIG. 3A along with its corresponding ranges of angles of beamformed sonar return beams, in accordance with some embodiments discussed herein;

FIG. 4 illustrates another example arrangement of three example arrays arranged to provide continuous sonar coverage utilizing beamformed sonar return beams, in accordance with some embodiments discussed herein;

FIG. 5A illustrates a perspective view of an example transducer assembly that includes three arrays, in accordance with some embodiments discussed herein;

FIG. 5B illustrates an exploded view of the example transducer assembly shown in FIG. 5A, in accordance with some embodiments discussed herein;

FIG. 5C illustrates a bottom perspective view of another example transducer assembly that includes three arrays, in accordance with some embodiments discussed herein;

FIGS. 6A-6B illustrate example mounting options for the example transducer assembly of FIG. 5A when mounted generally vertically, in accordance with some embodiments discussed herein;

FIGS. 7A-7B illustrate example mounting options for the example transducer assembly of FIG. 5A when mounted generally horizontally, in accordance with some embodiments discussed herein;

FIG. 8 illustrates a watercraft with an example transducer assembly utilizing three arrays to provide continuous sonar coverage, in accordance with some embodiments discussed herein;

FIG. 9 illustrates a schematic top plan view of the watercraft and sonar coverage shown in FIG. 8, in accordance with some embodiments discussed herein;

FIG. 10A illustrates a side schematic view of an example horn that is configured to reform the beam shape of a sonar beam generated by a sonar transducer element, in accordance with some embodiments discussed herein;

FIG. 10B illustrates a perspective schematic view of an example horn that is configured to reform the beam shape of a sonar beam generated by a sonar transducer element, in accordance with some embodiments discussed herein;

FIG. 10C illustrates a schematic view of an example horn and an expanded sonar beam, in accordance with some embodiments discussed herein;

FIG. 10D illustrates a schematic view of an example sonar transducer assembly where dimensions of the sonar transducer assembly and the horn therein are included, in accordance with some embodiments discussed herein;

FIG. 10E illustrates an example array of transducer elements, with an individual horn installed for each sonar transducer element, in accordance with some embodiments discussed herein;

FIG. 10F illustrates an example array of transducer elements, with a single horn is provided that expands the sonar beams generated for multiple sonar transducer elements, in accordance with some embodiments discussed herein;

FIG. 11A illustrates a side schematic view of an alternative horn that is configured to reform the beam shape of a sonar beam generated by a sonar transducer element, in accordance with some embodiments discussed herein;

FIG. 11B illustrates a perspective schematic view of an alternative horn that is configured to reform the beam shape of a sonar beam generated by a sonar transducer element, in accordance with some embodiments discussed herein;

FIGS. 12A-12B illustrate various perspective views of another alternative horn that is used to reform the beam shape of a sonar beam generated by a sonar transducer element, in accordance with some embodiments discussed herein;

FIG. 13 illustrates an example sleeve that is configured to be secured on a transducer assembly, in accordance with some embodiments discussed herein;

FIG. 14A illustrates an example sonar transducer assembly with three sonar transducer arrays that, together, provide 135 degrees of coverage, in accordance with some embodiments discussed herein;

FIG. 14B illustrates an example marine electronic device presenting a sonar image with high resolution, wherein the sonar image is formed using sonar return data similar to the sonar transducer assembly of FIG. 14A, in accordance with some embodiments discussed herein;

FIG. 15A illustrates transverse beam patterns generated by a sonar transducer array at various frequencies where no horn is used, in accordance with some embodiments discussed herein;

FIG. 15B illustrates transverse beam patterns generated by a sonar transducer array at various frequencies where a horn is used, in accordance with some embodiments discussed herein;

FIG. 16A illustrates a transverse beam pattern generated by a sonar transducer array at a frequency of 750 kHz where no horn is used, in accordance with some embodiments discussed herein;

FIG. 16B illustrates a transverse beam pattern generated by a sonar transducer array at a frequency of 750 kHz where a horn is used, in accordance with some embodiments discussed herein;

FIG. 17A illustrates a transverse beam pattern generated by a sonar transducer array at a frequency of 950 kHz where no horn is used, in accordance with some embodiments discussed herein;

FIG. 17B illustrates a transverse beam pattern generated by a sonar transducer array at a frequency of 950 kHz where a horn is used, in accordance with some embodiments discussed herein;

FIG. 18 is a block diagram of an example sonar system, in accordance with some embodiments discussed herein;

FIG. 19 is a block diagram of another example sonar system, in accordance with some embodiments discussed herein;

FIG. 20A illustrates a flowchart of an example method of operating a sonar system with a horn according to some embodiments discussed herein;

FIG. 20B illustrates a flowchart of an example method of manufacturing a sonar transducer assembly, in accordance with some embodiments discussed herein;

FIG. 21 illustrates an exploded, perspective view of an example annular shaped horn and a conical transducer element, in accordance with some embodiments discussed herein;

FIG. 22 illustrates an exploded, perspective view of another example annular shaped horn and a conical transducer element, in accordance with some embodiments discussed herein;

FIG. 23 illustrates an exploded, perspective view of another rectangular shaped horn and a rectangularly shaped transducer element, in accordance with some embodiments discussed herein;

FIG. 24A illustrates a graph including beam patterns for various sonar transducer assemblies having different horn designs, in accordance with some embodiments discussed herein; and FIG. 24B illustrates a graph including beam patterns for various sonar transducer assemblies where different frequencies are utilized, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements Like reference numerals refer to like elements throughout.

FIG. 1 illustrates an example watercraft including various sonar transducer assemblies, in accordance with some embodiments discussed herein. FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, and may use one or more sonar transducer assemblies 102*a*, 102*b*, and 102*c* disposed on and/or proximate to the watercraft. Notably, the example watercraft contemplated herein may be surface watercraft, submersible watercraft, or any other implementation known to those skilled in the art. The transducer assemblies 102*a*, 102*b*, and 102*c* may each include one or more transducer elements (such as in the form of the example arrays described herein) configured to transmit sound waves into a body of water, receive sonar returns from the body of water, and convert the sonar returns into sonar return data.

Depending on the configuration, the watercraft 100 may include a primary motor 105, which may be a main propulsion motor such as an outboard or inboard motor. Additionally, the watercraft 100 may include a trolling motor 108 configured to propel the watercraft 100 or maintain a position. The one or more transducer assemblies (e.g., 102*a*, 102*b*, and/or 102*c*) may be mounted in various positions and to various portions of the watercraft 100 and/or equipment associated with the watercraft 100. For example, the transducer assembly may be mounted to the transom 106 of the watercraft 100, such as depicted by transducer assembly 102*a*. The transducer assembly may be mounted to the bottom or side of the hull 104 of the watercraft 100, such as depicted by transducer assembly 102*b*. The transducer assembly may be mounted to the trolling motor 108, such as depicted by transducer assembly 102*c*.

The watercraft 100 may also include one or more marine electronic devices 160, such as may be utilized by a user to interact with, view, or otherwise control various aspects of the various sonar systems described herein. In the illustrated embodiment, the marine electronic device 160 is positioned proximate the helm (e.g., steering wheel) of the watercraft 100—although other places on the watercraft 100 are contemplated. Likewise, additionally or alternatively, a user's mobile device may include functionality of a marine electronic device.

The watercraft 100 may also comprise other components within the one or more marine electronic devices 160 or at the helm. For example, the watercraft 100 may have a radar, an AIS transceiver, a direction sensor, a camera, and these components may each positioned at or near the helm (although other positions relative to the watercraft are also contemplated). Additionally, the watercraft 100 comprises a rudder 110 at the stern of the watercraft 100, and the rudder 110 may be positioned on the watercraft 100 so that the rudder 110 will rest in the body of water 101. In other embodiments, these components may be integrated into the one or more electronic devices 160 or other devices. Other example devices such as a temperature sensor, a wind sensor, one or more speakers, and various vessel devices/features (e.g., doors, bilge pump, fuel tank, etc.) may be used.

FIGS. 2A-2C illustrate an example array 220 of transducer elements 208 that may be utilized with various embodiments of the present invention, such as within an example transducer assembly described herein. In some embodiments, the transducer array 220 may include a plurality of transducer elements 208 arranged in a line and electrically connected relative to each other. For example, the transducer elements 208 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals. Unless otherwise stated, although FIGS. 2A-2C illustrate a linear array with transducer elements of a certain shape, different types of arrays (or sub-arrays), transducer elements, spacing, shapes, etc. may be utilized with various embodiments of the present invention.

In the illustrated embodiment shown in FIG. 2A, the sonar transducer array 220 includes an emitting face 221 with a length $L_A$ and a width $W_A$, where the length is greater than the width. Within the array 220, each transducer element 208 defines an emitting face 209 with a length $L_T$ and a width $W_T$, where the length is greater than the width. The length of each transducer element 208 is perpendicular to the length of the emitting face 221. Each transducer element 208 is spaced at a predetermined distance from an adjacent transducer element, which may be designed based on desired operating characteristics of the array 220, such as described herein. Sonar transducer arrays 220 may comprise one or more sonar transducer elements 208, and, in some embodiments, the sonar transducer array 220 may have only one sonar transducer element 208. The sonar transducer arrays may be configured to operate at a frequency between 400 kHz and 1300 kHz in some embodiments. In some embodiments, the sonar transducer arrays are configured to operate at a frequency of between 550 kHz and 1100 kHz.

In some embodiments, the array 220 of transducer elements 208 is configured to operate to transmit one or more sonar beams into the underwater environment. Depending on the configuration and desired operation, different transmission types of sonar beams can occur. For example, in some embodiments, the array 220 may transmit sonar beams according to a frequency sweep (e.g., chirp sonar) so as to provide sonar beams into the underwater environment. In some embodiments, the array 220 may be operated to frequency steer transmitted sonar beams into various volumes of the underwater environment. In some embodiments, the array 220 may be operated to cause a broadband transmit sonar beam to be sent into the underwater environment. Depending on the frequency used and phase shift applied between transducer elements, different volumes of the underwater environment may be targeted.

In some embodiments, the array 220 may be configured to receive sonar return signals. The way the sonar return signals are received and/or processed may vary depending on the desired sonar system configuration. FIGS. 2B-2C illustrate the array 220 with example possible sonar return beam coverage according to various example embodiments. In this regard, in some embodiments, each of the plurality of transducer elements are configured to operate at a fixed phase shift (e.g., at one of 0°, π/2 radian, π/4 radian, or π/8 radian) and vary in frequency (e.g., between 500 kHz-1200 kHz). This processing approach beamforms multiple sonar return beams (e.g., beam 280) between a first range of angles ($\theta_1$) 281 and between a second range of angles ($\theta_2$) 282. To explain, the sonar returns may be received by the array 220 and filtered into frequency bins based on the frequency of the signal. From that, sonar return beams 280 can be determined that provide sonar returns within a small angle window (e.g., 0.5° to 1°, although greater or lesser angle windows are contemplated). Since the mounting orientation with respect to the watercraft can be known, and the frequency is known, then the relative angle with respect to the waterline (or other reference) can be determined and used to form sonar imagery, as described herein.

With further reference to FIG. 2B, the sonar return beams (e.g., 280) can be "steered" (e.g., along arrow R) within the first range of angles 281 based on varying the frequency (e.g., between 291*a* and 291*b*). Likewise, the sonar return beams can be "steered" within the second range of angles 282 based on varying the frequency (e.g., between 292*a* and 292*b*). By operating the transducer elements at a fixed phase shift, the two range of angles 281, 282 can be covered with sonar beams, but there is also a gap (e.g., indicated by the range of angles β) that is not able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 280) that extends outwardly therefrom. By operating at a fixed phase shift and ignoring the main beam lobe, the sonar return signals received within the side lobe can be determined. Further, changing the frequency causes a shifting of the direction of the side lobe among the range of angles (281 or 282). Since the side lobe is symmetrical about the main lobe, there are two ranges of angles that are symmetrical about the facing direction $D_{FD}$ of the emitting face 221 of the array 220.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5° and a second range of angles spanning ~22.5° with a gap of range of angles of ~45° therebetween. Additionally, sonar return beams of ~0.5°-1° are formed. Further, with reference to FIG. 2C, a transverse beamwidth $\theta_3$ of ~20° is formed (although other transverse beamwidths are contemplated such as between ~9° and 27°). Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to increase coverage volume of the underwater environment. For example, in some embodiments, a second (or more) array(s) can be added and tilted relative to the first array such that the gap within the first array is "covered" by one or more of the range of angles of sonar return beams from such array(s). FIG. 3A illustrates an example three array assembly 310 that is designed to provide continuous sonar coverage utilizing beamformed sonar return beams. The sonar assembly 310 includes a first array 340, a second array 330, and a third array 320. The first array 340 (shown by itself in FIG. 3B), is oriented with a facing direction (e.g., substantially straight down relative to the figure) so as to produce a first range of angles 341 and a second range of angles 342 (with a gap in between). The second array 330 (shown by itself in FIG. 3C), is oriented with a facing direction at an angle (e.g., −22.5° relative to the facing direction of the first array 340) so as to produce a first range of angles 331 and a second range of angles 332 (with a gap in between). The third array 320 (shown by itself in FIG. 3D), is oriented with a facing direction at another angle (e.g., −45° relative to the facing direction of the first array 340) so as to produce a first range of angles 321 and a second range of angles 322 (with a gap in between). As so arranged, the gaps between each set of the two range of angles are covered by a range of angles from each of the other two arrays. The illustrated example thus provides continuous sonar beam coverage for ~135°.

FIG. 4 illustrates another example transducer assembly 510 that includes an arrangement of three arrays arranged to provide continuous sonar coverage utilizing beamformed sonar return beams. Notably, while the first array 540 and the third array 520 are mounted and oriented similarly to the first and third arrays of the transducer assembly 310 of FIG. 3, the second array 530 of the transducer assembly 510 has been shifted (e.g., offset) while maintaining its relative angle orientation (e.g., it is still mounted with a facing direction at an angle (e.g., −22.5°) relative to the facing direction of the first array—just as in the transducer assembly 310). Thus, the transducer assembly 510 forms an "X" configuration for the first array 540 and the third array 520, but also has a line "_" at the bottom of the "X" corresponding to the second array 530. Notably, the same relative continuous sonar beam coverage is obtained (e.g., as the small relative shift from the centerpoint 315 in FIG. 3A does not significantly change the resulting beam coverage—particularly with respect to the distance covered in the underwater environment). For explanatory purposes, the various ranges of angles are shown extending from a slightly revised centerpoint 515.

FIG. 5A illustrates an example transducer assembly 602 including a housing 605 that houses the three arrays 620, 630, 640 (which are shown in exploded view in FIG. 5B). Notably, the housing 605 includes one or more mounting features (e.g., a ratchet-type mounting feature 604 for enabling secured attachment in different orientations). The cable 606 provides a safe channel for running various wires 607 used in conjunction with the arrays. Notably, the X plus line configuration of the arrays enables some benefits for the transducer assembly 602. For example, the housing 605 of the transducer assembly 602 may maintain a small footprint and still provide a straight bottom that enables a user to more easily comprehend the position of the center array (and, thus, determine and orient the transducer assembly 602 properly with respect to the watercraft for the desired coverage). With reference to FIG. 5B, the PCB 609 and the electrical connectors 603 are also shown for electrically connecting the arrays 620, 630, and 640. FIG. 5C illustrates an example transducer assembly 602' shown in an orientation that would provide similar beam coverage as shown in FIG. 4.

FIGS. 6A and 6B illustrates a transducer assembly 802 mounted to a pole 810 (e.g., a shaft of a trolling motor) using a mounting arm 806. The mounting arm 806 attaches via a fastener to the transducer assembly 802 at a first end 807 and to the pole 810 via a clamp 808 at a second end 805. The mounting arm 806 includes a bend that enables the transducer assembly 802 to be spaced from the pole 810 and oriented as desired (e.g., facing generally downward along arrow G). FIG. 6B illustrates the transducer assembly 802 mounted to the trolling motor housing 812 via a strap and clamp 804. The transducer assembly 802 may be oriented as desired (e.g., facing generally downward along the arrow G).

FIGS. 7A and 7B illustrate the transducer assembly 902 mounted in a different orientation. In FIG. 7A, the transducer assembly 902 is mounted to a pole 910 (e.g., a shaft of a trolling motor) using a mounting arm 906. The mounting arm 906 attaches via a fastener to the transducer assembly 902 at a first end 907 and to the pole 910 via a clamp 908 at a second end 905. The mounting arm 906 includes a bend that enables the transducer assembly 902 to be spaced from the pole 910 and oriented as desired (e.g., facing generally forward along arrow J). FIG. 7B illustrates the transducer assembly 902 mounted to the trolling motor housing 912 via a strap and clamp 904. The transducer assembly 902 may be oriented as desired (e.g., facing generally forward along the arrow J).

FIG. 8 illustrates a watercraft 100 with an example transducer assembly 702 utilizing three arrays to provide continuous sonar coverage 705 in the forward and downward directions relative to the watercraft 100. In this regard, the three arrays work together to provide corresponding ranges of angles 721, 722, 731, 732, 741, 742—similar to those shown and described with respect to FIG. 4. In the illustrated embodiments, the lengths of each of the emitting faces of the three arrays extend in the fore-to-aft direction of the watercraft.

As indicated herein, the frequency of the sonar return beams can be varied to provide a sonar return beam 706 that can sweep (e.g., along arrow A) within the sonar beam coverage 705 (e.g., across the three arrays)—to capture sonar return signals along the sonar beam coverage. FIG. 9 illustrates the sonar beam coverage 705 from a top view (with the beam coverage 705 projected onto a seafloor). As illustrated the sonar return beam 706 would sweep (e.g., along arrow B) across the sonar beam coverage 705.

In various example embodiments, a horn is provided that is configured to reform a sonar beam generated by a sonar transducer element or array in several beneficial ways. For example, (a) the horn may expand the field of view or angular coverage of a sonar transducer element/array along the transverse direction; (b) the horn may provide more consistent beam shapes regardless of variation in the operating frequency for the sonar transducer element/array; and (c) the horn may maintain the signal intensity at a more consistent level across a range of angles. FIG. 10A illustrates a side schematic view of an example horn assembly 1002 that is configured to reform the beam shape of a sonar beam generated by a sonar transducer element 1008. FIG. 10B illustrates the example horn assembly 1002 of FIG. 10A from a perspective view. The horn 1002 has a first diffraction surface 1004*a* and a second diffraction surface 1004*b*. The diffraction surfaces 1004*a*, 1004*b* may possess a curved and/or convex shape as illustrated. A sonar transducer element 1008 is also provided. This sonar transducer element 1008 may comprise an emitting face 1010. The sonar transducer element 1008 is a linear sonar transducer element, and the sonar transducer element 1008 may be utilized as a linear downscan sonar transducer element. The first diffraction surface 1004*a* and the second diffraction surface 1004*b* are configured so that they will be positioned in a path of the sonar beam when the horn 1002 is appropriately positioned, thereby reforming the beam shape of a sonar beam that emanates from the emitting face 1010. In the illustrated embodiment, the horn 1002 is configured to expand the transverse beam width or the field of view of a beam generated by sonar transducer element 1008.

As illustrated in FIG. 10C, the horn 1002 may increase the range of angles from $\theta_A$ to $\theta_B$. As will be described further below, the horn 1002 may also be configured to maintain a more consistent beam shape regardless of the frequency at which the sonar transducer element 1008 is operating, and the horn 1002 may also maintain a more consistent intensity of sonar transducer signals across the range of angles within the beam path. FIG. 10C illustrates a schematic view of an example horn and an expanded sonar beam generated by the horn, in accordance with some embodiments discussed herein. As illustrated, the sonar transducer element 1008 generates a range of angles that create a signal path 1081*a*. A horn 1002 is introduced into the signal path 1081*a* of the sonar beam generated by the sonar transducer element 1008. The horn 1002 comprises at least one diffraction surface. Notably, the illustrated horn 1002 comprises two diffraction surfaces 1004*a*, 1004*b*. The diffraction surfaces 1004*a*, 1004*b* may be introduced into the signal path 1081*a*. The diffraction surfaces 1004*a*, 1004*b* may possess a curved and/or convex shape as illustrated in FIG. 10C. By placing the horn 1002 or a diffraction surface 1004*a*, 1004*b* of the horn 1002 in the signal path 1081*a*, the signal path 1081*a* may be reformed. The convex diffraction surfaces 1004*a*, 1004*b* may be positioned opposite each other across the path 1081*a* of the sonar beam, and each of the curved, convex diffraction surfaces 1004*a*, 1004*b* may be configured to protrude outwardly into the path 1081*a* of the sonar beam. As illustrated, the signal path 1081*a* is reformed to generate a new signal path 1081*b* with an expanded range of angles $\theta_B$. The horn 1002 may also affect the sonar beam in other ways, maintaining the signal intensity at a more consistent level across the range of angles and maintaining more consistent beam shapes regardless of variation in the operating frequency for the sonar transducer element 1008. The horn 1002 may also be shaped to redirect the beam such that the center of the beam is guided away at an angle relative to the normal of the radiating surface. For example, the horn 1002 may form a sound path that may reform the sonar beam to travel along the sound path (e.g., turning one or more times, expanding and retracting one or more times, redirecting the emission direction of the center of the beam, etc.).

FIG. 10D illustrates various dimensions of an example horn 1002 and a sonar transducer assembly. A first distance (D1) and a second distance (D2) are illustrated in FIG. 10D. This first distance (D1) is a minimum distance separating the first diffraction element having the first diffraction surface 1004*a* and the second diffraction element having the second diffraction surface 1004*b*. The second distance (D2) is the distance that the sonar beam travels in the signal path 1081*a* between the emitting face 1010 and a curved portion of the first diffraction element or the second diffraction element. This second distance (D2) may be the minimum distance that the sonar beam travels in the signal path 1081*a* between the emitting face 1010 of the sonar transducer element 1008 and a curved portion of the first diffraction element or the second diffraction element in some embodiments. Additionally, the curved portions of the first diffraction element and the second diffraction element each define a radius (R1). However, in some embodiments, the curved portions of the first diffraction element and the second diffraction element may define another type of curvature. For example, the curvature may be a parabolic shape or a sinusoidal shape. As another example, the curvature may be defined by a plurality of rectilinear surfaces that make up a curved shape, but the diffractions surfaces 1004*a*, 1004*b* may define other shapes as well. Furthermore, as illustrated in FIG. 11B and discussed further herein, a horn 1102 may define a width (W2), and the width (W2) may match the width (W1) of the emitting face 1110 of the sonar transducer element 1108.

In some embodiments, the sonar transducer assembly may be made by determining one or more of the first distance (D1), the second distance (D2), the radius (R1), and the width (W2) to optimize the overall sensitivity of the sonar transducer element (and the sonar transducer assembly as a whole) when the sonar transducer element is operated at an operating frequency. Once these parameters have been determined, the sonar transducer assembly may be formed in a manner that utilizes each of these parameters. For example, where the operating frequency of the sonar transducer element 1008 is 206 kilohertz, the resultant sensitivity of the sonar transducer element may be optimized to a level of 187.00 decibels or higher by utilizing a radius (R1) of 7 millimeters, a first distance (D1) of 5 millimeters, a second distance (D2) of 0.5 millimeters, and a width (W2) of 5 millimeters. However, the parameters may possess other values, and only some of the parameters are determined in some embodiments. By determining some or all of the parameters and making the sonar transducer assembly based on the parameters of the horn design, the sonar transducer assembly may result in a resulting sensitivity increase over an otherwise identical sonar transducer assembly that does not utilize any horn. In some embodiments, the resulting sensitivity increase may be, for example, 5 decibels, 10 decibels, or 12 decibels or more over an otherwise identical sonar transducer assembly that does not utilize any horn. The horn 1002 may comprise a variety of materials. In one embodiment, the horn 1002 comprises rubber material. In some embodiments, the horn 1002 may comprise a soft close-cell foam rubber sheet. The horn 1002 provides a cost-effective solution for expanding the angular coverage of a sonar beam in the transverse direction.

FIGS. 10A and 10B illustrate a horn 1002 that wraps around the sonar transducer element 1008, leaving only the emitting face 1010 uncovered. However, in other embodiments, a horn may be provided that does not wrap around the sonar transducer element/array and, in some cases, is not even attached to the sonar transducer element/array.

FIG. 10E provides an example assembly 1020' where each individual sonar transducer element 1008' has its own a horn 1002'. However, a single horn assembly 1002 may also be utilized with a sonar transducer array having multiple sonar transducer elements so that the single horn assembly 1002 reforms the beam shape of sonar beams generated by multiple sonar transducer elements. Along these lines, in the embodiment illustrated in FIG. 10F, an assembly 1020" includes a single horn 1002' that is configured to rest within the path of the sonar beams generated by multiple sonar transducer elements 1008". In other embodiments, a plurality of horns may be configured to rest within the path of a single sonar beam.

FIGS. 10A-10B also illustrate a horn assembly 1002 where the diffraction surfaces 1004*a* and 1004*b* abut the emitting face 1010 of the sonar transducer element 1008. However, this is not the case in all embodiments. For example, FIGS. 11A-11B illustrate a side and a perspective schematic view of an alternative embodiment. In this alternative embodiment, the diffraction surfaces 1104*a* and 1104*b* of the horn are configured so that they will be positioned at a distance DD away from the emitting face 1110 of the sonar transducer element 1108. As illustrated in FIG. 11B, the emitting face 1110 of the sonar transducer element 1108 defines a width W1, and the horn 1102 defines a width W2. The widths W1, W2 match each other in the illustrated embodiment, but the widths W1, W2 may differ in other embodiments.

FIGS. 12A-12B illustrate various perspective views of another alternative horn that is used to reform the beam shape of a sonar beam generated by a sonar transducer array. As illustrated, the horn 1202 is provided having a first diffraction surface 1204*a* and a second diffraction surface 1204*b*. A sonar transducer array 1208 is also shown having an emitting face 1210. The horn 1202 is configured to wrap around the sonar transducer array 1208, leaving only the emitting face 1210 uncovered. Similar to the diffraction surfaces described in reference to FIGS. 10A, 10B, 11A, and 11B, the first diffraction surface 1204*a* and the second diffraction surface 1204*b* are configured so that they will be positioned in a path of the sonar beam when the horn 1202 is appropriately positioned, thereby reforming the beam shape of a sonar beam. In the illustrated embodiments in FIGS. 12A-12B, the horn is configured to expand the transverse beam width of the sonar transducer element 1208.

In some embodiments, the horn may be part of a sleeve that is fitted over a transducer assembly housing (e.g., assembled during manufacturing and/or retrofitted). In this regard, a sleeve comprising one or more horns may be used in some cases to permit simple assembly with a sonar transducer assembly. FIG. 13 illustrates an example sleeve 1320 that is configured to be secured on a transducer assembly 1302. A transducer assembly 1302 is illustrated having a first sonar transducer array 1304*a* oriented in a first direction, a second sonar transducer array 1304*b* oriented in a second direction, and a third sonar transducer array 1304*c* (not visible in FIG. 13) oriented in a third direction. The sleeve 1320 is provided, and this sleeve 1320 defines a recess in its internal volume. This recess may be sized to permit the sleeve 1320 to fit securely around the outside surface of the transducer assembly 1302. In some embodiments, fasteners may be used to secure the sleeve 1320 onto the transducer assembly 1302. The sleeve 1320 may define a first horn 1322*a* that is configured to be secured adjacent to the first sonar transducer array 1304*a* when the sleeve

1320 is secured on the transducer assembly 1302. The sleeve 1320 may define a second horn 1322*b* that is configured to be secured adjacent to the second sonar transducer array 1304*b* when the sleeve 1320 is secured on the transducer assembly 1302. Additionally, the sleeve 1320 may define a third horn 1322*c* (not visible in FIG. 13) that is configured to be secured adjacent to the third sonar transducer array 1304*c* (not visible in FIG. 13) when the sleeve 1320 is secured on the transducer assembly 1302. Each of the horns 1322*a*, 1322*b*, 1322*c* (not visible) within the sleeve 1320 have a recess 1324*a*, 1324*b*, 1324*c* (not visible), and these recesses are configured to permit sonar beams generated by the respective sonar transducer arrays to pass through the sleeve 1320. However, in some embodiments, an acoustically transparent housing may be provided instead of recesses 1324*a*, 1324*b*, 1324*c*. By providing the first horn 1322*a*, the second horn 1322*b*, and the third horn 1322*c* (not visible), the beam shape generated by the first sonar transducer array 1304*a*, second sonar transducer array 1304*b*, third sonar transducer array 1304*c* (not visible) may be reformed as desired.

Looking ahead now at FIG. 21, an example of an annular shaped horn 2102 is illustrated. The annular shaped horn 2102 defines an opening 2106, with an axis C being a central axis of the opening 2106. The opening 2106 has a circular shape. Additionally, the annular shaped horn 2102 defines an interior surface 2108 adjacent to the opening 2106. In the illustrated embodiment, the interior surface 2108 is flat along the direction defined by the X-axis. However, in other embodiments, the interior surface 2108 may be curved so that middle portions of the interior surface 2108 protrude farther into the opening 2106 (e.g., forming a diffraction surface), and this curvature at the interior surface 2108 may be a radial curvature or some other type of curvature (e.g., parabolic, sinusoidal, a plurality of rectilinear surfaces that make up a curved shape, etc.). The interior surface 2108 may also possess other shapes.

The annular shaped horn 2102 may be positioned proximate to a conical transducer element 2104 such that the annular shaped horn 2102 rests within the path of any sonar beams generated by the conical transducer element 2104. By doing so, the annular shaped horn 2102 will reform a beam shape of the sonar beams generated by the conical transducer element 2104. In some embodiments, the conical transducer element 2104 may be a conical downscan transducer element. Other components may be used to fix the annular shaped horn 2102 relative to the conical transducer element 2104, and these components may preferably be positioned at locations where the components do not interfere with sonar signals being emitted from the conical transducer element 2104. In FIG. 21, the emitting face of the conical transducer element 2104 defines a plane that is parallel to the Y-Z plane, and the annular shaped horn 2102 also defines a circular profile in a second plane that is parallel to the Y-Z plane. The interior surfaces 2108 may serve as a diffraction element, but other portions of the annular shaped horn 2102 may also serve as diffraction elements. Where an annular shaped horn 2102 is used, the first distance (D1) may be minimum diameter of the opening 2106.

Turning now to FIG. 22, another example of an annular shaped horn 2202 is illustrated. The annular shaped horn 2202 is generally similar to the annular shaped horn 2102 of FIG. 21, but the annular shaped horn 2202 includes a first portion 2202A and a second portion 2202B that can be separated from each other. When assembled, the first portion 2202A and the second portion 2202B may be positioned adjacent to each other as illustrated in FIG. 22, and the first portion 2202A and the second portion 2202B may be shifted apart from each other when not in use. By using an annular shaped horn 2202 having a separate first portion 2202A and second portion 2202B, the annular shaped horn 2202 may be capable of being assembled in a variety of different ways. In some embodiments, the first portion 2202A and the second portion 2202B may be identical to each other so that the two portions 2202A, 2202B may be more easily manufactured.

The annular shaped horn 2202 defines an opening 2206, with an axis C' being a central axis of the opening 2206. The opening 2206 has a circular shape. Additionally, the annular shaped horn 2202 defines interior surfaces 2208A, 2208B adjacent to the opening 2206, with a first interior surface 2208A on the first portion 2202A and with a second interior surface 2208B on the second portion 2202B. In the illustrated embodiment, the interior surfaces 2208A, 2208B are flat along the direction defined by the X-axis. However, in other embodiments, the interior surfaces 2208A, 2208B may be curved so that middle portions of the interior surfaces 2208A, 2208B protrude farther into the opening 2206, and this curvature at the interior surface 2208 may be a radial curvature or some other type of curvature (e.g., parabolic, sinusoidal, a plurality of rectilinear surfaces that make up a curved shape, etc.). The interior surfaces 2208A, 2208B may also possess other shapes.

The annular shaped horn 2202 may be positioned adjacent to a conical transducer element 2204 and reform a beam shape of a sonar beam generated by the conical transducer element 2204 in a manner similar to the annular shaped horn 2102 of FIG. 21. The annular shaped horn 2202 may be positioned proximate to a conical transducer element 2204 such that the annular shaped horn 2202 rests within the path of any sonar beams generated by the conical transducer element 2204. By doing so, the annular shaped horn 2202 will reform a beam shape of the sonar beams generated by the conical transducer element 2204. In some embodiments, the conical transducer element 2204 may be a conical downscan transducer element. Other components may be used to fix the annular shaped horn 2202 relative to the conical transducer element 2204, and these components will preferably be positioned at locations where the components will not interfere with sonar signals being emitted from the conical transducer element 2204. The emitting face of the conical transducer element 2204 defines a plane that is parallel to the Y-Z plane, and the annular shaped horn 2202 defines a circular profile in a second plane that is parallel to the Y-Z plane. The interior surfaces 2208A, 2208B may serve as diffraction elements, but other portions of the annular shaped horn 2202 may also serve as diffraction elements. Where an annular shaped horn 2202 is used, the first distance (D1) may be minimum diameter of the opening 2206.

Looking now at FIG. 23, a rectangularly shaped horn 2302 is illustrated. The rectangularly shaped horn 2302 defines an opening 2306, with an axis C" being a central axis of the opening 2306. The opening 2306 has a rectangular shape. Additionally, the rectangularly shaped horn 2302 defines interior surfaces 2308A, 2308B adjacent to the opening 2306. In the illustrated embodiment, the interior surfaces 2308A, 2308B extend in a plane that is parallel to either the X-Y plane or the X-Z plane. However, in other embodiments, the interior surfaces 2308A, 2308B may be curved so that middle portions of the interior surfaces 2308A, 2308B protrude farther into the opening 2306. This curvature at the interior surfaces 2308A, 2308B may be a radial curvature or some other type of curvature (e.g., parabolic, sinusoidal, a plurality of rectilinear surfaces that make up a curved shape, etc.). The interior surfaces 2308A, 2308B may also possess other shapes. The interior surfaces 2308A, 2308B may serve as diffraction elements, but other portions of the rectangularly shaped horn 2302 may also serve as diffraction elements.

The rectangularly shaped horn 2302 may be positioned proximate to a rectangularly shaped transducer element 2304 such that the rectangularly shaped horn 2302 rests within the path of any sonar beams generated by the rectangularly shaped transducer element 2304. By doing so, the rectangularly shaped horn 2302 will reform a beam shape of the sonar beams generated by the rectangularly shaped transducer element 2304. The emitting face of the rectangularly shaped transducer element 2304 defines a plane that is parallel to the Y-Z plane, and the annular shaped horn 2102 also defines a rectangular profile in a second plane that is parallel to the Y-Z plane.

The horns 2102, 2202, 2302 may be similar to the horn 1002 illustrated in FIG. 10C and discussed herein. In some embodiments, the horns 2102, 2202, 2302 may provide similar benefits as the horn 1002. While previous systems allow sonar data to be displayed, the sonar data may lack a desired level of clarity. This may occur because, with changes in angle and operating frequency, the beam shape generated by the sonar transducer element varied greatly. FIGS. 14A and 14B demonstrate these issues. FIG. 14A illustrates an exemplary beam pattern formed by a sonar transducer assembly 1402. The sonar transducer assembly 1402 has a first sonar transducer array **1404*a*, a second sonar transducer array 1404*b*, and a third sonar transducer array 1404*c*. Each sonar transducer array is configured to generate two sonar beams having certain sonar coverage areas. By operating the sonar transducer arrays 1404*a*, 1404*b*, 1404*c* at a fixed phase shift, each sonar transducer array may cover two different sonar coverage areas with a gap therebetween. The first sonar transducer array 1404*a* is configured to generate a first sonar beam having a first sonar coverage area 1408*a* as well as a second sonar beam having a second sonar coverage area 1408*b*. The second sonar transducer array 1404*b* is configured to generate a first sonar beam having a first sonar coverage area 1410*a* as well as a second sonar beam having a second sonar coverage area 1410*b*. The third sonar transducer array 1404*c* is configured to generate a first sonar beam having a first sonar coverage area 1412*a* as well as a second sonar beam having a second sonar coverage area 1412*b*. Notably, with reference to FIG. 14B, the corresponding, resulting sonar images from the coverage areas are shown following the order from left to right 1412*a*', 1408*a*', 1410*a*', 1412*b*', 1408*b*', and 1410*b*'**. By using these various sonar transducer arrays, effective coverage may be maintained across a large area.

Sonar return beams can be "steered" within the particular sonar coverage areas by varying the frequency. In some embodiments, the frequency may vary from 400 kHz to 1300 kHz. In other embodiments, such as the one illustrated in FIG. 14A, the frequency may vary from 550 kHz to 1050 kHz. As shown in FIG. 14A, when a transition occurs between two sonar coverage areas, the frequency will also be significantly different. For example, at the transition between sonar coverage area **1408*a* and sonar coverage area 1410*a*, the frequency drops from 1050 kHz in sonar coverage area 1408*a* to 550 kHz in sonar coverage area 1410*a***.

In previous systems, the beam shape formed by a transducer operating at different frequencies could change drastically. The different frequencies often led to inconsistent beam shapes for the two sonar coverage areas, which in turn caused blurry images at transitions between two adjacent sonar coverage areas.

FIG. 14B illustrates an example display 1450 that is presenting a sonar return image on the screen 1452. In this image, sonar data for each of the sonar coverage areas are compiled onto a single screen 1452 so that the information can be easily understood by the end user. The radial lines 1414 within FIG. 14B represent the transitions between two adjacent sonar coverage areas.

Where a horn is used, the beam shapes generated will be more consistent regardless of the frequency. Thus, where the frequency varies between 550 kHz and 1050 kHz, the beam shape formed at 550 kHz will be more similar with the beam shape formed at 1050 kHz and, therefore, the resulting live images generated on a display will be clearer. The live images will be particularly less blurry at the radial lines where transitions occur. While the frequencies of 550 kHz and 1050 kHz are used herein, these frequencies are merely examples used for the purposes of explanation, and other frequencies may also be used. For example, the frequency may vary from 400 kHz to 1300 kHz.

FIGS. 15A and 15B demonstrate the differences in beam patterns that arise in situations where no horn is used and in situations where a horn is used. The chart shown in FIGS. 15A and 15B illustrate the intensity of sonar signals at angles ranging from 0 to 360 degrees, with the intensity measured in decibels. FIGS. 15A and 15B illustrate beam patterns formed at several different frequencies all on the same chart. However, beam patterns may be seen at individual frequencies in subsequent figures.

FIG. 15A illustrates beam patterns 1500 with a main lobe 1510. This main lobe 1510 provides signals at the highest intensity, with the peak intensity being −5 dB to 5 dB depending on the frequency used. The main lobe 1510 generally extends from 80 degrees to 100 degrees. Various side lobes 1512 are also formed. These side lobes **1512*a* and 1512*b* have a much lower signal intensity than the main lobe 1510, and the signal intensity at the side lobes 1512*a*, 1512*b* can vary greatly. For example, for the side lobe 1512*a* illustrated to the left of the main lobe 1510**, the intensity varies between −30 dB and −10 dB. This large variation can cause resulting sonar images presented on a display to be blurry as noted above, and the variation can lead cause the information presented on the display to be less accurate.

FIG. 15B illustrates transverse beam patterns 1500' generated by a sonar transducer array at various frequencies where a horn is used. Where a horn is used, the signal intensity is much more consistent with variation of the angle. As such, FIG. 15B substantially removes any distinct side lobes. Additionally, the horn results in more consistent intensities at angled positions. The horn may result in decreased intensities at more extreme side angles and may also result in increased intensities at angles more proximate to the angle of 90 degrees. For example, at an angle of 60 degrees or 120 degrees and a frequency of 1100 kHz in FIG. 15A, the signal intensity is around −14 dB. By contrast, at an angle of 60 degrees or 120 degrees, the signal intensity is approximately −6 dB when operating at 1100 kHz in FIG. 15B. Thus, the signal intensity is increased significantly at these side angles where a horn is used. Furthermore, at more extreme angles such as 30 degrees or 150 degrees the signal intensity may actually be reduced by using a horn. Thus, the horn provides a more consistent beam shape.

FIG. 16A illustrates a transverse beam pattern 1600 generated by a sonar transducer array at a single frequency of 750 kHz where no horn is used, and FIG. 16B illustrates a transverse beam pattern 1600' generated by a sonar transducer array at a single frequency of 750 kHz where a horn is used. As stated above, the introduction of a horn results in a much more consistent beam shape, with the intensity of signals being more uniform despite variations in the angle. Where no horn is used, a main lobe 1610 and two distinct side lobes 1612 are formed. Where no horn is used, the signal intensity varies greatly. For example, the following table illustrates the significant variation in intensity:

TABLE 1

Intensities shown in FIG. 16A

| Angle (degrees) | Intensity (dB) |
|---|---|
| 230 | −10 |
| 245 | −25 |
| 270 | 0 |
| 290 | −34 |
| 305 | −10 |

By contrast, where a horn is used in FIG. 16B, the horn causes the signals to be provided at more uniform signals, and no main lobe and distinct side lobes are formed. For example, the following table shows the increased consistency in intensities:

TABLE 2

Intensities shown in FIG. 16B

| Angle (degrees) | Intensity (dB) |
|---|---|
| 225 | −25 |
| 230 | −20 |
| 240 | −13 |
| 245 | −10 |
| 255 | −4 |
| 270 | 0 |
| 285 | −3 |
| 290 | −5 |
| 300 | −12.5 |
| 305 | −15 |
| 315 | −20 |

The use of a horn results in more consistent beam shapes regardless of the frequency at which the sonar transducer element or array is operating. This is further demonstrated in FIGS. 17A and 17B. FIG. 17A illustrates a transverse beam pattern 1700 generated by a sonar transducer array at various frequencies where no horn is used. FIG. 17B illustrates a transverse beam pattern 1700' generated by a sonar transducer array at various frequencies where a horn is used. In each of these figures, the sonar transducer element is operating at a frequency of 950 kHz. Again, introducing the horn results in more consistent beam shapes. In FIG. 17B, the horn is configured to provide an intensity of over −20 dB for a field of view of 60 degrees when a sonar transducer array is operating at a frequency of 950 kHz.

A comparison of the beam shape illustrated in FIGS. 16A and 17A further demonstrates the increased consistency provided by the use of a horn. FIG. 16A illustrates a main lobe 1610 and two distinct side lobes 1612. By contrast, FIG. 17A illustrates a main lobe 1710 and several side lobes 1712 that are much less distinct. The beam shapes are especially inconsistent for angles ranging between 270 degrees and 225 degrees.

While the beam shapes vary greatly where no horn is used, the beam shapes are very consistent where a horn is used. This is demonstrated by a comparison of FIGS. 16B and 17B. In FIG. 16B, the sonar transducer element or array is operating at a frequency of 750 kHz, and a frequency of 950 kHz is utilized in FIG. 17B. Despite utilizing different frequencies, the beam shapes presented in FIGS. 16B and 17B are extremely similar.

These results occur where a sonar transducer array is attached, either directly or indirectly, to a watercraft to provide sonar return data. Notably, similar results are contemplated for a utilizing a horn with a single element.

Looking now at FIG. 24A, a graph 2500 including beam patterns for various sonar transducer assemblies having different horn designs is illustrated. For each of the horn designs, the horn designs generally matched the horn design illustrated in FIGS. 10D and 11B with different dimensions being used. The first beam pattern 2502 is for a sonar transducer assembly with a horn having a first distance (D1) of 5.0 millimeters, a second distance (D2) of 1.0 millimeters, and a radius (R1) of 7.0 millimeters. The second beam pattern 2504 is for a sonar transducer assembly with a horn having first distance (D1) of 6.0 millimeters, a second distance (D2) of zero, and a radius (R1) of 6.0 millimeters. The third beam pattern 2506 is for a sonar transducer assembly with a horn having a first distance (D1) of 6.0 millimeters, a second distance (D2) of zero, and a radius (R1) of 5.0 millimeters. The fourth beam pattern 2508 is for a sonar transducer assembly where no horn is included. All beam patterns 2502, 2504, 2506, 2508, were obtained by utilizing a frequency of 206 kHz.

As illustrated, the first beam pattern 2502 generally had the highest sensitivity between the angles of 180 degrees and 360 degrees. At an angle of 270 degrees, the first beam pattern 2502 had a sensitivity that was approximately 10 decibels higher than the other sensitivities. FIG. 24A generally shows that the beam patterns will be altered by using different horn designs and different values for the first distance (D1), the second distance (D2), and the radius (R1) in the sonar transducer assemblies. Thus, in designing a horn for use in a sonar transducer assembly, the frequency of the sonar transducer assembly may be considered to potentially improve the overall sensitivity of the sonar transducer assembly.

Turning now to FIG. 24B, a graph 2550 including beam patterns for various sonar transducer assemblies where different frequencies are utilized. For each of the sonar transducer assemblies, the horn designs generally matched the horn design illustrated in FIGS. 10D and 11B, but the horn designs had different dimensions from those shown in FIGS. 10D and 11B. Each of the beam patterns 2552, 2554, 2556, 2558, 2560 were formed by using a horn having a first distance (D1) of 1 millimeters and a radius (R1) of 2.6 millimeters.

Different frequencies were used to obtain the beam patterns 2552, 2554, 2556, 2558, 2560. The first beam pattern 2552 was obtained by using a frequency of 690 kHz. The second beam pattern 2554 was obtained by using a frequency of 692 kHz. The third beam pattern 2556 was obtained by using a frequency of 688 kHz. The fourth beam pattern 2558 was obtained by using a frequency of 694 kHz. The fifth beam pattern 2560 was obtained by using a frequency of 696 kHz.

As illustrated, the first beam pattern 2552 (obtained by using a frequency of 692 kHz) had the highest sensitivity of all of the beam patterns. The first beam pattern 2552 had a value of 202 decibels at 0 degrees, and the first beam pattern 2552 had the highest sensitivity at all angles on the graph. The second beam pattern 2554 (obtained by using a frequency of 692 kHz) had the second highest sensitivity. The second beam pattern 2554 had a value of 198 decibels at 0 degrees. The second beam pattern 2554 had a higher sensitivity than the third beam pattern 2556, the fourth beam pattern 2558, and the fifth beam pattern 2560 at all angles. The third beam pattern 2556 (obtained by using a frequency of 688 kHz) had the third highest sensitivity. The third beam pattern 2556 had a value of 193.5 decibels at 0 degrees. The third beam pattern 2556 had a higher sensitivity than the fourth beam pattern 2558 and the fifth beam pattern 2560 at all angles. The fourth beam pattern 2558 (obtained by using a frequency of 694 kHz) had the fourth highest sensitivity. The fourth beam pattern 2558 had a value of 193 decibels at 0 degrees. The fourth beam pattern 2558 had a higher sensitivity than the fifth beam pattern 2560 at all angles. The fifth beam pattern 2560 (obtained by a using a frequency of 696 kHz) had the lowest sensitivity of the beam patterns. The fifth beam pattern 2560 had a value of 189 decibels at 0 degrees. FIG. 24B generally shows that the beam patterns will be altered by using a different frequency in the sonar transducer assemblies. Thus, in designing a horn for use in a sonar transducer assembly, the frequency of the sonar transducer assembly may be considered to potentially improve the overall sensitivity of the sonar transducer assembly.

Example System Architecture

FIG. 18 is a block diagram of an example sonar system 1800 of various embodiments of the present invention described herein.

The illustrated system 1800 includes a marine electronic device 1805. The system 1800 may comprise numerous marine devices 1850. A transducer assembly 1862, a radar, a rudder, a primary motor, a trolling motor, and additional sensors/devices may be provided as marine devices, but other marine devices may also be provided. One or more marine devices may be implemented on the marine electronic device 1805 as well. For example, a position sensor 1845, a direction sensor, an autopilot, and other sensors 1847 may be provided within the marine electronic device 1805. These marine devices can be integrated within the marine electronic device 1805, integrated on a watercraft at another location and connected to the marine electronic device 1805, and/or the marine devices may be implemented at a remote device 1861 in some embodiments. The system 1800 may include any number of different systems, modules, or components; each of which may comprise any device or means embodied in either hardware, software, or a combination of hardware and software configured to perform one or more corresponding functions described herein.

The marine electronic device 1805 may include at least one processor 1810, a memory 1820, a communication interface 1830, a user interface 1835, a display 1840, autopilot, and one or more sensors (e.g. position sensor 1845, direction sensor, other sensors 1847). One or more of the components of the marine electronic device 1805 may be located within a housing or could be separated into multiple different housings (e.g., be remotely located).

The at least one processor 1810 may be any means configured to execute various programmed operations or instructions stored in a memory device (e.g., memory 1820) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 1810 as described herein. In this regard, the at least one processor 1810 may be configured to analyze electrical signals communicated thereto to provide or receive sonar data from one or more sonar devices and additional (e.g., secondary) data from other sources.

In some embodiments, the at least one processor 1810 may be further configured to implement signal processing. In some embodiments, the at least one processor 1810 may be configured to perform enhancement features to improve the display characteristics of data or images, collect or process additional data, such as time, temperature, GPS information, waypoint designations, or others, or may filter extraneous data to better analyze the collected data. The at least one processor 1810 may further implement notices and alarms, such as those determined or adjusted by a user, to reflect proximity of other vehicles (e.g. watercraft), proximity of areas of interest, proximity of areas that have a high number of fish, approaching storms, etc. In some embodiments, the at least one processor 1810 may receive data from different sonar transducer arrays and compile the sonar data into a single sonar image as depicted in FIG. 14B.

In an example embodiment, the memory 1820 may include one or more non-transitory storage or memory devices such as, for example, volatile and/or non-volatile memory that may be either fixed or removable. The memory 1820 may be configured to store instructions, computer program code, sonar data, and additional data such as radar data, chart data, location/position data in a non-transitory computer readable medium for use, such as by the at least one processor 1810 for enabling the marine electronic device 1805 to carry out various functions in accordance with example embodiments of the present invention. For example, the memory 1820 could be configured to buffer input data for processing by the at least one processor 1810. Additionally or alternatively, the memory 1820 could be configured to store instructions for execution by the at least one processor 1810.

The communication interface 1830 may be configured to enable communication to external systems (e.g. an external network 1802). In this manner, the marine electronic device 1805 may retrieve stored data from a remote device 1861 via the external network 1802 in addition to or as an alternative to the onboard memory 1820. Additionally or alternatively, the marine electronic device 1805 may transmit or receive data, such as sonar signal data, sonar return data, sonar image data, path data or the like to or from a transducer assembly 1862. In some embodiments, the marine electronic device 1805 may also be configured to communicate with other devices or systems (such as through the external network 1802 or through other communication networks, such as described herein). For example, the marine electronic device 1805 may communicate with a propulsion system of the watercraft 100 (e.g., for autopilot control); a remote device (e.g., a user's mobile device, a handheld remote, etc.); or another system.

The communications interface 1830 of the marine electronic device 1805 may also include one or more communications modules configured to communicate with one another in any of a number of different manners including, for example, via a network. In this regard, the communications interface 1830 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or transducer assemblies) may be included in the system 1800.

The position sensor 1845 may be configured to determine the current position and/or location of the marine electronic device 1805 (and/or the watercraft 100). For example, the position sensor 1845 may comprise a GPS, bottom contour, inertial navigation system, such as machined electromagnetic sensor (MEMS), a ring laser gyroscope, or other location detection system. Alternatively or in addition to determining the location of the marine electronic device 1805 or the watercraft 100, the position sensor 1845 may also be configured to determine the position and/or orientation of an object outside of the watercraft 100.

The display 1840 (e.g. one or more screens) may be configured to present images and may include or otherwise be in communication with a user interface 1835 configured to receive input from a user. The display 1840 may be, for example, a conventional LCD (liquid crystal display), a touch screen display, mobile device, or any other suitable display known in the art upon which images may be displayed.

In some embodiments, the display 1840 may present one or more sets of data (or images generated from the one or more sets of data). Such data includes chart data, sonar data, radar data, weather data, location data, position data, orientation data, or any other type of information relevant to the watercraft. Sonar data may be received by transducer arrays 1867, 1868, 1869. Radar data may be received from a radar device on the watercraft or from radar devices positioned at other locations, such as remote from the watercraft. Additional data may be received from marine devices such as a primary motor or an associated sensor, a trolling motor or an associated sensor, an autopilot, a rudder or an associated sensor, a position sensor 1845, a direction sensor, a remote device 1861, onboard memory 1820 (e.g., stored chart data, historical data, etc.), or other devices.

In some further embodiments, various sets of data, referred to above, may be superimposed or overlaid onto one another. For example, sonar data generated by one transducer array 1867 may be applied to (or overlaid onto) a chart alongside sonar data generated by other transducer arrays 1868, 1869. Additionally or alternatively, other information such as depth information, weather information, radar information, sonar information, or any other navigation system inputs may be provided on a single display with or without sonar data also presented.

The user interface 1835 may include, for example, a keyboard, keypad, function keys, mouse, scrolling device, input/output ports, touch screen, or any other mechanism by which a user may interface with the system.

Although the display 1840 of FIG. 18 is shown as being directly connected to the at least one processor 1810 and within the marine electronic device 1805, the display 1840 could alternatively be remote from the at least one processor 1810 and/or marine electronic device 1805. Likewise, in some embodiments, the position sensor 1845 and/or user interface 1835 could be remote from the marine electronic device 1805.

The marine electronic device 1805 may include one or more other sensors/devices 1847, such as configured to measure or sense various other conditions. The other sensors/devices 1847 may include, for example, an air temperature sensor, a water temperature sensor, a current sensor, a light sensor, a wind sensor, a speed sensor, or the like.

The transducer assembly 1862 illustrated in FIG. 18 includes three transducer arrays 1867, 1868, 1869. In some embodiments, more or less transducer arrays could be included, or other transducer elements could be included. For example, FIG. 19 illustrates an embodiment where only a single transducer array 1867' is included (all other features in FIG. 19 are similar to FIG. 18).

As indicated herein, the transducer assembly 1862 may also include a sonar signal processor or other processor (although not shown) configured to perform various sonar processing. In some embodiments, the processor (e.g., at least one processor 1810 in the marine electronic device 1805, a controller (or processor portion) in the transducer assembly 1862, or a remote controller—or combinations thereof) may be configured to filter sonar return data and/or selectively control transducer elements of the transducer array 1867. For example, various processing devices (e.g., a multiplexer, a spectrum analyzer, A-to-D converter, etc.) may be utilized in controlling or filtering sonar return data and/or transmission of sonar signals from the transducer array 1867.

The transducer assembly 1862 may also include one or more other systems, such as various sensor(s) 1866. For example, the transducer assembly 1862 may include an orientation sensor, such as gyroscope or other orientation sensor (e.g., accelerometer, MEMS, etc.) that can be configured to determine the relative orientation of the transducer assembly 1862 and/or the one or more arrays 1867—such as with respect to a forward direction of the watercraft. In some embodiments, additionally or alternatively, other types of sensor(s) are contemplated, such as, for example, a water temperature sensor, a current sensor, a light sensor, a wind sensor, a speed sensor, or the like.

The components presented in FIGS. 18 and 19 may be rearranged to alter the connections between components. For example, in some embodiments, a marine device outside of the marine electronic device 1805, such as a radar, may be directly connected to the at least one processor 1810 rather than being connected to the communication interface 1830. Additionally, sensors and devices implemented within the marine electronic device 1805 may be directly connected to the communications interface in some embodiments rather than being directly connected to the at least one processor 1810.

Example Flowchart(s) and Operations

Some embodiments of the present invention provide methods, apparatus, and systems related to the introduction of a horn to reform the beam shape generated by a sonar transducer element or array. By performing these methods, the beam shape generated by the sonar transducer element or array may be improved by providing more consistent signal intensities despite changes in the angle or operating frequency.

FIG. 20A illustrates a flowchart of an example method of operating a sonar system with a horn according to some embodiments discussed herein. A sonar transducer array having an emitting face is provided at operation 2002. At operation 2004, a horn is provided. This horn may have two or more diffraction surfaces. These diffraction surfaces may possess a curved and convex shape, and the horn may be configured so that the diffraction surfaces may rest within the beam path of a sonar transducer element as illustrated in FIG. 2D. The horn may be provided within a path of a sonar beam generated by the emitting face, and the horn may be configured to reform a beam shape of the sonar beam generated by the emitting face.

At operation 2006, the horn may be positioned in the signal path of the sonar transducer array. In this way, any sonar beams generated by the sonar transducer array may be reformed to provide improved beam shapes as discussed above. At operation 2008, emission of a sonar beam from the emitting face into the path may be caused, and this may be done by sending a signal, actuating a switch, etc.

The operations of FIG. 20A may be performed in any order unless otherwise noted, and additional operations may be performed or certain operations may be omitted.

Turning now to FIG. 20B, another flowchart is illustrated of an example method 2050 for manufacturing a sonar transducer assembly. At operation 2052, a sonar transducer element is provided (although multiple sonar transducer elements may be provided, such as arranged in an array). The sonar transducer element has an emitting face, and the sonar transducer element is configured to generate a sonar beam extending in a path. The sonar transducer element is configured to operate at an operating frequency, and the sonar transducer element possesses a sensitivity. In some embodiments, the sonar transducer element is a linear downscan sonar transducer element, but the sonar transducer element may be a conical downscan sonar transducer element or some other type of sonar transducer element.

At operation 2054, a horn design is determined for a horn. The horn, for example, has a first diffraction element and a second diffraction element, with the first diffraction element defining a first curved portion and with the second diffraction element defining a second curved portion. The first curved portion and the second curved portion both possess a section defining a radius. The first diffraction element and the second diffraction element are configured to increase a sensitivity of the sonar transducer element when the sonar transducer element is operated at the operating frequency. Additionally, a first distance is a minimum distance separating the first diffraction element and the second diffraction element of the horn, and a second distance is defined as the distance that the sonar beam travels in the path between the emitting face and a curved portion of the first diffraction element or the second diffraction element. In determining the horn design at operation 2054, at least one of the first distance, the second distance, the radius, or a width of the horn are selected so as to increase the sensitivity of the sonar transducer element when the sonar transducer element is operated at the operating frequency. In some embodiments, determining the horn design may comprise selecting at least one of first distance, the second distance, the radius, or a width of the horn to increase the sensitivity of the sonar transducer element when the sonar transducer assembly is operated at the operating frequency. In some embodiments, each of the first distance, the second distance, the radius, and the width are selected. In some embodiments, only the radius and the first distance are selected. Additionally, in determining the horn design at operation 2054, the width of the horn may be selected so that it matches a width of the emitting face of the sonar transducer element.

By performing operation 2054 to determine the horn design, the sensitivity of the sonar transducer assembly may be increased. For example, in some embodiments, a sonar transducer assembly having a horn using the horn design may have a sensitivity that is at least 12 decibels or more over an otherwise identical sonar transducer assembly that does not utilize any horn.

At operation 2056, a horn is provided by forming the horn in accordance with the horn design.

At operation 2058, a horn is positioned so that the first diffraction element and the second diffraction element of the horn rest in the path of any sonar beam generated by the sonar transducer element. By doing so, the first diffraction element and the second diffraction element reform a beam shape of the sonar beam generated by the sonar transducer element.

At operation 2060, emission of a first sonar beam is caused so that the first sonar beam is emitted from the sonar transducer element. The first sonar beam may be emitted with a path. Additionally, the operating frequency of the sonar transducer element may remain approximately the same during operation of the sonar transducer element.

The operations of FIG. 20B may be performed in any order unless otherwise noted.

CONCLUSION

Many modifications and other embodiments set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed:

1. A sonar transducer assembly for controlling sonar beam shapes, the sonar transducer assembly comprising:

a sonar transducer element having an emitting face, wherein the sonar transducer element is configured to generate a sonar beam having a path, and wherein the sonar transducer element is configured to operate at an operating frequency, wherein the sonar transducer element possesses a sensitivity; and a horn having at least one diffraction element, wherein the at least one diffraction element is configured to increase the sensitivity of the sonar transducer element when the sonar transducer element is operated at the operating frequency, wherein the horn is positioned so that the at least one diffraction element is spaced apart from the emitting face of the sonar transducer element and rests within the path of the sonar beam, wherein the horn is configured to reform a beam shape of the sonar beam, wherein the at least one diffraction element comprises a first diffraction element and a second diffraction element, wherein the first diffraction element defines a curved first diffraction surface with a first apex that extends into the path of the sonar beam, wherein the second diffraction element defines a curved second diffraction surface with a second apex that extends into the path of the sonar beam, wherein each of the first diffraction element and the second diffraction element possesses a section defining a radius, and wherein a first distance is a minimum distance separating the first apex of the first diffraction element and the second apex of the second diffraction element of the horn, and wherein the horn is positioned such that the sonar beam passes between the first apex of the first diffraction element and the second apex of the second diffraction element that extend into the path of the sonar beam.

2. The sonar transducer assembly of claim 1, wherein the sonar transducer assembly is made by a process comprising:

determining the radius and the first distance to increase the sensitivity of the sonar transducer element when the sonar transducer element is operated at the operating frequency; and forming the horn with the radius and the first distance.

3. The sonar transducer assembly of claim 2, wherein a second distance is defined as the distance that the sonar beam travels in the path between the emitting face and the curved first diffraction surface or the curved second diffraction surface, and wherein the sonar transducer assembly is made by a process comprising:

determining the radius, the first distance, and the second distance to increase the sensitivity of the sonar transducer element when the sonar transducer element is operated at the operating frequency; and forming the horn with the determined radius, the first distance, and the second distance.

4. The sonar transducer assembly of claim 2, wherein a second distance is defined as the distance that the sonar beam travels in the path between the emitting face and the curved first diffraction surface or the curved second diffraction surface, wherein the emitting face defines a width, and wherein the sonar transducer assembly is made by a process comprising:

determining the radius, the first distance, the second distance, and the width to increase the sensitivity of the sonar transducer element when the sonar transducer element is operated at the operating frequency; and forming the horn with the determined radius, the first distance, the second distance, and the width.

5. The sonar transducer assembly of claim 4, wherein the radius is 7 millimeters, wherein the first distance is 5 millimeters, wherein the second distance is 0.5 millimeters, wherein the width is 5 millimeters, and wherein a resultant sensitivity of the sonar transducer element is 187.00 decibels when the operating frequency is 206 kilohertz.

6. The sonar transducer assembly of claim 2, wherein determining of the radius and the first distance results in a resulting sensitivity increase over an otherwise identical sonar transducer assembly that operates without the horn.

7. The sonar transducer assembly of claim 6, wherein the resulting sensitivity increase is 12 decibels or more over the otherwise identical sonar transducer assembly that operates without the horn.

8. The sonar transducer assembly of claim 1, wherein the sonar transducer element is a linear downscan sonar transducer element.

9. The sonar transducer assembly of claim 1, wherein the sonar transducer element is a conical downscan sonar transducer element.

10. The sonar transducer element of claim 9, wherein the horn is an annular shaped horn.

11. The sonar transducer element of claim 10, wherein the emitting face of the sonar transducer element defines a first plane, wherein the annular shaped horn defines a circular profile in a second plane that is parallel to the first plane.

12. A method for manufacturing a sonar transducer assembly, the method comprising:

providing a sonar transducer element having an emitting face, wherein the sonar transducer element is configured to generate a sonar beam extending in a path, wherein the sonar transducer element is configured to operate at an operating frequency, wherein the sonar transducer element possesses a sensitivity;

determining a horn design for a horn that is spaced apart from the emitting face of the sonar transducer element and has a first diffraction element and a second diffraction element, wherein the first diffraction element defines a curved first diffraction surface with a first apex that extends into the path of the sonar beam, wherein the second diffraction element defines a curved second diffraction surface with a second apex that extends into the path of the sonar beam, wherein the first diffraction element and the second diffraction element both possess a section defining a radius, and wherein a first distance is a minimum distance separating the first apex of the first diffraction element and the second apex of the second diffraction element of the horn, wherein a second distance is defined as a distance that the sonar beam travels in the path between the emitting face and the curved first diffraction surface or the curved second diffraction surface, wherein at least one of the first distance, the second distance, or the radius have been selected so as to increase the sensitivity of the sonar transducer element when the sonar transducer element is operated at the operating frequency;

providing the horn having the horn design; and positioning the horn so that the first diffraction element and the second diffraction element rest within the path of the sonar beam and the first apex of the curved first diffraction surface and the second apex of the curved second diffraction surface both extend into the path of the sonar beam so that the first diffraction element and the second diffraction element reform a beam shape of the sonar beam generated by the sonar transducer element, wherein the horn is positioned such that the sonar beam passes between the first apex of the first curved diffraction surface and the second apex of the second curved diffraction surface that both extend into the path of the sonar beam.

13. The method of claim 12, wherein the emitting face defines a width, wherein the first diffraction element and the second diffraction element are configured to increase a sensitivity of the sonar transducer element when the sonar transducer element is operated at the operating frequency, and wherein determining the horn design comprises determining at least one of the first distance, the second distance, or the radius to increase the sensitivity of the sonar transducer element when the sonar transducer assembly is operated at the operating frequency and when the sonar transducer element possesses the width.

14. The method of claim 12, wherein the operating frequency of the sonar transducer element remains the same during operation of the sonar transducer element.

15. The method of claim 12, further comprising:

causing emission of a first sonar beam from the emitting face into the path.

16. The method of claim 12, wherein determining the radius and the first distance results in a resulting sensitivity increase of at least 12 decibels over an otherwise identical sonar transducer assembly that does not include any horn.

17. The method of claim 12, wherein determining the radius and the first distance results in a resulting sensitivity increase of at least 5 decibels over an otherwise identical sonar transducer assembly that does not include any horn.

* * * * *